United States Patent
Kenney et al.

(10) Patent No.: US 10,803,259 B2
(45) Date of Patent: *Oct. 13, 2020

(54) HYBRID ANALOG-DIGITAL MATRIX PROCESSORS

(71) Applicant: Lightmatter, Inc., Boston, MA (US)

(72) Inventors: Tyler J. Kenney, Boston, MA (US); Martin B. Z. Forsythe, Jamaica Plain, MA (US); Tomo Lazovich, Cambridge, MA (US); Darius Bunandar, Boston, MA (US)

(73) Assignee: Lightmatter, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/801,015

(22) Filed: Feb. 25, 2020

(65) Prior Publication Data

US 2020/0272795 A1 Aug. 27, 2020

Related U.S. Application Data

(60) Provisional application No. 62/810,851, filed on Feb. 26, 2019.

(51) Int. Cl.
*G06J 1/02* (2006.01)
*G06F 17/16* (2006.01)

(52) U.S. Cl.
CPC ............... *G06J 1/02* (2013.01); *G06F 17/16* (2013.01)

(58) Field of Classification Search
CPC .................................. G06J 1/02; G06F 17/16
USPC .................................................. 708/1–7, 801
See application file for complete search history.

(56) References Cited

U.S. PATENT DOCUMENTS

| | | |
|---|---|---|
| 3,872,293 A | 3/1975 | Green |
| 4,567,569 A | 1/1986 | Caulfield et al. |
| 4,607,344 A | 8/1986 | Athale et al. |
| 4,633,428 A | 12/1986 | Byron |
| 4,686,646 A | 8/1987 | Goutzoulis |
| 4,739,520 A | 4/1988 | Collins, Jr. et al. |
| 4,809,204 A | 2/1989 | Dagenais et al. |
| 4,849,940 A | 7/1989 | Marks, II et al. |
| 4,877,297 A | 10/1989 | Yeh |

(Continued)

FOREIGN PATENT DOCUMENTS

| | | |
|---|---|---|
| CN | 101630178 A | 1/2010 |
| WO | WO 2005/029404 A2 | 3/2005 |

(Continued)

OTHER PUBLICATIONS

International Search Report and Written Opinion for International Application No. PCT/US19/32181 dated Sep. 23, 2019.

(Continued)

*Primary Examiner* — Tan V Mai
(74) *Attorney, Agent, or Firm* — Wolf, Greenfield & Sacks, P.C.

(57) ABSTRACT

Techniques for computing matrix operations for arbitrarily large matrices on a finite-sized hybrid analog-digital matrix processor are described. Techniques for gain adjustment in a finite-sized hybrid analog-digital matrix processor are described which enable the system to obtain higher energy efficiencies, greater physical density and improved numerical accuracy. In some embodiments, these techniques enable maximization of the predictive accuracy of a GEMM-based convolutional neural network using low-precision data representations.

30 Claims, 33 Drawing Sheets

(56) References Cited

U.S. PATENT DOCUMENTS

| | | | |
|---|---|---|---|
| 4,948,212 | A | 8/1990 | Cheng et al. |
| 5,004,309 | A | 4/1991 | Caulfield et al. |
| 5,077,619 | A | 12/1991 | Toms |
| 5,095,459 | A | 3/1992 | Ohta et al. |
| 5,333,117 | A | 7/1994 | Ha et al. |
| 5,383,042 | A | 1/1995 | Robinson |
| 5,394,257 | A | 2/1995 | Horan et al. |
| 5,428,711 | A | 6/1995 | Akiyama et al. |
| 5,495,356 | A | 2/1996 | Sharony et al. |
| 5,550,993 | A | 8/1996 | Ehlig et al. |
| 5,576,873 | A | 11/1996 | Crossland et al. |
| 5,640,261 | A | 6/1997 | Ono |
| 5,699,449 | A | 12/1997 | Javidi |
| 5,784,309 | A | 7/1998 | Budil |
| 5,953,143 | A | 9/1999 | Sharony et al. |
| 6,005,998 | A | 12/1999 | Lee |
| 6,060,710 | A | 5/2000 | Carrieri et al. |
| 6,178,020 | B1 | 1/2001 | Schultz et al. |
| 6,728,434 | B2 | 4/2004 | Flanders |
| 7,136,587 | B1 | 11/2006 | Davis et al. |
| 7,173,272 | B2 | 2/2007 | Ralph |
| 7,536,431 | B2 | 5/2009 | Goren et al. |
| 7,660,533 | B1 | 2/2010 | Meyers et al. |
| 7,876,248 | B2 | 1/2011 | Berkley et al. |
| 7,985,965 | B2 | 7/2011 | Barker et al. |
| 8,018,244 | B2 | 9/2011 | Berkley |
| 8,023,828 | B2 | 9/2011 | Beausoleil et al. |
| 8,026,837 | B1 | 9/2011 | Valley et al. |
| 8,027,587 | B1 | 9/2011 | Watts |
| 8,035,540 | B2 | 10/2011 | Berkley et al. |
| 8,129,670 | B2 | 3/2012 | Laycock et al. |
| 8,190,553 | B2 | 5/2012 | Routt |
| 8,223,414 | B2 | 7/2012 | Goto |
| 8,386,899 | B2 | 2/2013 | Goto et al. |
| 8,560,282 | B2 | 10/2013 | Macready et al. |
| 8,604,944 | B2 | 12/2013 | Berkley et al. |
| 8,620,855 | B2 | 12/2013 | Bonderson |
| 8,837,544 | B2 | 9/2014 | Santori |
| 9,009,560 | B1 | 4/2015 | Matache et al. |
| 9,250,391 | B2 | 2/2016 | McLaughlin et al. |
| 9,354,039 | B2 | 5/2016 | Mower et al. |
| 9,513,276 | B2 | 12/2016 | Tearney et al. |
| 9,791,258 | B2 | 10/2017 | Mower |
| 10,095,262 | B2 | 10/2018 | Valley et al. |
| 10,268,232 | B2 | 4/2019 | Harris et al. |
| 10,359,272 | B2 | 7/2019 | Mower et al. |
| 10,382,139 | B2 | 8/2019 | Rosenhouse et al. |
| 10,534,189 | B2 | 1/2020 | Miller |
| 2003/0086138 | A1 | 5/2003 | Pittman et al. |
| 2003/0235363 | A1 | 12/2003 | Pfeiffer |
| 2003/0235413 | A1 | 12/2003 | Cohen et al. |
| 2004/0243657 | A1 | 12/2004 | Goren et al. |
| 2005/0036786 | A1 | 2/2005 | Ramachandran et al. |
| 2006/0215949 | A1 | 9/2006 | Lipson et al. |
| 2007/0180586 | A1 | 8/2007 | Amin |
| 2008/0031566 | A1 | 2/2008 | Matsubara et al. |
| 2008/0212186 | A1 | 9/2008 | Zoller et al. |
| 2008/0212980 | A1 | 9/2008 | Weiner |
| 2008/0273835 | A1 | 11/2008 | Popovic |
| 2009/0028554 | A1 | 1/2009 | Anderson et al. |
| 2010/0165432 | A1 | 7/2010 | Laycock et al. |
| 2010/0215365 | A1 | 8/2010 | Fukuchi |
| 2013/0011093 | A1 | 1/2013 | Goh et al. |
| 2013/0121706 | A1 | 5/2013 | Yang et al. |
| 2014/0003761 | A1 | 1/2014 | Dong |
| 2014/0056585 | A1 | 2/2014 | Qian et al. |
| 2014/0241657 | A1 | 8/2014 | Manouvrier |
| 2014/0299743 | A1 | 10/2014 | Miller |
| 2015/0354938 | A1 | 12/2015 | Mower et al. |
| 2015/0382089 | A1 | 12/2015 | Mazed |
| 2016/0103281 | A1 | 4/2016 | Matsumoto |
| 2016/0112129 | A1 | 4/2016 | Chang |
| 2016/0118106 | A1 | 4/2016 | Yoshimura et al. |
| 2016/0162781 | A1 | 6/2016 | Lillicrap et al. |
| 2016/0162798 | A1 | 6/2016 | Marandi et al. |
| 2016/0182155 | A1 | 6/2016 | Taylor et al. |
| 2016/0245639 | A1 | 8/2016 | Mower et al. |
| 2016/0301478 | A1 | 10/2016 | Luo et al. |
| 2016/0352515 | A1 | 12/2016 | Bunandar et al. |
| 2017/0031101 | A1 | 2/2017 | Miller |
| 2017/0201813 | A1 | 7/2017 | Sahni |
| 2017/0237505 | A1 | 8/2017 | Lucamarini et al. |
| 2017/0285373 | A1 | 10/2017 | Zhang et al. |
| 2017/0351293 | A1 | 12/2017 | Carolan et al. |
| 2018/0107237 | A1 | 4/2018 | Andregg et al. |
| 2018/0274900 | A1 | 9/2018 | Mower et al. |
| 2018/0323825 | A1 | 11/2018 | Cioffi et al. |
| 2018/0335574 | A1 | 11/2018 | Steinbrecher et al. |
| 2019/0110084 | A1 | 4/2019 | Jia et al. |
| 2019/0346685 | A1 | 11/2019 | Miller |
| 2019/0354894 | A1 | 11/2019 | Lazovich et al. |
| 2019/0370644 | A1 | 12/2019 | Kenney et al. |
| 2019/0372589 | A1 | 12/2019 | Gould et al. |

FOREIGN PATENT DOCUMENTS

| | | |
|---|---|---|
| WO | WO 2006/023067 A2 | 3/2006 |
| WO | WO 2008/069490 A1 | 6/2008 |
| WO | WO 2018/098230 A1 | 5/2018 |
| WO | WO 2019/217835 A1 | 11/2019 |

OTHER PUBLICATIONS

International Search Report and Written Opinion for International Application No. PCT/US2019/032272 dated Sep. 4, 2019.

International Search Report and Written Opinion from International Application No. PCT/US2015/034500, dated Mar. 15, 2016, 7 pages.

Invitation to Pay Additional Fees for International Application No. PCT/US19/32181 dated Jul. 23, 2019.

Invitation to Pay Additional Fees for International Application No. PCT/US2019/032272 dated Jun. 27, 2019.

[No Author Listed], Optical Coherent Receiver Analysis. 2009 Optiwave Systems, Inc. 16 pages. URL:https://dru5cjyjifvrg.cloudfront.net/wp-content/uploads/2017/03/OptiSystem-Applications-Coherent-Receiver-Analysis.pdf [retrieved on Aug. 17, 2019].

[No Author Listed], Training with Mixed Precision. User Guide. Nvidia. Jan. 2020. 43 pages.

Aaronson et al., Computational complexity of linear optics. Proceedings of the 43rd Annual ACM Symposium on Theory of Computing. 2011. 101 pages. ISBN 978-1-4503-0691-1.

Abu-Mostafa et al., Optical neural computers. Scientific American. 1987:88-95.

Albert et al., Statistical mechanics of com-plex networks. Reviews of Modern Physics. 2002;(74):47-97.

Almeida et al., All-optical control of light on a silicon chip. Nature. 2004;431:1081-1084.

Amir et al., Classical diffusion of a quantum particle in a noisy environment. Physical Review E. 2009;79. 5 pages. DOI: 10.1103/PhysRevE.79.050105.

Amit et al., Spin-glass models of neural networks. Physical Review A. 1985;32(2):1007-1018.

Anitha et al., Comparative Study of High performance Braun's multiplier using FPGAs. IOSR Journal of Electrontrics and Communication Engineering (IOSRJECE). 2012;1:33-37.

Appeltant et al., Information processing using a single dynamical node as complex system. Nature Communications. 2011. 6 pages. DOI: 10.1038/ncomms1476.

Arjovsky et al., Unitary Evolution Recurrent Neural Networks. arXiv:1511.06464. 2016. 9 pages.

Aspuru-Guzik et al., Photonic quantum simulators. Nature Physics. 2012;8:285-291. DOI: 10.1038/NPHYS2253.

Aspuru-Guzik et al., Simulated Quantum Computation of Molecular Energies. Science. 2005;309:1704-7.

Atabaki et al., Integrating photonics with silicon nanoelectronics for the next generation of systems on a chip. Nature. 2018;556(7701):349-354. 10 pages. DOI: 10.1038/s41586-018-0028-z.

Baehr-Jones et al., A 25 Gb/s Silicon Photonics Platform. arXiv:1203.0767. 2012. 11 pages.

(56) References Cited

OTHER PUBLICATIONS

Bao et al., Atomic-Layer Graphene as a Saturable Absorber for Ultrafast Pulsed Lasers. 24 pages. 2009.
Bao et al., Monolayer graphene as a saturable absorber in a mode-locked laser. Nano Research. 2011;4:297-307. DOI: 10.1007/s12274-010-0082-9.
Barahona, On the computational complexity of Ising spin glass models. Journal of Physics A: Mathematical and General. 1982;15:3241-3253.
Bertsimas et al., Robust optimization with simulated annealing. Journal of Global Optimization. 2010;48:323-334. DOI 10.1007/s10898-009-9496-x.
Bewick, Fast multiplication: algorithms and implementation. Ph.D. thesis, Stanford University (1994). 170 pages.
Bonneau et al., Quantum interference and manipulation of entanglement in silicon wire waveguide quantum circuits. New Journal of Physics. 2012;14:045003. 13 pages. DOI: 10.1088/1367-2630/14/4/045003.
Brilliantov, Effective magnetic Hamiltonian and Ginzburg criterion for fluids. Physical Review E. 1998;58:2628-2631.
Bromberg et al., Bloch oscillations of path-entangled photons. Physical Review Letters. 2010;105:263604-1-2633604-4. 4 pages. DOI: 10.1103/PhysRevLett.105.263604.
Bromberg et al., Quantum and Classical Correlations in Waveguide Lattices. Physical Review Letters. 2009;102:253904-1-253904-4. 4 pages. DOI: 10.1103/PhysRevLett.102.253904.
Broome et al., Photonic Boson Sampling in a Tunable Circuit. Science. 2012;339:794-8.
Bruck et al., On the power of neural networks for solving hard problems. American Institute of Physics. 1988. pp. 137-143. 7 pages.
Canziani et al., Evaluation of neural network architectures for embedded systems. Circuits and Systems (ISCAS). 2017 IEEE International Symposium. 4 pages.
Cardenas et al., Low loss etchless silicon photonic waveguides. Optics Express. 2009;17(6):4752-4757.
Carolan et al., Universal linear optics. Science. 2015;349:711-716.
Caves, Quantum-mechanical noise in an interferometer. Physical Review D. 1981;23(8):1693-1708. 16 pages.
Centeno et al., Optical bistability in finite-size nonlinear bidimensional photonic crystals doped by a microcavity. Physical Review B. 2000;62(12):R7683-R7686.
Chan, Optical flow switching networks. Proceedings of the IEEE. 2012;100(5):1079-1091.
Chen et al., Compact, low-loss and low-power 8×8 broadband silicon optical switch. Optics Express. 2012;20(17):18977-18985.
Chen et al., DianNao: A small-footprint high-throughput accelerator for ubiquitous machine-learning. ACM Sigplan Notices. 2014;49:269-283.
Chen et al., Efficient photon pair sources based on silicon-on-insulator microresonators. Proc. of SPIE. 2010;7815. 10 pages.
Chen et al., Frequency-bin entangled comb of photon pairs from a Silicon-on-Insulator micro-resonator. Optics Express. 2011;19(2):1470-1483.
Chen et al., Universal method for constructing N-port nonblocking optical router based on 2×2 optical switch for photonic networks-on-chip. Optics Express. 2014;22(10);12614-12627. DOI: 10.1364/OE.22.012614.
Cheng et al., In-Plane Optical Absorption and Free Carrier Absorption in Graphene-on-Silicon Waveguides. IEEE Journal of Selected Topics in Quantum Electronics. 2014;20(1). 6 pages.
Chetlur et al., cuDNN: Efficient primitives for deep learning. arXiv preprint arXiv:1410.0759. 2014. 9 pages.
Childs et al., Spatial search by quantum walk. Physical Review A. 2004;70(2):022314. 11 pages.
Chung et al., A monolithically integrated large-scale optical phased array in silicon-on-insulator cmos. IEEE Journal of Solid-State Circuits. 2018;53:275-296.
Cincotti, Prospects on planar quantum computing. Journal of Lightwave Technology. 2009;27(24):5755-5766.
Clements et al., Optimal design for universal multiport interferometers. Optica. 2016;3(12):1460-1465.
Courbariaux et al., Training Deep Neural Networks with Low Precision Multiplications. arXiv:1412.7024v5. Sep. 23, 2015. 10 pages.
Crespi et al., Integrated multimode interferometers with arbitrary designs for photonic boson sampling. Nature Photonics. 2013;7:545-549. DOI: 10.1038/NPHOTON.2013.112.
Crespi, et al., Anderson localization of entangled photons in an integrated quantum walk. Nature Photonics. 2013;7:322-328. DOI: 10.1038/NPHOTON.2013.26.
Dai et al., Novel concept for ultracompact polarization splitter-rotator based on silicon nanowires. Optics Express. 2011;19(11):10940-9.
De Sa et al., High-Accuracy Low-Precision Training. arXiv:1803.03383v1. Mar. 9, 2018. 22 pages.
Di Giuseppe et al., Einstein-Podolsky-Rosen Spatial Entanglement in Ordered and Anderson Photonic Lattices. Physical Review Letters. 2013;110:150503-1-150503-5. DOI: 10.1103/PhysRevLett.110.150503.
Dunningham et al., Efficient comparison of path-lengths using Fourier multiport devices. Journal of Physics B: Atomic, Molecular and Optical Physics. 2006;39:1579-1586. DOI:10.1088/0953-4075/39/7/002.
Esser et al., Convolutional networks for fast, energy-efficient neuromorphic computing. Proceedings of the National Academy of Sciences. 2016:113(41):11441-11446.
Farhat et al., Optical implementation of the Hopfield model. Applied Optics. 1985;24(10):1469-1475.
Feinberg et al., Making memristive neural network accelerators reliable. IEEE International Symposium on High Performance Computer Architecture (HPCA). 2018. pp. 52-65. DOI 10.1109/HPCA.2018.00015.
Fushman et al., Controlled Phase Shifts with a Single Quantum Dot. Science. 2008;320:769772. DOI: 10.1126/science.1154643.
George et al., A programmable and configurable mixed-mode FPAA SoC. IEEE Transactions on Very Large Scale Integration (VLSI) Systems. 2016;24:2253-2261.
Gilmer et al., Neural message passing for quantum chemistry. arXiv preprint arXiv:1704.01212. Jun. 2017. 14 pages.
Golub et al., Calculating the singular values and pseudo-inverse of a matrix. Journal of the Society for Industrial and Applied Mathematics Series B Numerical Analysis. 1965;2(2):205-224.
Graves et al., Hybrid computing using a neural network with dynamic external memory. Nature. 2016;538. 21 pages. DOI:10.1038/nature20101.
Grote et al., First long-term application of squeezed states of light in a gravitational-wave observatory. Physical Review Letter. 2013;110:181101. 5 pages. DOI: 10.1103/PhysRevLett.110.181101.
Gruber et al., Planar-integrated optical vector-matrix multiplier. Applied Optics. 2000;39(29):5367-5373.
Gullans et al., Single-Photon Nonlinear Optics with Graphene Plasmons. Physical Review Letter. 2013;111:247401-1-247401-5. DOI: 10.1103/PhysRevLett.111.247401.
Gunn, CMOS photonics for high-speed interconnects. IEEE Micro. 2006;26:58-66.
Haffner et al., Low-loss plasmon-assisted electro-optic modulator. Nature. 2018;556:483-486. 17 pages. DOI: 10.1038/s41586-018-0031-4.
Halasz et al., Phase diagram of QCD. Physical Review D. 1998;58:096007. 11 pages.
Hamerly et al., Scaling advantages of all-to-all connectivity in physical annealers: the Coherent Ising Machine vs. D-Wave 2000Q. arXiv preprints, May 2018. 17 pages.
Harris et al. Efficient, Compact and Low Loss Thermo-Optic Phase Shifter in Silicon. Optics Express. 2014;22(9);10487-93. DOI:10.1364/OE.22.010487.
Harris et al., Bosonic transport simulations in a large-scale programmable nanophotonic processor. arXiv:1507.03406. 2015. 8 pages.
Harris et al., Integrated source of spectrally filtered correlated photons for large-scale quantum photonic systems. Physical Review X. 2014;4:041047. 10 pages. DOI: 10.1103/PhysRevX.4.041047.

(56) References Cited

OTHER PUBLICATIONS

Harris et al., Linear programmable nanophotonic processors. Optica. 2018;12(5):1623-1631.

Harris et al., Quantum transport simulations in a programmable nanophotonic processor. Nature Photonics. 2017;11:447-452. DOI: 10.1038/NPHOTON.2017.95.

Hinton et al., Reducing the dimensionality of data with neural networks. Science. 2006;313:504-507.

Hochberg et al., Silicon Photonics: The Next Fabless Semiconductor Industry. IEEE Solid-State Circuits Magazine. 2013. pp. 48-58. DOI: 10.1109/MSSC.2012.2232791.

Honerkamp-Smith et al., An introduction to critical points for biophysicists; observations of compositional heterogeneity in lipid membranes. Biochimica et Biophysica Acta (BBA). 2009;1788:53-63. DOI: 10.1016/j.bbamem.2008.09.010.

Hong et al., Measurement of subpicosecond time intervals between two photons by interference. Physical Review Letters. 1987;59(18):2044-2046.

Hopfield et al., Neural computation of decisions in optimization problems. Biological Cybernetics. 1985;52;141-152.

Hopfield, Neural networks and physical systems with emergent collective computational abilities. PNAS. 1982;79:2554-2558. DOI: 10.1073/pnas.79.8.2554.

Horowitz, Computing's energy problem (and what we can do about it). Solid-State Circuits Conference Digest of Technical Papers (ISSCC), 2014 IEEE International. 5 pages.

Horst et al., Cascaded Mach-Zehnder wavelength filters in silicon photonics for low loss and flat pass-band WDM (de-)multiplexing. Optics Express. 2013;21(10):11652-8. DOI:10.1364/OE.21.011652.

Humphreys et al., Linear Optical Quantum Computing in a Single Spatial Mode. Physical Review Letters. 2013;111:150501. 5 pages. DOI: 10.1103/PhysRevLett.111.150501.

Inagaki et al., Large-scale ising spin network based on degenerate optical parametric oscillators. Nature Photonics. 2016;10:415-419. 6 pages. DOI: 10.1038/NPHOTON.2016.68.

Isichenko, Percolation, statistical topography, and trans-port in random media. Reviews of Modern Physics. 1992;64(4):961-1043.

Jaekel et al., Quantum limits in interferometric measurements. Europhysics Letters. 1990;13(4):301-306.

Jalali et al., Silicon Photonics. Journal of Lightwave Technology. 2006;24(12):4600-15. DOI: 10.1109/JLT.2006.885782.

Jia et al., Caffe: Convolutional architecture for fast feature embedding. Proceedings of the 22nd ACM International Conference on Multimedia. Nov. 2014. 4 pages. URL:http://doi.acm.org/10.1145/2647868.2654889.

Jiang et al., A planar ion trapping microdevice with integrated waveguides for optical detection. Optics Express. 2011;19(4):3037-43.

Jonsson, An empirical approach to finding energy efficient ADC architectures. 2011 International Workshop on ADC Modelling, Testing and Data Converter Analysis and Design and IEEE 2011 ADC Forum. 6 pages.

Jouppi et al., In-datacenter performance analysis of a tensor processing unit. Proceeding of Computer Architecture (ISCA). Jun. 2017. 12 pages. URL:https://doi.org/10.1145/3079856.3080246.

Kahn et al., Communications expands its space. Nature Photonics. 2017;11:5-8.

Kardar et al., Dynamic Scaling of Growing Interfaces. Physical Review Letters. 1986;56(9):889-892.

Karpathy, CS231n Convolutional Neural Networks for Visual Recognition. Class notes. 2019. URL:http://cs231n.github.io/ 2 pages. [last accessed Sep. 24, 2019].

Kartalopoulos, Part III Coding Optical Information. Introduction to DWDM Technology. IEEE Press. 2000. pp. 165-166.

Keckler et al., GPUs and the future of parallel computing. IEEE Micro. 2011;31:7-17. DOI: 10.1109/MM.2011.89.

Kieling et al., On photonic Controlled Phase Gates. New Journal of Physics. 2010;12:0133003. 17 pages. DOI: 10.1088/1367-2630/12/1/013003.

Kilper et al., Optical networks come of age. Optics Photonics News. 2014;25:50-57. DOI: 10.1364/OPN.25.9.000050.

Kim et al., A functional hybrid memristor crossbar-array/cmos system for data storage and neuromorphic applications. Nano Letters. 2011;12:389-395.

Kirkpatrick et al., Optimization by simulated annealing. Science. 1983;220(4598):671-680.

Knill et al., A scheme for efficient quantum computation with linear optics. Nature. 2001;409(4652):46-52.

Knill et al., The Bayesian brain: the role of uncertainty in neural coding and computation. Trends in Neurosciences. 2004;27(12):712-719.

Knill, Quantum computing with realistically noisy devices. Nature. 2005;434:39-44.

Kok et al., Linear optical quantum computing with photonic qubits. Reviews of Modern Physics. 2007;79(1):135-174.

Koos et al., Silicon-organic hybrid (SOH) and plasmonic-organic hybrid (POH) integration. Journal of Lightwave Technology. 2016;34(2):256-268.

Koster et al., Flexpoint: An Adaptive Numerical Format for Efficient Training of Deep Neural Networks. arXiv:1711.02213v2. Dec. 5, 2017. 14 pages.

Krizhevsky et al., ImageNet classification with deep convolutional neural networks. Advances in Neural Information Processing Systems (NIPS). 2012. 9 pages.

Kucherenko et al., Application of Deterministic Low-Discrepancy Sequences in Global Optimization. Computational Optimization and Applications. 2005;30:297-318.

Kwack et al., Monolithic InP strictly non-blocking 8×8 switch for high-speed WDM optical interconnection. Optics Express. 2012;20(27):28734-41.

Lahini et al., Anderson Localization and Nonlinearity in One-Dimensional Disordered Photonic Lattices. Physical Review Letters. 2008;100:013906. 4 pages. DOI: 10.1103/PhysRevLett.100.013906.

Lahini et al., Quantum Correlations in Two-Particle Anderson Localization. Physical Review Letters. 2010;105:163905. 4 pages. DOI: 10.1103/PhysRevLett.105.163905.

Laing et al., High-fidelity operation of quantum photonic circuits. Applied Physics Letters. 2010;97:211109. 5 pages. DOI: 10.1063/1.3497087.

Landauer, Irreversibility and heat generation in the computing process. IBM Journal of Research and Development. 1961. pp. 183-191.

Lanyon et al., Towards quantum chemistry on a quantum computer. Nature Chemistry. 2010;2:106-10. DOI: 10.1038/NCHEM.483.

Lawson et al., Basic linear algebra subprograms for Fortran usage. ACM Transactions on Mathematical Software (TOMS). 1979;5(3):308-323.

Lecun et al., Deep learning. Nature. 2015;521:436-444. DOI:10.1038/nature14539.

Lecun et al., Gradient-based learning applied to document recognition. Proceedings of the IEEE. Nov. 1998. 46 pages.

Levi et al., Hyper-transport of light and stochastic acceleration by evolving disorder. Nature Physics. 2012;8:912-7. DOI: 10.1038/NPHYS2463.

Li et al., Efficient and self-adaptive in-situ learning in multilayer memristor neural networks. Nature Communications. 2018;9:2385. 8 pages. doi: 10.1038/s41467-018-04484-2.

Lin et al., All-optical machine learning using diffractive deep neural networks. Science. 2018;361:1004-1008. 6 pages. doi: 10.1126/science.aat8084.

Little, The existence of persistent states in the brain. Mathematical Biosciences. 1974;19:101-120.

Liu et al., Towards 1-Tb/s Per-Channel Optical Transmission Based on Multi-Carrier Modulation. 19th Annual Wireless and Optical Communications Conference. May 2010. 4 pages. DOI: 10.1109/WOCC.2010.5510630.

Lu et al., 16×16 non-blocking silicon optical switch based on electro-optic Mach-Zehnder interferometers. Optics Express. 2016:24(9):9295-9307. doi: 10.1364/OE.24.009295.

(56) References Cited

OTHER PUBLICATIONS

Ma et al., Optical switching technology comparison: Optical mems vs. Other technologies. IEEE Optical Communications. 2003;41(11):S16-S23.

MacReady et al., Criticality and Parallelism in Combinatorial Optimization. Science. 1996;271:56-59.

Marandi et al., Network of time-multiplexed optical parametric oscillators as a coherent Ising machine. Nature Photonics. 2014;8:937-942. doi: 10.1038/NPHOTON.2014.249.

Martin-Lopez et al., Experimental realization of Shor's quantum factoring algorithm using qubit recycling. Nature Photonics. 2012;6:773-6. DOI: 10.1038/NPHOTON.2012.259.

McMahon et al., A fully programmable 100-spin coherent Ising machine with all-to-all connections. Science. 2016;354(6312):614-7. DOI: 10.1126/science.aah5178.

Mead, Neuromorphic electronic systems. Proceedings of the IEEE. 1990;78(10):1629-1636.

Migdall et al., Tailoring single-photon and multiphoton probabilities of a single-photon on-demand source. Physical Review A. 2002;66:053805. 4 pages. DOI: 10.1103/PhysRevA.66.053805.

Mikkelsen et al., Dimensional variation tolerant silicon-on-insulator directional couplers. Optics Express. 2014;22(3):3145-50. DOI:10.1364/OE.22.003145.

Miller, Are optical transistors the logical next step? Nature Photonics. 2010;4:3-5.

Miller, Attojoule optoelectronics for low-energy information processing and communications. Journal of Lightwave Technology. 2017;35(3):346-96. DOI: 10.1109/JLT.2017.2647779.

Miller, Energy consumption in optical modulators for interconnects. Optics Express. 2012;20(S2):A293-A308.

Miller, Perfect optics with imperfect components. Optica. 2015;2(8):747-750.

Miller, Reconfigurable add-drop multiplexer for spatial modes. Optics Express. 2013;21(17):20220-9. DOI:10.1364/OE.21.020220.

Miller, Self-aligning universal beam coupler, Optics Express. 2013;21(5):6360-70.

Miller, Self-configuring universal linear optical component [Invited]. Photonics Research. 2013;1(1):1-15. URL:http://dx.doi.org/10.1364/PRJ.1.000001.

Misra et al., Artificial neural networks in hardware: A survey of two decades of progress. Neurocomputing. 2010;74:239-255.

Mohseni et al., Environment-assisted quantum walks in photosynthetic complexes. The Journal of Chemical Physics. 2008;129:174106. 10 pages. DOI: 10.1063/1.3002335.

Moore, Cramming more components onto integrated circuits. Proceeding of the IEEE. 1998;86(1):82-5.

Mower et al., Efficient generation of single and entangled photons on a silicon photonic integrated chip. Physical Review A. 2011;84:052326. 7 pages. DOI: 10.1103/PhysRevA.84.052326.

Mower et al., High-fidelity quantum state evolution in imperfect photonic integrated circuits. Physical Review A. 2015;92(3):032322. 7 pages. doi: 10.1103/PhysRevA.92.032322.

Nagamatsu et al., A 15 NS 32×32-bit CMOS multiplier with an improved parallel structure. IEEE Custom Integrated Circuits Conference. 1989. 4 pages.

Najafi et al., On-Chip Detection of Entangled Photons by Scalable Integration of Single-Photon Detectors. arXiv:1405.4244. May 16, 2014. 27 pages.

Najafi et al., On-Chip detection of non-classical light by scalable integration of single-photon detectors. Nature Communications. 2015;6:5873. 8 pages. DOI: 10.1038/ncomms6873.

Naruse, Nanophotonic Information Physics. Nanointelligence and Nanophotonic Computing. Springer. 2014. 261 pages. DOI 10.1007/978-3-642-40224-1.

Nozaki et al., Sub-femtojoule all-optical switching using a photonic-crystal nanocavity. Nature Photonics. 2010;4:477-483. doi: 10.1038/NPHOTON.2010.89.

O'Brien et al., Demonstration of an all-optical quantum controlled-NOT gate. Nature. 2003;426:264-7.

Onsager, Crystal Statistics. I. A Two-Dimensional Model with an Order-Disorder Transition. Physical Review. 1944;65(3,4):117-149.

Orcutt et al., Nanophotonic integration in state-of-the-art CMOS foundries. Optics Express. 2011;19(3):2335-46.

Pelissetto et al., Critical phenomena and renormalization-group theory. Physics Reports. Apr. 2002. 150 pages.

Peng, Implementation of AlexNet with Tensorflow. https://github.com/ykpengba/AlexNet-A-Practical-Implementation. 2018. 2 pages. [last accessed Sep. 24, 2019].

Peretto, Collective properties of neural networks: A statistical physics approach. Biological Cybernetics. 1984;50:51-62.

Pernice et al., High-speed and high-efficiency travelling wave single-photon detectors embedded in nanophotonic circuits. Nature Communications 2012;3:1325. 10 pages. DOI: 10.1038/ncomms2307.

Peruzzo et al., Quantum walk of correlated photons. Science. 2010;329;1500-3. DOI: 10.1126/science.1193515.

Politi et al., Integrated Quantum Photonics, IEEE Journal of Selected Topics in Quantum Electronics, 2009;5(6):1-12. DOI: 10.1109/JSTQE.2009.2026060.

Politi et al., Silica-on-Silicon Waveguide Quantum Circuits. Science. 2008;320:646-9. DOI: 10.1126/science.1155441.

Poon et al., Neuromorphic silicon neurons and large-scale neural networks: challenges and opportunities. Frontiers in Neuroscience. 2011;5:1-3. doi: 10.3389/fnins.2011.00108.

Prucnal et al., Recent progress in semiconductor excitable lasers for photonic spike processing. Advances in Optics and Photonics. 2016;8(2):228-299.

Psaltis et al., Holography in artificial neural networks. Nature. 1990;343:325-330.

Qiao et al., 16×16 non-blocking silicon electro-optic switch based on mach zehnder interferometers. Optical Fiber Communication Conference. Optical Society of America. 2016. 3 pages.

Ralph et al., Linear optical controlled-NOT gate in the coincidence basis. Physical Review A. 2002;65:062324-1-062324-5. DOI: 10.1103/PhysRevA.65.062324.

Ramanitra et al., Scalable and multi-service passive optical access infrastructure using variable optical splitters. Optical Fiber Communication Conference. Optical Society of America. 2005. 3 pages.

Raussendorf et al., A one-way quantum computer. Physical Review Letter. 2001;86(22):5188-91. DOI: 10.1103/PhysRevLett.86.5188.

Rechtsman et al., Photonic floquet topological insulators. Nature. 2013;496:196-200. doi: 10.1038/nature12066.

Reck et al., Experimental realization of any discrete unitary operator. Physical review letters. 1994;73(1):58-61. 6 pages.

Reed et al., Silicon optical modulators. Nature Photonics. 2010;4:518-26. DOI: 10.1038/NPHOTON.2010.179.

Rekhi et al., Analog/Mixed-Signal Hardware Error Modeling for Deep Learning Inference. 56th ACM/IEEE Design Automation Conference (DAC). 2019. 6 pages. doi: 10.1145/3316781.3317770.

Rendl et al., Solving Max-Cut to optimality by intersecting semidefinite and polyhedral relaxations. Mathematical Programming. 2010;121:307-335. doi: 10.1007/s10107-008-0235-8.

Rios et al., Integrated all-photonic non-volatile multilevel memory. Nature Photonics. 2015;9:725-732. doi: 10.1038/NPHOTON.2015.182.

Rogalski, Progress in focal plane array technologies. Progress in Quantum Electronics. 2012;36:342-473.

Rohit et al., 8×8 space and wavelength selective cross-connect for simultaneous dynamic multi-wavelength routing. Optical Fiber Communication Conference. OFC/NFOEC Technical Digest. 2013. 3 pages.

Rosenblatt, The perceptron: a probabilistic model for information storage and organization in the brain. Psychological Review. 1958;65(6):386-408.

Russakovsky et al., ImageNet Large Scale Visual Recognition Challenge. arXiv:1409.0575v3. Jan. 2015. 43 pages.

Saade et al., Random projections through multiple optical scattering: Approximating Kernels at the speed of light. arXiv:1510.06664v2. Oct. 25, 2015. 6 pages.

Salandrino et al., Analysis of a three-core adiabatic directional coupler. Optics Communications. 2009;282:4524-6. doi:10.1016/j.optcom.2009.08.025.

(56) References Cited

OTHER PUBLICATIONS

Savich et al., A Low-Power Scalable Stream Compute Accelerator for General Matrix Multiply (GEMM). VLSI Design. 2014. 12 pages. doi: 10.1155/2014/712085.
Schaeff et al., Scalable fiber integrated source for higher-dimensional path-entangled photonic quNits. Optics Express. 2012;20(15):16145-153.
Schirmer et al., Nonlinear mirror based on two-photon absorption. Journal of the Optical Society of America B. 1997;14(11):2865-8.
Schmidhuber, Deep learning in neural networks: An overview. Neural Networks. 2015;61:85-117.
Schreiber et al., Decoherence and Disorder in Quantum Walks: From Ballistic Spread to Localization. Physical Review Letters. 2011;106:180403. 4 pages. DOI: 10.1103/PhysRevLett.106.180403.
Schwartz et al., Transport and Anderson localization in disordered two-dimensional photonic lattices. Nature. 2007;446:52-5. doi:10.1038/nature05623.
Selden, Pulse transmission through a saturable absorber. British Journal of Applied Physics. 1967;18:743-8.
Shafiee et al., ISAAC: A convolutional neural network accelerator with in-situ analog arithmetic in crossbars. ACM/IEEE 43rd Annual International Symposium on Computer Architecture. Oct. 2016. 13 pages.
Shen et al., Deep learning with coherent nanophotonic circuits. Nature Photonics. 2017;11:441-6. DOI: 10.1038/NPHOTON.2017.93.
Shoji et al., Low-crosstalk 2×2 thermo-optic switch with silicon wire waveguides. Optics Express.2010;18(9):9071-5.
Silver et al. Mastering chess and shogi by self-play with a general reinforcement learning algorithm. arXiv preprint arXiv:1712.01815. 19 pages. 2017.
Silver et al., Mastering the game of go with deep neural networks and tree search. Nature. 2016;529:484-9. 20 pages. doi:10.1038/nature16961.
Silver et al., Mastering the game of Go without human knowledge. Nature. 2017;550:354-9. 18 pages. doi:10.1038/nature24270.
Silverstone et al., On-chip quantum interference between silicon photon-pair sources. Nature Photonics. 2014;8:104-8. DOI: 10.1038/NPHOTON.2013.339.
Smith et al., Phase-controlled integrated photonic quantum circuits. Optics Express. 2009;17(16):13516-25.
Soljacic et al., Optimal bistable switching in nonlinear photonic crystals. Physical Review E. 2002;66:055601. 4 pages.
Solli et al., Analog optical computing. Nature Photonics. 2015;9:704-6.
Spring et al., Boson sampling on a photonic chip. Science. 2013;339:798-801. DOI: 10.1126/science.1231692.
Srinivasan et al., 56 Gb/s germanium waveguide electro-absorption modulator. Journal of Lightwave Technology. 2016;34(2):419-24. DOI: 10.1109/JLT.2015.2478601.
Steinkraus et al., Using GPUs for machine learning algorithms. Proceedings of the 2005 Eight International Conference on Document Analysis and Recognition. 2005. 6 pages.
Su et al., Hybrid spatiotemporal architectures for universal linear optics. arXiv:1812.07939v2. Jun. 3, 2019. 8 pages.
Suda et al., Quantum interference of photons in simple networks. Quantum Information Process. 2013;12:1915-45. DOI 10.1007/s11128-012-0479-3.
Sun et al., Large-scale nanophotonic phased array. Nature. 2013;493:195-9. doi:10.1038/nature11727.
Sun et al., Single-chip microprocessor that communicates directly using light. Nature. 2015;528:534-8. doi:10.1038/nature16454.

Suzuki et al., Ultra-compact 8×8 strictly-non-blocking Si-wire PILOSS switch. Optics Express. 2014;22(4):3887-94. DOI:10.1364/OE.22.003887.
Sze et al., Efficient processing of deep neural networks: A tutorial and survey. Proceedings of the IEEE. 2017;105(12):2295-2329. DOI: 10.1109/JPROC.2017.276174.
Tabia, Experimental scheme for qubit and qutrit symmetric informationally complete positive operator-valued measurements using multiport devices. Physical Review A. 2012;86:062107. 8 pages. DOI: 10.1103/PhysRevA.86.062107.
Tait et al., Broadcast and weight: An integrated network for scalable photonic spike processing. Journal of Lightwave Technology. 2014;32(21):3427-39. DOI: 10.1109/JLT.2014.2345652.
Tait et al., Chapter 8 Photonic Neuromorphic Signal Processing and Computing. Springer, Berlin, Heidelberg. 2014. pp. 183-222.
Tait et al., Neuromorphic photonic networks using silicon photonic weight banks. Scientific Reports. 2017;7:7430. 10 pages.
Tanabe et al., Fast bistable all-optical switch and memory on a silicon photonic crystal on-chip. Optics Letters. 2005;30(19):2575-7.
Tanizawa et al., Ultra-compact 32×32 strictly-non-blocking Si-wire optical switch with fan-out LGA interposer. Optics Express. 2015;23(13):17599-606. DOI:10.1364/OE.23.017599.
Thompson et al., Integrated waveguide circuits for optical quantum computing. IET Circuits, Devices, & Systems. 2011;5(2):94-102. doi: 10.1049/iet-cds.2010.0108.
Timurdogan et al., An ultralow power athermal silicon modulator. Nature Communications. 2014;5:4008. 11 pages. DOI: 10.1038/ncomms5008.
Vandoorne et al., Experimental demonstration of reservoir computing on a silicon photonics chip. Nature Communications. 2014;5:3541. 6 pages. DOI: 10.1038/ncomms4541.
Vazquez et al., Optical NP problem solver on laser-written waveguide plat-form. Optics Express. 2018;26(2):702-10.
Vivien et al., Zero-bias 40gbit/s germanium waveguide photodetector on silicon. Optics Express. 2012;20(2):1096-1101.
Wang et al., Coherent Ising machine based on degenerate optical parametric oscillators. Physical Review A. 2013;88:063853. 9 pages. DOI: 10.1103/PhysRevA.88.063853.
Wang et al., Deep learning for identifying metastatic breast cancer. arXiv preprint arXiv:1606.05718. Jun. 18, 2016. 6 pages.
Werbos, Beyond regression: New tools for prediction and analysis in the behavioral sciences. Ph.D. dissertation, Harvard University. Aug. 1974. 454 pages.
Whitfield et al., Simulation of electronic structure Hamiltonians using quantum computers. Molecular Physics. 2010;109(5,10):735-50. DOI: 10.1080/00268976.2011.552441.
Wu et al., An optical fiber network oracle for NP-complete problems. Light: Science & Applications. 2014;3: e147. 5 pages. doi:10.1038/lsa.2014.28.
Xia et al., Mode conversion losses in silicon-on-insulator photonic wire based racetrack resonators. Optics Express. 2006;14(9):3872-86.
Xu et al., Experimental observations of bistability and instability in a two-dimensional nonlinear optical superlattice. Physical Review Letters. 1993;71(24):3959-62.
Yang et al., Non-Blocking 4×4 Electro-Optic Silicon Switch for On-Chip Photonic Networks. Optics Express 2011;19(1):47-54.
Yao et al., Serial-parallel multipliers. Proceedings of 27th Asilomar Conference on Signals, Systems and Computers. 1993. pp. 359-363.
Young et al., Recent trends in deep learning based natural language processing. IEEE Computational Intelligence Magazine. arXiv:1708.02709v8. Nov. 2018. 32 pages.
Zhou et al., Calculating Unknown Eigenvalues with a Quantum Algorithm. Nature Photonics. 2013;7:223-8. DOI: 10.1038/NPHOTON.2012.360.
Invitation to Pay Additional Fees for International Application No. PCT/US2020/019747 dated Apr. 30, 2020.

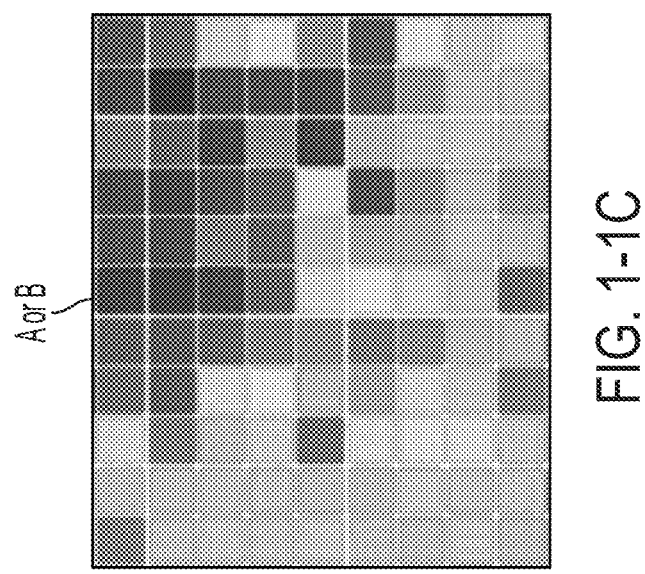

| A |  |  |  | | B |  |  | | C |  |  |
|---|---|---|---|---|---|---|---|---|---|---|---|
| $a_{11}$ | $a_{12}$ | $a_{13}$ | $a_{14}$ | | $b_{11}$ | $b_{12}$ | $b_{13}$ | | $c_{11}$ | $c_{12}$ | $c_{13}$ |
| $a_{21}$ | $a_{22}$ | $a_{23}$ | $a_{24}$ | | $b_{21}$ | $b_{22}$ | $b_{23}$ | | $c_{21}$ | $c_{22}$ | $c_{23}$ |
| $a_{31}$ | $a_{32}$ | $a_{33}$ | $a_{34}$ | | $b_{31}$ | $b_{32}$ | $b_{33}$ | | $c_{31}$ | $c_{32}$ | $c_{33}$ |
| $a_{41}$ | $a_{42}$ | $a_{43}$ | $a_{44}$ | | $b_{41}$ | $b_{42}$ | $b_{43}$ | | $c_{41}$ | $c_{42}$ | $c_{43}$ |

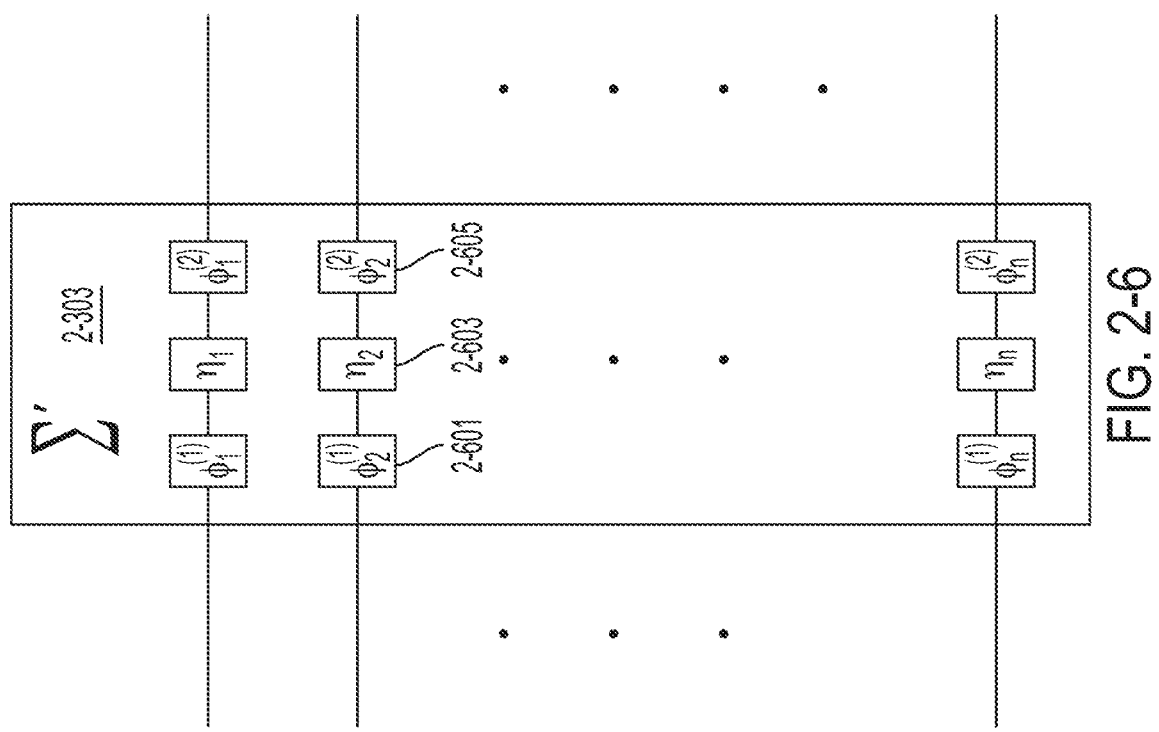

HYBRID ANALOG-DIGITAL MATRIX PROCESSORS

CROSS-REFERENCE TO RELATED APPLICATIONS

This application claims priority under 35 U.S.C. § 119(e) to U.S. Provisional Patent Application Ser. No. 62/810,851, entitled "GENERAL MATRIX MULTIPLICATION WITH SUB-ARRAY TILING AND MULTIPLE SCALING FOR HYBRID ANALOG-DIGITAL MATRIX PROCESSORS," filed on Feb. 26, 2019, which is hereby incorporated herein by reference in its entirety.

FIELD OF INVENTION

This disclosure relates hybrid analog-digital processors configured to perform mathematical matrix operations.

BACKGROUND

Deep learning, machine learning, latent-variable models, neural networks and other matrix-based differentiable programs are used to solve a variety of problems, including natural language processing and object recognition in images. Solving these problems with deep neural networks typically requires long processing times to perform the required computation. The most computationally intensive operations in solving these problems are often mathematical matrix operations, such as general matrix multiplication or multi-channel convolution. The conventional approach to speed up deep learning algorithms has been to develop specialized hardware architectures. This is because conventional computer processors, e.g., central processing units (CPUs), which are composed of circuits including hundreds of millions of transistors to implement logical gates on bits of information represented by electrical signals, are designed for general purpose computing and are therefore not optimized for the particular patterns of data movement and computation required by the algorithms that are used in deep learning and other matrix-based differentiable programs. One conventional example of specialized hardware for use in deep learning are graphics processing units (GPUs) having a highly parallel architecture that makes them more efficient than CPUs for performing image processing and graphical manipulations. After their development for graphics processing, GPUs were found to be more efficient than CPUs for other parallelizable algorithms, such as those used in neural networks and deep learning.

Deep learning using neural networks conventionally requires two stages: a training stage and an evaluation stage (sometimes referred to as "inference"). Before a deep learning algorithm can be meaningfully executed on a processor, e.g., to classify an image or speech sample, during the evaluation stage, the neural network must first be trained. The training stage can be time consuming and requires intensive computation.

SUMMARY

Some embodiments relate to a hybrid analog-digital processor comprising: circuitry comprising an analog processor, wherein the circuitry is configured to perform a mathematical operation using a plurality of passes, wherein for each of the plurality of passes, the circuitry is configured to: determine one or more scaling factors for the pass based on a set of parameters representing a portion of a matrix; scale at least some parameters of the set of parameters based on the one or more scaling factors to produce a scaled set of parameters; program the analog processor based on the scaled set of parameters; generate a plurality of input analog signals based on an input data set; generate a plurality of output analog signals based on the plurality of input analog signals and the scaled set of parameters; generate a partial output data set based on the plurality of output analog signals; and scale the partial output data set based on the one or more scaling factors to produce a scaled partial output data set, wherein the circuitry is further configured to generate an accumulated output data set by accumulating the scaled partial output data sets generated by at least two of the plurality of passes, wherein the accumulated output data set represents a result of the mathematical operation.

In some embodiments, generating a plurality of output analog signals based on the plurality of input analog signals and the scaled set of parameters comprises performing a matrix-matrix multiplication based on the plurality of input analog signals and the scaled set of parameters.

In some embodiments, generating a plurality of output analog signals based on the plurality of input analog signals and the scaled set of parameters comprises performing a convolution based on the plurality of input analog signals and the scaled set of parameters.

In some embodiments, programming the analog processor based on the scaled set of parameters comprises setting respective gains or attenuations for a plurality of analog amplifiers or attenuators of the analog processor based on the scaled set of parameters.

In some embodiments, the analog processor comprises a photonic processor comprising a plurality of programmable photonic devices, and wherein programming the analog processor based on the scaled set of parameters comprises setting respective characteristics for the plurality of programmable photonic devices based on the scaled set of parameters.

In some embodiments, the programmable photonic devices comprise Mach-Zehnder interferometers, and wherein setting respective characteristics for the plurality of programmable photonic devices based on the scaled set of parameters comprises: setting respective optical characteristics for the plurality of Mach-Zehnder interferometers based on the scaled set of parameters.

In some embodiments, the programmable photonic devices comprise optical resonators, and wherein setting respective characteristics for the plurality of programmable photonic devices based on the scaled set of parameters comprises: setting respective optical characteristics for the plurality of optical resonators based on the scaled set of parameters.

In some embodiments, the circuitry comprises a plurality of digital-to-analog converters (DACs), and the plurality of DACs are configured to generate the plurality of input analog signals based on the input data set.

In some embodiments, the circuitry comprises a plurality of analog-to-digital converters (ADCs), and the plurality of ADCs are configured to generate the partial output data set based on the plurality of output analog signals.

In some embodiments, the plurality of ADCs comprise n-bit ADCs, with n equal to or less than 12.

In some embodiments, accumulating the scaled partial output data sets generated by at least two of the plurality of passes comprises: for at least some of the passes, summing the scaled partial output data set generated by the pass with the scaled partial output data set generated by a previous pass.

In some embodiments, programming the analog processor comprises: programming, based on the scaled set of parameters, the analog processor with a plurality of matrices that, collectively, represent an arbitrary matrix.

In some embodiments, programming the analog processor with a plurality of matrices comprises: programming, based on the scaled set of parameters, the analog processor with a plurality of matrices that, collectively, represent the arbitrary matrix based on a singular value decomposition (SVD) of the arbitrary matrix.

In some embodiments, programming the analog processor with a plurality of matrices comprises: programming, based on the scaled set of parameters, the analog processor with a plurality of matrices that, collectively, represent the arbitrary matrix based on a dilation of the arbitrary matrix.

In some embodiments, scaling at least some of the set of parameters based on the one or more scaling factors comprises dividing at least some of the set of parameters by the one or more scaling factors, and scaling the partial output data set based on the one or more scaling factors comprises multiplying the partial output data set by the one or more scaling factors.

In some embodiments, for each of the plurality of passes, the circuitry is further configured to determine the one or more scaling factors based on a tile of the matrix that is associated with the pass.

In some embodiments, for each of the plurality of passes, the circuitry is further configured to determine the one or more scaling factors based on one or more rows of the matrix.

In some embodiments, for each of the plurality of passes, the circuitry is further configured to determine the one or more scaling factors based on one or more singular values of the matrix.

In some embodiments, the one or more scaling factors comprise a first scaling factor and a second scaling factor, and scaling at least some parameters of the set of parameters based on the one or more scaling factors comprises: scaling a first subset of the set of parameters based on the first scaling factor, and scaling a second subset of the set of parameters based on the second scaling factor.

Some embodiments relate to a method for performing a mathematical operation using a plurality of passes through an analog processor, the method comprising: for each of the plurality of passes: determining one or more scaling factors for the pass based on a set of parameters representing a portion of a matrix; scaling at least some parameters of the set of parameters based on the one or more scaling factors to produce a scaled set of parameters; programming the analog processor based on the scaled set of parameters; generating a plurality of input analog signals based on an input data set; generating a plurality of output analog signals based on the plurality of input analog signals and the scaled set of parameters; generating a partial output data set based on the plurality of output analog signals; and scaling the partial output data set based on the one or more scaling factors to produce a scaled partial output data set; and generating an accumulated output data set by accumulating the scaled partial output data sets generated by at least two of the plurality of passes, wherein the accumulated output data set represents a result of the mathematical operation.

In some embodiments, generating a plurality of output analog signals based on the plurality of input analog signals and the scaled set of parameters comprises performing a matrix-matrix multiplication based on the plurality of input analog signals and the scaled set of parameters.

In some embodiments, generating a plurality of output analog signals based on the plurality of input analog signals and the scaled set of parameters comprises performing a convolution based on the plurality of input analog signals and the scaled set of parameters.

In some embodiments, programming the analog processor based on the scaled set of parameters comprises setting respective gains or attenuations for a plurality of analog amplifiers or attenuators of the analog processor based on the scaled set of parameters.

In some embodiments, the analog processor comprises a photonic processor comprising a plurality of programmable photonic devices, and wherein programming the analog processor based on the scaled set of parameters comprises setting respective characteristics for the plurality of programmable photonic devices based on the scaled set of parameters.

In some embodiments, the programmable photonic devices comprise Mach-Zehnder interferometers, and wherein setting respective characteristics for the plurality of programmable photonic devices based on the scaled set of parameters comprises: setting respective optical characteristics for the plurality of Mach-Zehnder interferometers based on the scaled set of parameters.

In some embodiments, the programmable photonic devices comprise optical resonators, and wherein setting respective characteristics for the plurality of programmable photonic devices based on the scaled set of parameters comprises: setting respective optical characteristics for the plurality of optical resonators based on the scaled set of parameters.

In some embodiments, generating the plurality of input analog signals based on the input data set comprises providing the input data set as input to a plurality of digital-to-analog converters (DACs).

In some embodiments, generating the partial output data set based on the plurality of output analog signals the circuitry comprises providing the plurality of output analog signals as inputs to a plurality of analog-to-digital converters (ADCs).

In some embodiments, the plurality of ADCs comprise n-bit ADCs, with n equal to or less than 12.

In some embodiments, accumulating the scaled partial output data sets generated by at least two of the plurality of passes comprises: for at least some of the passes, summing the scaled partial output data set generated by the pass with the scaled partial output data set generated by a previous pass.

In some embodiments, programming the analog processor comprises: programming, based on the scaled set of parameters, the analog processor with a plurality of matrices that, collectively, represent an arbitrary matrix.

In some embodiments, programming the analog processor with a plurality of matrices comprises: programming, based on the scaled set of parameters, the analog processor with a plurality of matrices that, collectively, represent the arbitrary matrix based on a singular value decomposition (SVD) of the arbitrary matrix.

In some embodiments, programming the analog processor with a plurality of matrices comprises: programming, based on the scaled set of parameters, the analog processor with a plurality of matrices that, collectively, represent the arbitrary matrix based on a dilation of the arbitrary matrix.

In some embodiments, scaling at least some of the set of parameters based on the one or more scaling factors comprises dividing at least some of the set of parameters by the one or more scaling factors, and scaling the partial output data set based on the one or more scaling factors comprises multiplying the partial output data set by the one or more scaling factors.

In some embodiments, determining the one or more scaling factors comprises determining the one or more scaling factors based on a tile of the matrix that is associated with the pass.

In some embodiments, determining the one or more scaling factors comprises determining the one or more scaling factors based on one or more rows of the matrix.

In some embodiments, determining the one or more scaling factors comprises determining the one or more scaling factor based on one or more singular values of the matrix.

In some embodiments, the one or more scaling factors comprise a first scaling factor and a second scaling factor, and scaling at least some parameters of the set of parameters based on the one or more scaling factors comprises: scaling a first subset of the set of parameters based on the first scaling factor, and scaling a second subset of the set of parameters based on the second scaling factor.

Some embodiments relate to a hybrid analog-digital processor comprising: a digital-to-analog converter (DAC) unit comprising a plurality of DACs; an analog processor arranged to perform matrix-matrix multiplication and coupled to outputs of the DAC unit; an analog-to-digital (ADC) unit comprising a plurality of ADCs and coupled to outputs of the analog processor; a digital scaling unit coupled to outputs of the ADC unit; and a digital accumulator coupled to outputs of the digital scaling unit, wherein the digital accumulator comprises a memory unit and a digital adder.

In some embodiments, the hybrid analog-digital processor further comprises an amplification or attenuation unit coupled between the DAC unit and the ADC unit.

In some embodiments, the analog processor comprises a photonic processor comprising a plurality of programmable photonic devices.

In some embodiments, the programmable photonic devices comprise Mach-Zehnder interferometers.

In some embodiments, the programmable photonic devices comprise optical resonators.

In some embodiments, the analog processor is programmed with a plurality of matrices that, collectively, represent an arbitrary matrix.

In some embodiments, the plurality of matrices collectively represent the arbitrary matrix based on a singular value decomposition (SVD) of the arbitrary matrix.

In some embodiments, the plurality of matrices collectively represent the arbitrary matrix based on a dilation of the arbitrary matrix.

Some embodiments relate to a hybrid analog-digital processor configured to perform a mathematical operation, comprising: circuitry comprising an analog processor and an analog scaling unit, wherein the circuitry is configured to: generate a plurality of input analog signals based on an input data set; set a gain of the analog scaling unit based on a scaling factor; program the analog processor with a set of parameters representing a matrix; generate a plurality of output analog signals based on the plurality of input analog signals and the set of parameters; generate a plurality of amplified output analog signals by amplifying, using the analog scaling unit, the plurality of input analog signals and/or the plurality of output analog signals; and generate an output data set based on the plurality of amplified output analog signals.

In some embodiments, the analog scaling unit comprises an analog amplifier or attenuator.

In some embodiments, the hybrid analog-digital processor is further configured to perform a multi-pass computation based on the mathematical operation, wherein the circuitry is further configured to: set the gain of the analog scaling unit to a first value during a first pass of the multi-pass computation; and set the gain of the analog scaling unit to a second value, different from the first value, during a second pass of the multi-pass computation.

In some embodiments, generating a plurality of output analog signals based on the plurality of input analog signals and the set of parameters comprises performing a matrix-matrix multiplication based on the plurality of input analog signals and the set of parameters.

In some embodiments, generating a plurality of output analog signals based on the plurality of input analog signals and the set of parameters comprises performing a convolution based on the plurality of input analog signals and the set of parameters.

In some embodiments, the circuitry comprises a plurality of analog-to-digital converters (ADCs), and the plurality of ADCs are configured to generate the output data set based on the plurality of output analog signals.

In some embodiments, the plurality of ADCs comprise n-bit ADCs, with n equal to or less than 12.

In some embodiments, programming the analog processor comprises: programming, based on the set of parameters, the analog processor with a plurality of matrices that, collectively, represent an arbitrary matrix.

In some embodiments, programming the analog processor with a plurality of matrices comprises: programming, based on the set of parameters, the analog processor with a plurality of matrices that, collectively, represent the arbitrary matrix based on a singular value decomposition (SVD) of the arbitrary matrix.

In some embodiments, programming the analog processor with a plurality of matrices comprises: programming, based on the scaled set of parameters, the analog processor with a plurality of matrices that, collectively, represent the arbitrary matrix based on a dilation of the arbitrary matrix.

In some embodiments, the circuitry is further configured to determine the scaling factor based on the set of parameters and the input data set.

In some embodiments, determining the scaling factor comprises determining the scaling factor based on statistics bounds on the set of parameters and statistical bounds on the input data set.

Some embodiments relate to a method for performing a mathematical operation, the method comprising: generating a plurality of input analog signals based on an input data set; setting a gain of an analog scaling unit based on a scaling factor; programming an analog processor with a set of parameters representing a matrix; generating a plurality of output analog signals based on the plurality of input analog signals and the set of parameters; generating a plurality of amplified output analog signals by amplifying, using the analog scaling unit, the plurality of input analog signals and/or the plurality of output analog signals; and generating an output data set based on the plurality of amplified output analog signals.

In some embodiments, the analog scaling unit comprises an analog amplifier or attenuator.

In some embodiments, the hybrid analog-digital processor is further configured to perform a multi-pass computation based on the mathematical operation, wherein the circuitry is further configured to: set the gain of the analog scaling unit to a first value during a first pass of the multi-pass computation; and set the gain of the analog scaling unit to a second value, different from the first value, during a second pass of the multi-pass computation.

In some embodiments, generating a plurality of output analog signals based on the plurality of input analog signals and the set of parameters comprises performing a matrix-matrix multiplication based on the plurality of input analog signals and the set of parameters.

In some embodiments, generating a plurality of output analog signals based on the plurality of input analog signals and the set of parameters comprises performing a convolution based on the plurality of input analog signals and the set of parameters.

In some embodiments, the circuitry comprises a plurality of analog-to-digital converters (ADCs), and the plurality of ADCs are configured to generate the output data set based on the plurality of output analog signals.

In some embodiments, the plurality of ADCs comprise n-bit ADCs, with n equal to or less than 12.

In some embodiments, programming the analog processor comprises: programming, based on the set of parameters, the analog processor with a plurality of matrices that, collectively, represent an arbitrary matrix.

In some embodiments, programming the analog processor with a plurality of matrices comprises: programming, based on the set of parameters, the analog processor with a plurality of matrices that, collectively, represent the arbitrary matrix based on a singular value decomposition (SVD) of the arbitrary matrix.

In some embodiments, programming the analog processor with a plurality of matrices comprises: programming, based on the scaled set of parameters, the analog processor with a plurality of matrices that, collectively, represent the arbitrary matrix based on a dilation of the arbitrary matrix.

In some embodiments, the method further comprises determining the scaling factor based on the set of parameters and the input data set.

In some embodiments, determining the scaling factor comprises determining the scaling factor based on statistics bounds on the set of parameters and statistical bounds on the input data set.

Some embodiments relate to a hybrid analog-digital processor comprising: circuitry comprising a photonic processor, wherein the circuitry is configured to perform a mathematical operation using a plurality of passes, wherein for each of the plurality of passes, the circuitry is configured to: determine one or more scaling factors for the pass based on a set of parameters representing a portion of a matrix; scale at least some parameters of the set of parameters based on the one or more scaling factors to produce a scaled set of parameters; program the photonic processor based on the scaled set of parameters; generate a plurality of input optical signals based on an input data set; generate a plurality of output optical signals based on the plurality of input optical signals and the scaled set of parameters; generate a partial output data set based on the plurality of output optical signals; and scale the partial output data set based on the one or more scaling factors to produce a scaled partial output data set, wherein the circuitry is further configured to generate an accumulated output data set by accumulating the scaled partial output data sets generated by at least two of the plurality of passes, wherein the accumulated output data set represents a result of the mathematical operation.

In some embodiments, the photonic processor comprises a plurality of programmable photonic devices, and wherein programming the analog processor based on the scaled set of parameters comprises setting respective characteristics for the plurality of programmable photonic devices based on the scaled set of parameters.

In some embodiments, the programmable photonic devices comprise optical resonators, and wherein setting respective characteristics for the plurality of programmable photonic devices based on the scaled set of parameters comprises: setting respective optical characteristics for the plurality of optical resonators based on the scaled set of parameters.

In some embodiments, the optical resonators comprise optical ring or disk resonators, and wherein setting the respective optical characteristics for the plurality of optical resonators comprises: setting respective resonant frequencies for the plurality of optical ring or disk resonators based on the scaled set of parameters.

In some embodiments, the programmable photonic devices comprise Franz-Keldysh modulators, and wherein setting respective characteristics for the plurality of programmable photonic devices based on the scaled set of parameters comprises: setting respective absorptions for the plurality of Franz-Keldysh modulators based on the scaled set of parameters.

In some embodiments, the photonic processor comprises: a first array of interconnected variable beam splitters (VBSs) comprising a first plurality of optical inputs and a first plurality of optical outputs; a second array of interconnected VBSs comprising a second plurality of optical inputs and a second plurality of optical outputs; and a plurality of controllable optical elements, each of the plurality of these controllable optical elements coupling a single one of the first plurality of optical outputs of the first array to a respective single one of the second plurality of optical inputs of the second array.

In some embodiments, programming the photonic processor based on the scaled set of parameters comprises programing the plurality of controllable optical elements based on the scaled set of parameters.

In some embodiments, each of the VBSs of the first and second array comprises a Mach-Zehnder interferometer comprising: a first beam splitter;
a second beam splitter; and at least one phase modulator configured to modulate a phase of light of an optical mode that couples the first beam splitter and the second beam splitter.

In some embodiments, each of the controllable optical elements comprises a variable attenuator and at least one phase modulator.

In some embodiments, generating a plurality of output optical signals based on the plurality of input optical signals and the scaled set of parameters comprises performing a matrix-matrix multiplication based on the plurality of input optical signals and the scaled set of parameters.

In some embodiments, programming the photonic processor comprises: programming, based on the scaled set of parameters, the photonic processor with a plurality of matrices that, collectively, represent an arbitrary matrix.

Some embodiments relate to a hybrid analog-digital processor comprising: a digital-to-analog converter (DAC) unit comprising a plurality of DACs; a photonic processor arranged to perform matrix-matrix multiplication and coupled to outputs of the DAC unit; an analog-to-digital (ADC) unit comprising a plurality of ADCs and coupled to outputs of the photonic processor; a digital scaling unit coupled to outputs of the ADC unit; and a digital accumulator coupled to outputs of the digital scaling unit, wherein the digital accumulator comprises a memory unit and a digital adder.

In some embodiments, the hybrid analog-digital processor further comprises an optical amplification or attenuation unit coupled between the DAC unit and the ADC unit.

In some embodiments, the photonic processor comprises a plurality of optical resonators.

In some embodiments, the photonic processor comprises a first array of interconnected variable beam splitters (VBSs) comprising a first plurality of optical inputs and a first plurality of optical outputs; a second array of interconnected VBSs comprising a second plurality of optical inputs and a second plurality of optical outputs; and a plurality of controllable optical elements, each of the plurality of these controllable optical elements coupling a single one of the first plurality of optical outputs of the first array to a respective single one of the second plurality of optical inputs of the second array.

In some embodiments, the photonic processor is programmed with a plurality of matrices that, collectively, represent an arbitrary matrix.

Some embodiments relate to a hybrid analog-digital processor configured to perform a mathematical operation, comprising circuitry comprising a photonic processor and at least one amplifier, wherein the circuitry is configured to: generate a plurality of input analog signals based on an input data set; set respective a gain of the at least one amplifier based on a scaling factor; program the photonic processor with a set of parameters representing a matrix; generate a plurality of output optical signals based on the plurality of input optical signals and the set of parameters; generate a plurality of output analog signals based on the plurality of output optical signals; generate a plurality of amplified output signals by amplifying, using the at least one amplifier, at least one among the plurality of input optical signals, the plurality of output optical signals and the plurality of output analog signals; and generate an output data set based on the plurality of amplified output signals.

In some embodiments, the at least one amplifier comprises an optical amplifier and an electronic amplifier, wherein amplifying, using the at least one amplifier, at least one among the plurality of input optical signals, the plurality of output optical signals and the plurality of output analog signals comprises: amplifying the plurality of input optical signals with the optical amplifier; and amplifying the plurality of output analog signals with the electronic amplifier.

In some embodiments, the at least one amplifier comprises a laser, and wherein setting the gain of the amplifier comprises setting a gain of the laser.

In some embodiments, the hybrid analog-digital processor is further configured to perform a multi-pass computation based on the mathematical operation, wherein the circuitry is further configured to: set the gain of the at least one amplifier to a first value during a first pass of the multi-pass computation; and set the gain of the at least one amplifier to a second value, different from the first value, during a second pass of the multi-pass computation.

In some embodiments, generating a plurality of output analog signals based on the plurality of input analog signals and the set of parameters comprises performing a matrix-matrix multiplication based on the plurality of input analog signals and the set of parameters.

In some embodiments, generating a plurality of output analog signals based on the plurality of input analog signals and the set of parameters comprises performing a convolution based on the plurality of input analog signals and the set of parameters.

In some embodiments, the photonic processor comprises a plurality of optical resonators.

In some embodiments, the photonic processor comprises: a first array of interconnected variable beam splitters (VBSs) comprising a first plurality of optical inputs and a first plurality of optical outputs; a second array of interconnected VBSs comprising a second plurality of optical inputs and a second plurality of optical outputs; and a plurality of controllable optical elements, each of the plurality of these controllable optical elements coupling a single one of the first plurality of optical outputs of the first array to a respective single one of the second plurality of optical inputs of the second array.

In some embodiments, programming the analog processor comprises: programming, based on the set of parameters, the analog processor with a plurality of matrices that, collectively, represent an arbitrary matrix.

In some embodiments, programming the analog processor with a plurality of matrices comprises: programming, based on the set of parameters, the analog processor with a plurality of matrices that, collectively, represent the arbitrary matrix based on a singular value decomposition (SVD) of the arbitrary matrix.

In some embodiments, programming the analog processor with a plurality of matrices comprises: programming, based on the scaled set of parameters, the analog processor with a plurality of matrices that, collectively, represent the arbitrary matrix based on a dilation of the arbitrary matrix.

In some embodiments, the circuitry is further configured to determine the scaling factor based on the set of parameters and the input data set.

In some embodiments, determining the scaling factor comprises determining the scaling factor based on statistics bounds on the set of parameters and statistical bounds on the input data set.

Some embodiments relate to a method of manufacturing a hybrid analog-digital processor comprising: forming a digital-to-analog converter (DAC) unit comprising a plurality of DACs; forming a photonic processor arranged to perform matrix-matrix multiplication and coupled to outputs of the DAC unit; forming an analog-to-digital (ADC) unit comprising a plurality of ADCs and coupled to outputs of the photonic processor; forming a digital scaling unit coupled to outputs of the ADC unit; and forming a digital accumulator coupled to outputs of the digital scaling unit, wherein the digital accumulator comprises a memory unit and a digital adder.

In some embodiments, forming the photonic processor and forming the digital accumulator comprises forming the photonic processor and the digital accumulator on a common chip.

In some embodiments, forming the photonic processor and forming the digital accumulator comprises: forming the photonic processor on a first chip; forming the digital accumulator on a second chip; and bonding the first chip to the second chip.

In some embodiments, forming the ADC unit comprises forming a plurality of n-bit ADCs, where n is less than or equal to 12.

BRIEF DESCRIPTION OF THE DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

FIG. 1-1B depicts how a sub-portion of the matrix of FIG. 1-1A can be computed, in accordance with some embodiments.

FIG. 1-1C is a heat map illustrating a distribution of numerical values of an input matrix, in accordance with some embodiments.

FIG. 1-2A is a block diagram illustrating a hybrid analog-digital matrix processor, in accordance with some embodiments.

FIG. 1-2B is a diagram illustrating a matrix multiplication, in accordance with some embodiments.

FIG. 1-2C is a diagram illustrating a matrix multiplication performed using tiling, in accordance with some embodiments.

FIG. 1-3 is a flowchart illustrating a method for processing information using a hybrid analog-digital matrix processor, in accordance with some embodiments.

FIG. 1-4A is a diagram illustrating a matrix multiplication performed using tiling and scaling based on tile factors, in accordance with some embodiments.

FIG. 1-4B is a diagram illustrating a matrix multiplication performed using tiling and scaling based on tile row factors, in accordance with some embodiments.

FIG. 1-4C is a diagram illustrating another matrix multiplication performed using tiling and scaling based on tile factors, in accordance with some embodiments.

FIG. 1-4D is a diagram illustrating another matrix multiplication performed using tiling and scaling based on tile row factors, in accordance with some embodiments.

FIG. 1-5A is a diagram illustrating a matrix factorized based on singular value decomposition, in accordance with some embodiments.

FIG. 1-5B is a block diagram illustrating an example of a digital accumulator receiving n vector elements, in accordance with some embodiments.

FIG. 1-6A is a plot illustrating an output signal distribution in relation to the dynamic range of an analog processor, in accordance with some embodiments.

FIG. 1-6B is a diagram illustrating the effect of varying gain on the digital representation of data that is digitized from an analog signal, in accordance with some embodiments.

FIG. 1-7A is a block diagram illustrating another hybrid analog-digital matrix processor, in accordance with some embodiments.

FIG. 1-7B is a block diagram illustrating a plurality of analog scaling units, in accordance with some embodiments.

FIG. 1-8 is a flowchart illustrating another method for processing information using a hybrid analog-digital matrix processor, in accordance with some embodiments.

FIG. 1-9A is a plot illustrating the accuracy of a neural network computation as a function of a gain, in accordance with some embodiments.

FIG. 1-9B is a plot illustrating a mean square error in component portions of a neural network computation as a function of gain, in accordance with some embodiments.

FIG. 1-10 is a block diagram illustrating another hybrid analog-digital matrix processor, in accordance with some embodiments.

FIG. 1-11 is a flowchart illustrating another method for processing information using a hybrid analog-digital matrix processor, in accordance with some embodiments.

FIG. 1-12 is a block diagram illustrating a photonic hybrid analog-digital matrix processor, in accordance with some embodiments.

FIG. 2-1 is a schematic diagram of a photonic processing system, in accordance with some embodiments.

FIG. 2-2 is a schematic diagram of an optical encoder, in accordance with some embodiments.

FIG. 2-3 is a schematic diagram of a photonic processor, in accordance with some embodiments.

FIG. 2-4 is a schematic diagram of an interconnected variable beam splitter array, in accordance with some embodiments.

FIG. 2-5 is a schematic diagram of a variable beam splitter, in accordance with some embodiments.

FIG. 2-6 is a schematic diagram of an attenuation and phase shifting implementation that may be used to represent a diagonal matrix acting on n optical modes, in accordance with some embodiments.

FIG. 2-7 is a schematic diagram of an optical attenuator, in accordance with some embodiments.

FIG. 2-8 is a schematic diagram of an optical power tree, in accordance with some embodiments.

FIG. 2-9 is a schematic diagram of an optical receiver, in accordance with some non-limiting embodiments, in accordance with some embodiments.

FIG. 2-10 is a schematic diagram of a homodyne detector, in accordance with some non-limiting embodiments, in accordance with some embodiments.

FIG. 2-11 is a schematic diagram of a folded photonic processing system, in accordance with some embodiments.

DETAILED DESCRIPTION

I. Overview

Figures 1, 1A:
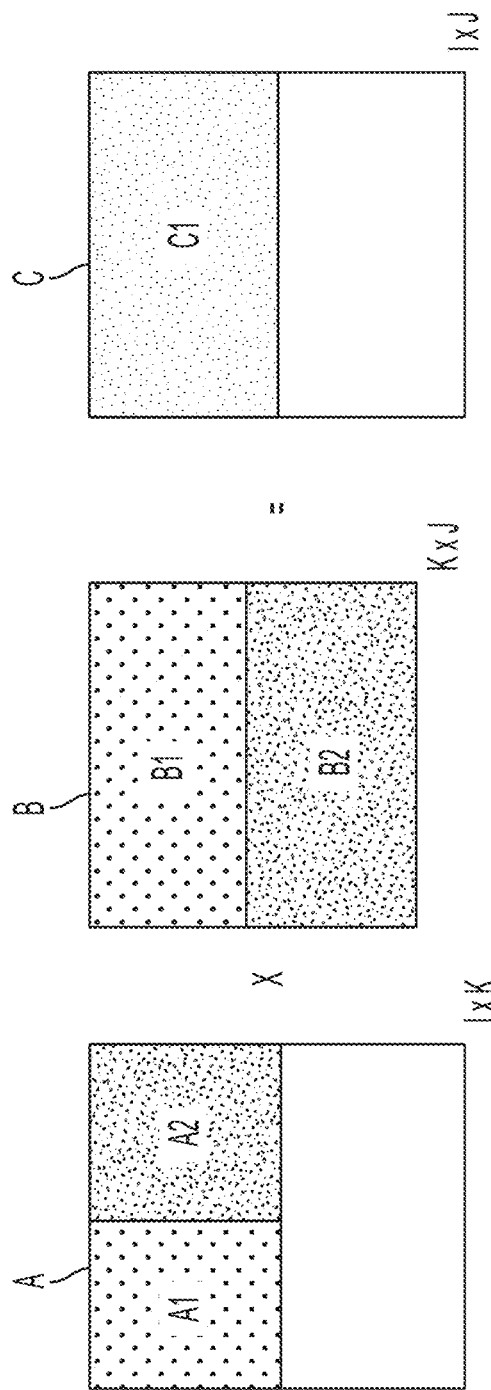
FIG. 1-1A is a representation of a matrix multiplication operation computed based on tiles, in accordance with some embodiments.

With the recent surge in deep learning applications, there is an increasing demand for digital accelerators that specialize in high performance computation of tensor algebra operations, such as a convolutions or general matrix multiply (GEMM). Conventionally, digital processor architectures including Graphical Processing Units (GPUs), Field Programmable Gate Arrays (FPGAs), and Application-Specific Integrated Circuits (ASICs) have been used as accelerators in such applications.

The inventors have appreciated that conventional digital accelerators have a major drawback—they are power-hungry. Consider for example digital accelerators programmed to perform large GEMM operations. Such digital accelerators rely on large numbers of transistors clocked at very high frequencies to compute the required multiplications. For decades, transistors have scaled exponentially smaller in size, higher in performance, and lower in power consumption—this is what experts generally refer to as Moore's law. In recent years, however, this trend has begun to slow down. Primarily due to leakage current between extremely small-sized transistors, it has become increasingly more difficult to continue to scale performance without sacrificing power consumption.

Recognizing these limitations, the inventors have developed new accelerator architectures that improve scalability both in terms of performance and energy efficiency. The accelerators developed by the inventors combine the flexibility and programmability of digital controllers with the energy efficiency and inherent speed of analog circuits. These accelerators are referred to herein as hybrid analog-digital processors.

Hybrid analog-digital processors of the types described herein are particularly suitable for computing mathematical operations. One such mathematical operation is general matrix multiply (GEMM), and another such operation is convolution, though embodiments of the present application are not limited to any specific operation.

A GEMM operation can be expressed as follows:

$$D=\alpha(A\times B)+\beta C$$

where $\alpha$ and $\beta$ are scalars (individual numbers), and A, B, C and D are matrices. The inner dimensions of A and B agree such that (A×B) is a matrix multiplication. Several mathematical operations can be decomposed in terms of GEMM operations, thus rendering the accelerators developed by the inventors applicable to a variety of contexts.

Some particular applications, such as deep artificial neural networks, require the computation of vast amounts of data, typically represented as matrices or tensors. One approach to perform operations over vast amounts of data is to use large hybrid analog-digital processors. For example, to perform a linear operation involving matrices or tensors having tens of thousands of rows and columns, hybrid analog-digital processors having tens of thousands of analog elements may be used.

The inventors have appreciated, however, that this approach can be costly because designing a processor with so many analog components may require more chip real estate than is available or more power than is practical for such a chip. Additionally, the inventors have appreciated that some applications involve heterogeneous workloads where some matrix operations have very large dimensions and other operations have smaller dimensions such that the overall utilization of a processor with enough elements for the largest computation would be poor. Accordingly, some embodiments relate to hybrid analog-digital processors that can process vast amounts of data with relatively small numbers of analog components. For example, a matrix operation involving matrices having thousands of rows and columns may be performed in some embodiments using a hybrid analog-digital processor having only a few hundreds of analog elements (it should be appreciated that these numbers are provided only by way of example, as different number of analog components may be used).

Figures 1, 1B:
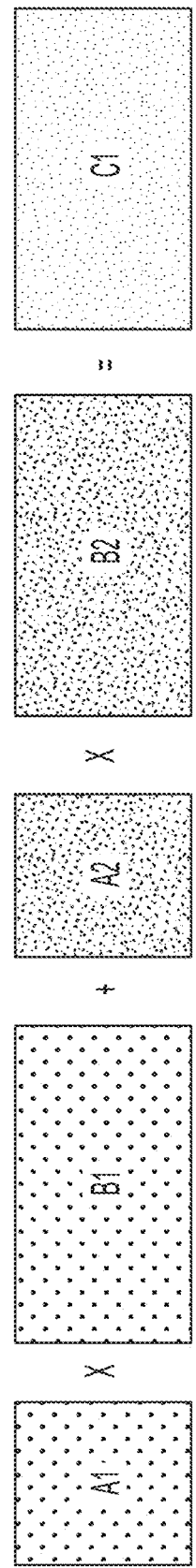

In some embodiments, matrix operations may be performed by making multiple passes through a hybrid analog-digital processor. At each pass through the processor, an operation is performed over a sub-portion of a matrix (referred to herein as a "tile"). FIGS. 1-1A and 1-1B illustrate how matrix multiplication can be performed using tiles. Referring first to FIG. 1-1A, matrix C is obtained by multiplying matrix A by matrix B. Matrix A has I rows and K columns, and matrix B has K rows and J columns. As a result, matrix C has I rows and J columns. A1 and A2 represent tiles of matrix A. For the sake of clarity, matrix A has been segmented in four tiles in this example, though in some embodiments matrix A may be segmented in tens, hundreds, or thousands of tiles, or more. Similarly, matrix B has been segmented into four non-square tiles in this example, though in some embodiments matrix B may also be segmented in tens, hundreds, or thousands of tiles, or more. Tiles A1 and B1 may each include N rows and M columns (though tiles of the types described herein need not be square), where $N \leq I$, $N \leq K$, $N \leq J$, $M \leq I$, $M \leq K$, and $M \leq J$. In this example, matrix B is divided into tile rows B1 and B2. Each tile row includes N rows and J columns.

Each tile row of matrix C is obtained by multiplying respective tiles of matrix A with respective tile rows of matrix B, and by accumulating the results. Each multiplication is performed as a pass through a hybrid analog-digital processor. As illustrated in FIG. 1-1B, for example, tile A1 is multiplied by tile row B1 at a first pass through a hybrid analog-digital processor and tile A2 is multiplied by tile row B2 at a second pass. The results are then accumulated, such that:

$$C1=A1\times B1+A2\times B2$$

This example involves accumulation of two partial results. In other embodiments, however, there may be more partial results, depending on the dimensions of the tile relative to the dimensions of the matrices to be multiplied. For GEMM applications such as those designed to make predictions, where the same "weight" matrix (A) is re-used with many different batches of data (B), this tile ordering may have benefits for spatial or temporal locality and reduced movement of weight-data.

The inventors have further developed a particular class of analog processors that uses light signals. The inventors have appreciated that, because light signals travel at the speed of light in the medium in which the light is traveling, latency is far less of a limitation than in electrical systems. Additionally, virtually no power is dissipated by increasing the distance traveled by the light signals, opening up new topologies and processor layouts that would not be feasible using electrical signals. Thus, light-based processors, referred to herein as "photonic processors," may have better speed and efficiency performance than conventional electrical processors. It should be appreciated that photonic processors are only one possible implementation of the accelerators described herein, as other types of hybrid analog-digital processors may also be used. Examples of such hybrid analog-digital processors are provided in detail further below.

The inventors have further appreciated that, in some circumstances, the matrix representing the input data (B) and/or the "weight" matrix (A) may exhibit large variations across the magnitude of its values. Consider for example the matrix of FIG. 1-1C, where darker regions represent clusters of larger magnitude values and lighter regions represent clusters of smaller magnitude values. Having entries with large variations across the magnitude of values poses a significant challenge, which arises due to the finite dynamic range of digitizing an analog signal, as is done for number representations in a hybrid analog-digital processor. Small magnitude values get rounded to the smallest non-zero representable, meaning that information in the lower bits may be limited by the input quantization noise. Simply amplifying the signal to read the lower bits may produce noisy results.

The inventors have developed techniques for overcoming the aforementioned challenges. The techniques developed by the inventors involve normalization of the entries of the weight matrix, or normalization of the entries of the input data set, to match the dynamic range of the system. The normalization may involve scaling different portions of a matrix by different amounts. The normalization may be made on a tile basis, on a row basis, on a tile row basis, or in any other suitable manner.

When different portions of a matrix are scaled by different amounts, however, an issue arises—the values calculated from different matrix portions may no longer be directly accumulated. To address this issue, an inverse scaling is performed in some embodiments. Once back-scaled, the results of different matrix portions are restored to the original data range, thus allowing for direct accumulation.

The inventors have further appreciated that representing digital values with large numbers of bits, while providing high degrees of representational accuracy, can lead to a significant increase in power consumption. Consider for example analog-to-digital converters (ADCs). The power consumption of an ADC depends, among other factors, upon the number of bits with which values are represented. The energy required for some ADCs grows exponentially with the number of output bits. In essence, there is a trade-off between representational accuracy and power consumption.

Conventional digital processors utilize binary number representations such as floating-point, integer, fixed-point, flex-point etc. To achieve higher performance for certain applications, non-standard binary number representations including nonlinear significand maps (such as logarithmic number representations), binary stochastic numbers, and entropy codings (such as posits, unums, and tapered floating point) have been developed. Relative to some true matrix multiplication, rounding and overflow/underflow with such representations may cause the result of a digital GEMM to disagree with the true arithmetic result. In floating-point (FP) representations such as the standard IEEE 754 "binary64," also known as "double" or "FP64," this loss of accuracy is for the most part negligible. The partitioning of mantissa, exponent and exponent bias may also be modified relative to the IEEE 754 standard. For instance, the 16-bit Brain Floating Point or "bfloat16" representation devotes 8-bits to the exponent rather than the 5-bits that the IEEE standard "half" precision (FP16). To achieve higher performance and improve energy efficiency, many accelerators perform computations with lower precision representations, such as 16-bit floating-point (FP16), and may use mixed-precision representations. For instance, NVIDIA's Volta generation Tensor Cores compute a GEMM with 4×4 matrices A and B in "half" precision (FP16) and C in either half or "single" precision (FP32).

The inventors have appreciated that low-precision (e.g., 16-bit or less, 12-bit or less, 10-bit or less) fixed-point binary number representations are far less demanding than floating-point binary number representations in terms of chip area and power requirements. Further, not all applications require the results of mathematical operations to be represented with full precision. For example, deep learning applications can often tolerate significantly lower precision than other applications of numerical linear algebra. However, using low-precision representations poses a significant challenge in that it reduces the accuracy with which numbers can be represented. To make things even worse, reducing the precision of an ADC can also reduce its dynamic range. As a result, there is a trade-off between representing the full dynamic range of a signal, and representing smaller output values precisely. In converting signals from the analog to the digital domain, a low-precision ADC may attempt to set the uppermost bits of the output. However, this may result in the ADC setting the uppermost bits to zero—that is, the ADC is attempting to read a signal range having no meaningful information. This problem is further exacerbated by the properties of computations in a neural network model—conditions vary over time, for example from one layer of the network to another layer of the network.

The inventors have developed accelerator architectures designed to operate with low-precision fixed-point binary number representations, thereby limiting chip area and power consumption, that provide sufficient accuracy for a variety of practical applications, including for deep learning applications. These accelerator architectures can be reconfigured dynamically, thus accounting for the varying dynamic conditions of a neural network model. The accelerator architectures developed by the inventors are designed to shift the signal range or "window" that an ADC is able to read. Shifting the readout window allows the ADC to focus the conversion on a portion of a signal that is likely to have the most amount of meaningful information, or at least to have some meaningful information.

In some embodiments, shifting the readout window in this manner may involve the use of analog scaling units (e.g., amplifiers or attenuators). Adjusting the gain of an analog scaling unit causes the readout window to shift, which in turn allows for a more accurate reading. Considering for example an 8-bit ADC, setting the gain to 2 may cause the readout window to shift 1-bit towards the lowermost bit, while setting the gain to ½ may cause the readout window to shift 1-bit towards the uppermost bit. In some embodiments, the position of a readout window is adjusted dynamically, thus allowing an accelerator to reconfigure itself based on the scale of the problem at hand. For example, it may be desirable to vary the position of the readout window dynamically between different layers of a neural network model to account for changes in output data distribution that may occur from layer to layer, as described in detail in connection with FIG. 1-9B.

II. Matrix Tiling

Figures 1, 2, 2A:
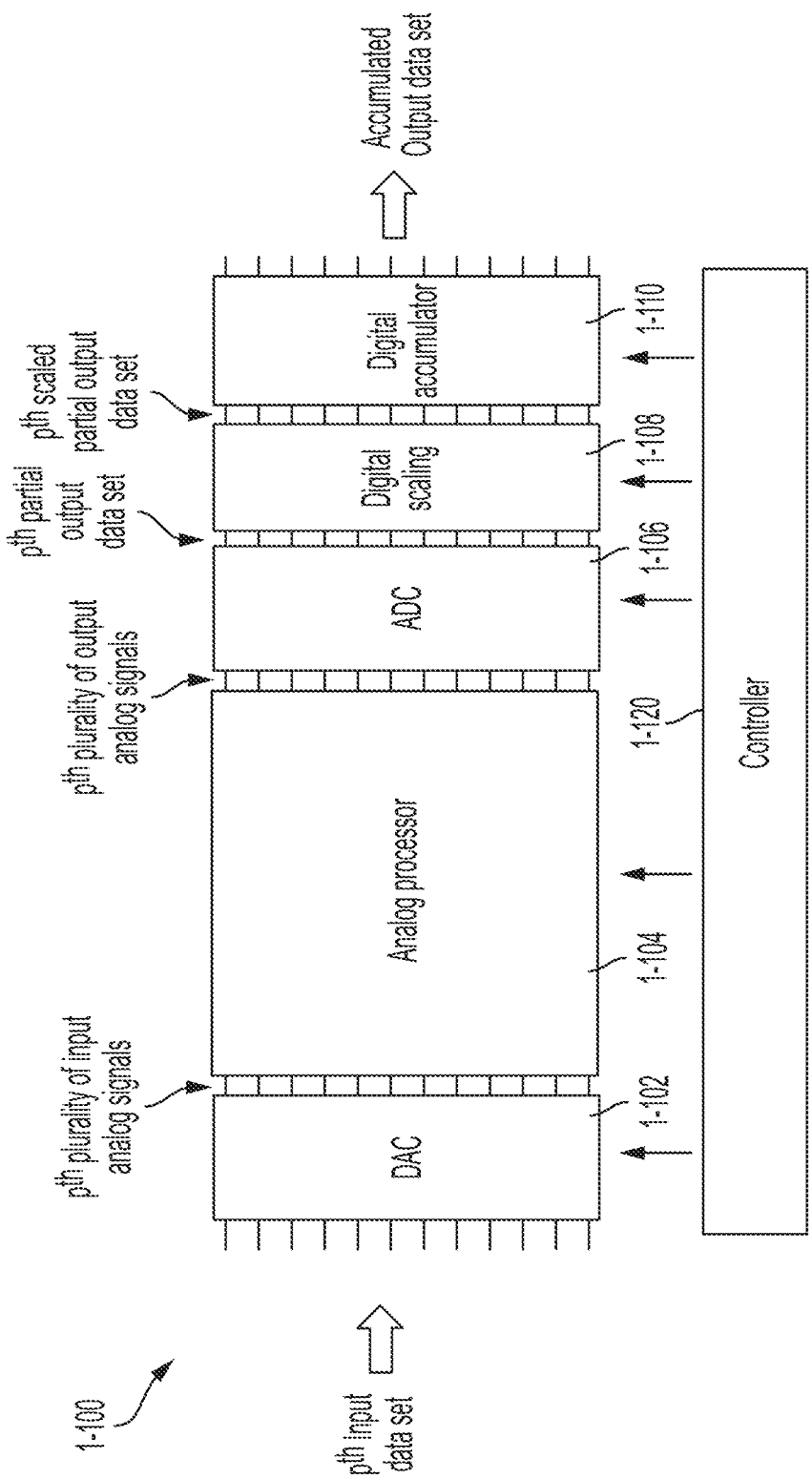

In some embodiments, matrix operations may be performed by making multiple passes through a hybrid analog-digital processor. At each pass, the processor performs an operation over a tile of a matrix. FIG. 1-2A is a block diagram illustrating an example of an hybrid analog-digital matrix processor implementing tiling techniques in accordance with some embodiments. Hybrid analog-digital matrix processor 1-100 (also referred to herein as accelerator 1-100) comprises a digital-to-analog converter (DAC) unit 1-102, an analog processor 1-104, an analog-to-digital converter (ADC) unit 1-106, a digital scaling unit 1-108, digital accumulator 1-110 and a controller 1-120. Controller 1-120 may control the operations of accelerator 1-100. For example, controller 1-120 may comprise software instructions that, when executed, cause the accelerator to perform a mathematical operation. The components of FIG. 1-2A, and optionally other components, are collectively referred to herein as "circuitry." The components of FIG. 1-2A may be formed on a common chip, or on different chips bonded together.

As described in detail further below, accelerator 1-100 is configured to perform mathematical operations by performing several passes through analog processor 1-104. At each pass through analog processor 1-104, accelerator 1-100 computes a partial result using analog processor 1-104. The partial results are added together using digital accumulator 1-110.

Analog processor 1-104 can be implemented in any of numerous ways using analog components. Analog processor 1-104 is configured, in some embodiments, to perform linear operations such as matrix-vector multiplication or matrix-matrix multiplication. Accordingly, processor 1-104 may include multiple analog components designed to perform analog multiplications or other mathematical operations.

DAC unit 1-102 comprises multiple DACs. Any suitable type of DAC may be used, including for example resistive ladder DACs, switched-capacitor DACs, switched resistor DACs, binary-weighted DACs, thermometer-coded DACs, successive approximation DACs, oversampling DACs, interpolating DACs, hybrid DACs, etc. Similarly, ADC unit 1-106 comprises multiple ADCs. Any suitable type of ADC may be used, including for example parallel comparator ADCs, flash ADCs, successive-approximation ADCs, Wilkinson ADCs, integrating ADCs, sigma-delta ADCs, pipelined ADCs, integrating ADCs, cyclic ADCs, time-interleaved ADCs, etc.

FIG. 1-2B is a representation of a matrix-matrix multiplication that may be performed using an accelerator 1-100. In some embodiments, matrix A represents a weight matrix and matrix B represents an input matrix that is encoded in terms of input data to the analog processor. In other embodiments, matrix A represents the input matrix and matrix B represents a weight matrix. Either way, matrix C represents output data. The entries of matrix A (also referred to herein as "parameters") may be stored in a memory of the accelerator, and the entries of matrix B may be provided as input to the accelerator. C is computed by applying weight matrix A to input matrix B. More specifically, matrix C is computed by multiplying matrix A by matrix B. For the sake of clarity, matrix A is illustrated as a 4×4 matrix, matrix B as a 4×3 matrix and matrix C as a 4×3 matrix. Of course, the matrices may have any suitable number of rows and columns. In some embodiments, the matrices may have rows and columns in the hundreds, thousands, tens of thousands, or more. In some embodiments, A and B may be N-dimensional tensors such that the matrix operations are to be performed on multiple instances of the same-sized matrices. In some embodiments, the number of columns of A equals the number of rows of B, thus allowing for the matrices to be multiplied to one another. For example, matrix A may have I rows and K columns, matrix B may have K rows and J columns. As a result, matrix C has I rows and J columns. This relation can be expressed as follows:

$$\dim(A)=(I,K) \& \dim(B)=(K,J) \& \dim(C)=(I,J)$$

where the operator dim( ), when applied to a matrix, returns the number of rows and columns of the matrix. The entries of matrix A are $a_{ik}$, where i=1, 2, . . . , I, and k=1, 2, . . . , K. The entries of matrix B are $b_{kj}$, where j=1, 2, . . . , J. The entries of matrix C are $c_{ij}$.

Figures 1, 2, 2C:
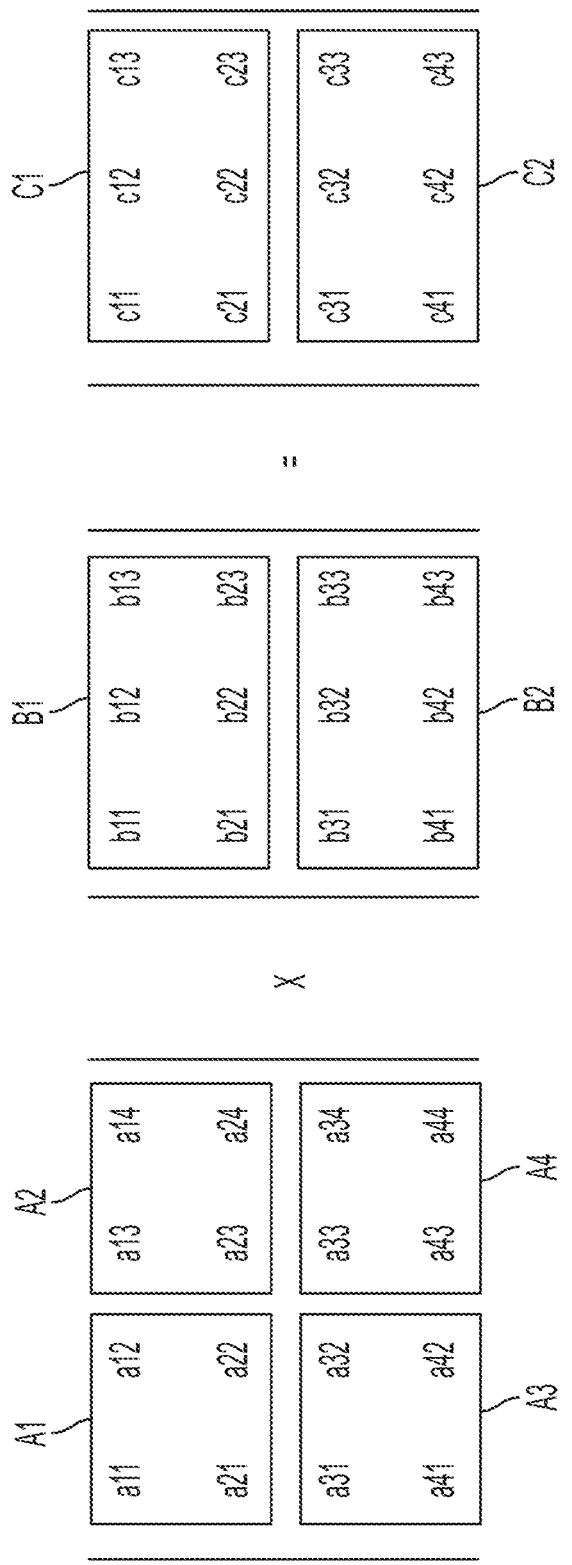

Multiplying the entirety of matrix A with the entirety of matric B with a single pass requires large analog processors, especially when I, K and J are large. Designing large processors may be impractical because it may require more chip real estate than is available and may result in significant power dissipation. In some embodiments, it may be more practical to perform the operation of FIG. 1-2B using a relatively small analog processor. In these embodiments, instead of directly multiplying the matrices in their entireties, the multiplication may be broken down by tile. In the depiction of FIG. 1-2C, for example, matrix A has been segmented in four tiles—A1, A2, A3 and A4. In this specific example, N=2—each tile of A has two rows and two columns (though other values of N are also possible, so long as N≤I, N≤J, and N≤K). Matrix B is segmented in tile rows B1 and B2, and matrix C is segmented in tile rows C1 and C2. The tile rows of matrix C are given by the following expressions:

$$C1 = A1 \times B1 + A2 \times B2$$

$$C2 = A3 \times B1 + A4 \times B2$$

The multiplication A1×B1 may be performed with a first pass through the analog processor, the multiplication A2×B2 may be performed with a second pass through the analog processor, and the results may subsequently be accumulated to one another to obtain C1. Similarly, the multiplication A3×B1 may be performed with a third pass through the analog processor, the multiplication A4×B2 may be performed with a fourth pass through the analog processor, and the results may subsequently be accumulated to one another to obtain C2.

Figures 1, 2, 3:
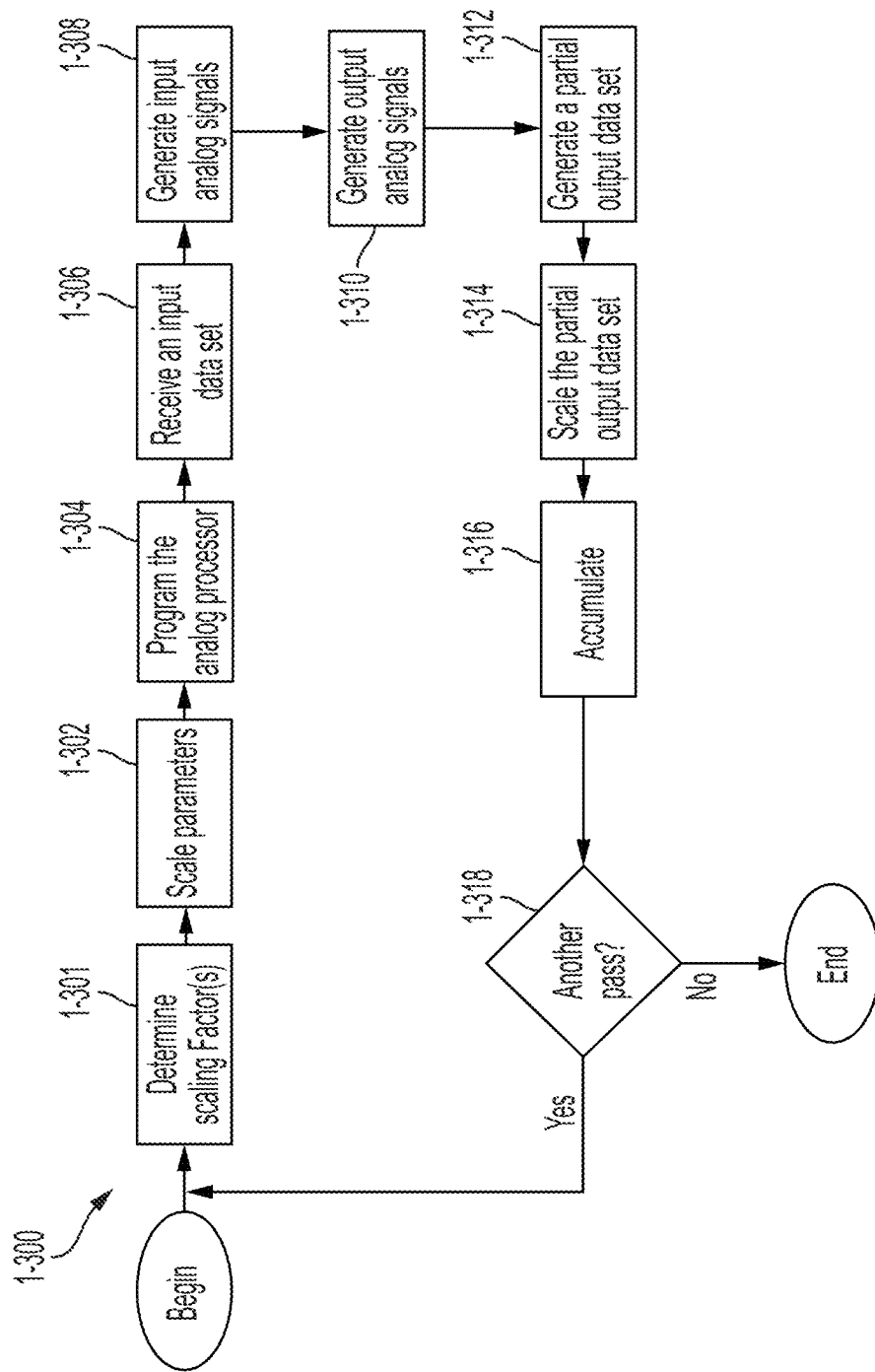

FIG. 1-3 is a flowchart illustrating an example of a method for performing a mathematical operation, in accordance with some embodiments. Method 1-300 may be performed using accelerator 1-100 (FIG. 1-2A), though any other suitable accelerator may be used. It should be appreciated that the steps of method 1-300 may be performed in the order depicted in FIG. 1-3, or in any other suitable order. In particular, the order of operation may be chosen to exploit spatial and/or temporal locality. Method 1-300 loops multiple times, where each loop corresponds to a pass through an analog processor. FIG. 1-2A illustrates the $p^{th}$ iteration, with p=1, 2 . . . P.

At step 1-301, controller 1-120 determines one or more scaling factors for the current pass. As described above in connection with FIG. 1-1C, in some embodiments, a matrix may exhibit significant variations in magnitude across its entries, such that it may be desirable to normalize the entries of matrix A, or matrix B, to match the dynamic range of the analog processor. The determination of step 1-301 may involve determining the value of the scaling factor(s) that scales the input data set to match the dynamic range of the ADC unit. This determination may be performed in any of numerous ways. In some embodiments, the determination may be made on the basis of the parameters of matrix A. In some embodiments, the determination may be made on the basis of the parameters of the current tile of matrix A, or other tiles. In this case, it may be advantageous to reorder the matrix A such that entries with similar dynamic range fall in the same tile. This may also be the case for matrix B. In some embodiments, the dimension of the tiles of matrix A may be chosen depending on the degree of granularity with which one desires to scale the matrix. For example, if it is expected that the matrix will exhibit sharp variations across its values, the dimension of the tiles may be chosen to be small, thus providing a fine resolution. The drawback is that more passes will be needed. By contrast, if it is expected that matrix B will exhibit relatively slow variations across its values, the dimension of the tiles may be chosen to be larger, thus limiting the number of passes.

The scaling factors may be determined in any suitable ways. In one example, a scaling factor is set to the average value of the entries of the current tile. In another example, a scaling factor is set to the highest value of the entries of the current tile. In yet another example, a scaling factor is set to the lowest value of the entries of the current tile. In yet another example, the scaling factors may be set to the maximum absolute values of the rows of the current tile.

In some embodiments, matrix A can be factorized or decomposed in multiplying matrices. The entries of these matrices may be such that combining (e.g., multiplying) the matrices together produces the original matrix A. Example of matrix decompositions that may be applied to matrix A include singular value decomposition (SVD), lower-upper decomposition, dilation (e.g., unitary dilation), rank decomposition, Cholesky decomposition, QR decomposition, interpolative decomposition, spectral decomposition, polar decomposition, etc. In some embodiments, a scaling factor is determined based on a parameter of one of the matrices resulting from the decomposition of matrix A.

In one example, matrix A is decomposed based on SVD, and a scaling factor is determined based on one or more of the singular values of matrix A. For example, a scaling factor may be set to the highest singular value of the current tile, such as to the highest among the absolute values of the singular values of the current tile. In some embodiments:

$$t_p = \max\{|\sigma_i|\} \text{ such that } i=1,2,\ldots,N \text{ and } \Sigma_p = \text{diag}[\sigma_i]$$

where $t_p$ represents the scaling factor for tile p, $\Sigma_p$ represents the diagonal matrix associated with tile p, and $\sigma_i$ represent the diagonal values of matrix $\Sigma_p$ (that is, the singular values of the $p^{th}$ tile of A). The quantity $|\sigma_i|$ indicates the absolute value of $\sigma_i$. In yet another example, a scaling factor is set to the average of the singular values of the current tile. In yet another example, a scaling factor is set to the lowest of the singular values of the current tile.

Matrix A need not be segmented by tile for purposes of determining a scaling factor. In some embodiments, a scaling factor may be determined based on a row of a tile (tile row) of matrix A, based on multiple tiles of matrix A, based on a row of matrix A, based on one or more columns of matrix A, or based on any other suitable portion of matrix A. In some embodiments, a scaling factor may be set to the same value for more than one tile of matrix A.

At step 1-302, controller 1-120 scales at least some of the parameters of matrix A based on the scaling factor(s) determined at step 1-301. In some embodiments, controller 1-120 scales the parameters (or at least some of the parameters) of the current tile of matrix A based on the scaling factors. For example, controller 1-120 may scales a first subset (e.g., one or more rows of matrix A and/or one or more columns of matrix) of the parameters based on a first scaling factor and may scales a second subset of the parameters based on a second scaling factor. In the example of FIG. 1-4A, the parameters of a tile are scaled based on the scaling factor determined for that particular tile. Scaling factor t1 indicates the scaling factor determined for tile A1, scaling factor t2 indicates the scaling factor determined for tile A2, scaling factor t3 indicates the scaling factor determined for tile A3 and scaling factor t4 indicates the scaling factor determined for tile A4. In this example, the entries of tile A1 are divided by t1, the entries of tile A2 are divided by t2, the entries of tile A3 are divided by t3 and the entries of tile A4 are divided by t4 (though operations other than a division are also possible, including a multiplication).

In the example of FIG. 1-4B, the parameters of a tile row of matrix A are scaled based on the scaling factor(s) determined for that particular tile row. Scaling factor tr1 indicates the scaling factor determined for tiles A1 and A2, and scaling factor tr2 indicates the scaling factor determined for tiles A3 and A4. In this example, the entries of the tile row consisting of tiles A1 and A2 are divided by tr1 and the entries of the tile row consisting of tiles A3 and A4 are divided by tr2.

In some embodiments, instead of scaling the parameters of matrix A, controller 1-120 may scale the entries of matrix B, the input data set. The entries may be scaled in the digital domain or in the analog domain (after having passed through DAC unit 1-102). When done in the analog domain, the scaling may involve attenuating or amplifying the input analog signal based on the scaling factor.

In the example of FIG. 1-4C, the parameters of a tile row of matrix B are scaled based on the scaling factor(s) determined for a corresponding tile of matrix A. Here, scaling factor t1 indicates the scaling factor determined for tile A1 and scaling factor t2 indicates the scaling factor determined for tile A2. In this example, the entries of tile row B1 are divided by t1 and the entries of tile row B2 are divided by t2.

At step 1-304, controller 1-120 programs analog processor 1-104 based on the parameters of the current tile of matrix A. In at least some of the embodiments in which the parameters of matrix A have been scaled at step 1-302, controller 1-120 programs analog processor 1-104 based on the scaled parameters of the current tile of matrix A. Referring back to FIG. 1-2A, for example, controller 1-120 programs analog processor 1-104 based on a11/t1, a12/t1, a21/t1 and a22/t1. Programming the analog processor may involve setting certain characteristics of the analog processor based on the parameters. In one example, analog processor 1-104 includes multiple electronic amplifiers (e.g., voltage amplifiers, current amplifiers, power amplifiers, transimpedance amplifiers, transconductance amplifiers, operational amplifiers, or transistor amplifiers, among others), and programming the analog processor involves setting the gains of the electronic amplifiers based on the parameters of tile A1. In another example, analog processor 1-104 includes multiple electronic attenuators (e.g., voltage attenuators, current attenuators or power attenuators, among others), and programming the analog processor involves setting the attenuations of the electronic attenuators based on the parameters of tile A1. In yet another example, analog processor 1-104 includes multiple electronic phase shifters, and programming the analog processor involves setting the phase shifts of the electronic phase shifters based on the parameters of tile A1. In another example, the analog processor includes an array of memory devices, such as flash or ReRAM, typically laid out in a crossbar fashion. Programming the analog processor involves setting the conductances (or resistances) of each of the memory cells.

As described in detail further below, in some embodiments analog processor 1-104 is implemented with a photonic processor. In some such embodiments, analog processor 1-104 includes multiple optical amplifiers (e.g., semiconductor optical amplifiers or other solid state amplifiers, rare earth doped optical amplifiers such as erbium doped optical amplifiers, Raman amplifiers, or optical parametric amplifiers, among others), and programming the analog processor involves setting the gains of the optical amplifiers based on the parameters of tile A1. In another example, analog processor 1-104 includes multiple optical attenuators (e.g., Mach Zehnder interferometers, leaky waveguides, loopback attenuators, liquid crystal attenuators, saturable absorbers, or Franz-Keldysh absorbers, metal-oxide-semiconductor-capacitor modulators, carrier depletion electro-optic modulators, among others), and programming the analog processor involves setting the attenuations of the optical attenuators based on the parameters of tile A1. In yet another example, analog processor 1-104 includes multiple optical phase shifters (e.g., thermo-optic phase shifters, acousto-optic phase shifters, electro-optic phase shifters, plasma dispersion effect phase shifters, Pockels effect phase shifters, nano-opto-electro-mechanical phase shifters, or non-linear phase modulators, among others), and programming the analog processor involves setting the phase shifts of the optical phase shifters based on the parameters of tile A1. In yet another example, analog processor 1-104 includes multiple optical resonators (e.g., ring resonators, and disk resonators, photonic crystals, ridge resonators, among others), and programming the analog processor involves setting the resonant frequencies of the optical resonators based on the parameters of tile A1.

At step 1-306, accelerator 1-100 receives an input data set. Referring back to FIG. 1-2C, for example, the accelerator may receive the entries of tile row B1 at one pass and the entries of tile row B2 at another pass. In some embodiments, controller 1-120 receives and stores the entries of matrix B at the same time, but provides one tile row at a time (e.g., per pass) to DAC unit 1-102. The entries may represent real numbers. In some embodiments, the entries may represent positive real numbers or signed real numbers (positive as well as negative real numbers).

At step 1-308, accelerator 1-100 generates a plurality of input analog signals based on the input data set received at step 1-302. Referring back to FIG. 1-2A, the generation of step 1-304 involves converting the input data set to analog signals using DAC unit 1-102.

At step 1-310, analog processor 1-104 generates a plurality of output analog signals based on the plurality of input analog signals and the set of parameters with which the analog processor was programmed at step 1-301. This may involve, in some embodiments, performing a matrix multiplication. The result is that the plurality of input analog signals are multiplied by respective parameters of the current tile. For the $p^{th}$ pass, the result is the following expression:

$$\frac{A_p}{t_p} \times B_p$$

where $A_p$ is the $p^{th}$ tile of matrix A, $B_p$ is the $p^{th}$ tile row of matrix B and $t_p$ is the $p^{th}$ scaling factor. In other embodiments, generating the plurality of output analog signals involves a convolution based on the plurality of input analog signals and the set of parameters.

Analog processor 1-104 may include any suitable analog components designed to perform a matrix multiplication, or a convolution. As one example, analog processor 1-104 may include analog mixers. Each mixer mixes an input analog signal with an analog signal encoded (e.g., modulated) based on the corresponding parameter of matrix A. As another example, analog processor 1-104 may include amplitude modulators. As another example analog processor 1-104 may include current steering circuits. Each modulator modulates an input analog signal by a quantity obtained based on the corresponding parameter of matrix A. As another example, analog processor 1-104 may include amplifiers. Each amplifier amplifies an input analog signal by a gain obtained based on the corresponding parameter of matrix A. As another example, analog processor 1-104 may include attenuators. Each attenuator attenuates an input analog signal by an attenuation obtained based on the corresponding parameter of matrix A. Analog processor 1-104 may be implemented using any suitable technology, including for example using complementary metal-oxide-semiconductor (CMOS) components, radio-frequency (RF) components, and microwave components, though other technologies may be used. In some embodiments, analog processor 1-104 includes a photonic processor, and the multiplication is performed in the optical domain. In some embodiments analog processor 1-04 includes a combination of photonic and analog electronic components and some multiplications may be performed in the optical domain while other multiplications or additions are performed in the electronic domain. Examples of photonic processors are described in detail further below.

In some embodiments, instead of performing an operation (e.g., matrix multiplication or convolution) based on the input analog signals and the scaled set of parameters, step 1-310 may involve performing an operation based on scaled input analog signals and unscaled parameters (as described for example in connection with FIGS. 1-4C and 1-4D). Either way, the result is $$A_p \times \frac{B_p}{t_p}.$$

In some embodiments, scaling of matrix B may be performed on the basis of column tiles. That is, distinct column tiles of matrix B are scaled by different factors.

In some embodiments, the analog multiplication may involve a matrix decomposition. The entries of these matrices may be such that combining (e.g., multiplying) the matrices together produces the original matrix A. In some such embodiments, analog processor 1-104 may be designed to perform a transformation on the input data set based on each of the matrices in which matrix A has been decomposed. Specific examples of matrix decompositions are provided above. One such example is SVD. As illustrated in FIG. 1-5A, the controller 1-120 may decompose matrix A to be represented by three constituent matrices: $A=U\Sigma V^{\dagger}$, where U and V are unitary I×I and K×K matrices, respectively ($U^{\dagger}U=UU^{\dagger}=I$ and $V^{\dagger}V=VV^{\dagger}=I$), and $\Sigma$ is an I×K diagonal matrix with real or complex-valued entries. In some embodiments, the values of the diagonal singular values may also be further normalized such that the maximum absolute value of the singular values is 1. The values $\sigma_1, \sigma_2 \ldots \sigma_K$ represent the singular values. Analog processor 1-104 may be include analog hardware designed to transform the input analog signals according to each of matrices U, E and V.

Referring back to FIG. 1-3, at step 1-312, accelerator 1-100 generates a partial output data set based on the plurality of output analog signals obtained at step 1-310. In some embodiments, the generation of step 1-312 involves passing the output analog signals through ADC unit 1-106.

At step 1-314, accelerator 1-100 scales the partial output data set based on the scaling factor to produce a scaled partial output data set. The scaling of step 1-314 may involve passing the partial output data set though digital scaling unit 1-108. In some embodiments, digital scaling unit 1-108 may be configured to apply the inverse of the operation performed at step 1-308. For example, in at least some of the embodiments in which step 1-308 involves a division, step 1-314 may involve a multiplication. Similarly, in at least some of the embodiments in which step 1-308 involves a multiplication, step 1-314 may involve a division. This restores the entries of the output matrix to the original range.

In some embodiments, the scaling of step 1-314 may be based on the same scaling factor used for the scaling of step 1-302 (though it may be applied using the inverse operation). Thus, if the scaling of step 1-302 involves a division by $t_p$, the scaling of step 1-314 involves a multiplication by $t_p$. In other embodiments, the scaling of step 1-314 may involve an additional factor. For example, if the scaling of step 1-308 involves a division $t_p$, the scaling of step 1-314 may involve a multiplication by $t_p/r$, where factor r may be computed based on all the scaling factors $t_p$. In one example, factor r is computed as follows:

$$r = f(\{t_p : p=1,2,\ldots,K\}/N)$$

where the function f(•) may represent any suitable function, such as max(•), min(•), or mean(•). Scaling by the factor $t_p/r$ has the effect of unifying the data range of the scaling factors.

At step 1-316, the scaled partial output data set generated at step 1-314 is accumulated. At each pass, the accumulation may involve summing the scaled partial output data set generated by the current pass with the result of a previous accumulation. Thus, each pass adds the current result to the cumulative result. The accumulation of step 1-320 may be performed using digital accumulator 1-110. An example of accumulator 1-110 is illustrated in FIG. 1-5B, in accordance with some embodiments. In this example, accumulator 1-110 includes a memory unit 1-520 and a digital adder 1-522. Memory unit 1-520 stores the result of the previous accumulation. Digital adder 1-522 adds the scaled partial output data set generated by the current pass to the cumulative result.

In some embodiments, instead of performing an accumulation step at each pass, the partial results may be temporarily stored in a memory, and a single accumulation may be performed after completion of the passes. Either way, process 1-100 may involve at least one accumulation step in which the scaled partial output data sets generated by at least two of the plurality of passes are accumulated.

At step 1-318, accelerator 1-100 determines whether an additional pass should be performed. This may involve, for example, determining whether there are additional tiles of matrix A that have not been processed. That is, in some embodiments, method 1-300 iterates for a number of cycles equal to the number of tiles of matrix A.

If accelerator 1-100 determines that an additional iteration is needed, method 1-300 performs another pass through the accelerator. In the next pass, another tile of matrix A is processed. By contrast, if accelerator 1-100 determines that no additional iterations are needed, method 1-300 ends.

III. Partial Products

In some embodiments, the analog processor performs a matrix-vector product: $\vec{c} = A\vec{b}$, where $\vec{b}$ is the input vector, A is an n×n matrix, and $\vec{c}$ is the output vector. In index notation, this multiplication is written as $$c_i = \sum_{j=1}^{n} A_{ij} b_j$$

(For all i in [0,N−1]) which is the multiplication between it elements of $A_{ij}$ (iterate over j) and n elements of $b_j$ (iterate over j) and then summation of these multiplication results altogether. In some embodiments the elements $A_{ij}$ and $b_j$ may be represented with an unsigned fixed-point number representation (e.g., INT8). Within this representation, if $A_{ij} \in \{0,1\}^{m_1}$ is an $m_1$-bit number and $b_j \in \{0,1\}^{m_2}$ is an $m_2$-bit number, then a total of $m_1+m_2+\log_2(n)$ bits are used to fully represent the resulting vector element $c_i$. In general, the number of bits required to represent the result of a matrix-vector product without loss of accuracy is larger than the number of bits required to represent the inputs of the operation. If ADC unit 1-106 is unable to read out the output vector at full precision, then the output vector elements may be rounded to the precision of the ADC.

The inventors have recognized and appreciated that constructing an ADC with a high bit-precision at bandwidths that correspond to the rate at which input vectors in the form of analog signals are sent through analog processor 1-104 can be difficult to achieve. Therefore, in some embodiments, the bit precision of DAC 1-102 may limit the bit precision at which the matrix elements $A_{ij}$ and the vector element $b_j$ are represented. Accordingly, the inventors have devised a method of obtaining an output vector at its full precision, which can be arbitrarily high, by computing partial products and sums. For the sake of clarity, it will be assumed that the number of bits needed to represent either $A_{ij}$ or $b_j$ is the same, i.e. $m_1=m_2=m$. However, this assumption can be removed and does not limit the scope of embodiments of the present disclosure.

The method, according to some embodiments, as a first act, includes dividing the bit-string representation of the matrix element $A_{ij}$ and the vector element $b_j$ into d divisions with each division containing k=m/d bits. (If k is not an integer, zeros may be appended until m is divisible by d.) As a result, the matrix element
$A_{ij}=A_{ij}^{[0]}2^{k(d-1)}+A_{ij}^{[1]}2^{k(d-2)}+\ldots+A_{ij}^{[d-1]}2^0$, where $A_{ij}^{[f]}$ is the k-bit value of the f-th most significant k-bit string of $A_{ij}$. In terms of bit strings, one can write
$A_{ij}=A_{ij}^{[0]}A_{ij}^{[1]}\ldots A_{ij}^{[d-1]}$. Similarly, one can also obtain $b_j=b_j^{[0]}2^{k(d-1)}+b_j^{[1]}2^{k(d-2)}+\ldots+b_j^{[d-1]}2^0$, where the vector element
$b_j=b_j^{[0]}b_j^{[1]}\ldots b_j^{[d-1]}$ in terms of its bit string. The multiplication $c_i=\Sigma_j A_{ij} b_j$ can be broken down in terms of these divisions as:

$$c_i = \sum_{p=0}^{2(d-1)} \left(\left(\sum_{f,g \in S_p} \sum_j A_{ij}^{[f]} b_j^{[g]}\right) 2^{2k(d-1)-pk}\right),$$

where the set $S_p$ is the set of all integer values of f and g, where f+g=p.

The method, as a second act, includes controlling analog processor 1-104 to implement the matrix $A_{ij}^{[f]}$ and propagating the input vector $b_j^{[g]}$, each of which is only k-bit precise, through analog processor 1-104 in the form of encoded analog signals. Using any of the tiling approaches described above, the matrix-vector product operation performs $c_i^{[f,g]}=\Sigma_j A_{ij}^{[f]} b_j^{[g]}$. The method includes, storing the output vector $c_i^{[f,g]}$ which is precise up to $2k+\log_2(n)$ bits.

The method further includes iterating over the different values of f,g within the set $S_p$ and repeating the second act for each of the different values of f, g and storing the intermediate results $c_i^{[f,g]}$.

As a third act, the method includes computing the final result $\Sigma_{f,g \in S_p} \Sigma_j A_{ij}^{[f]} b_j^{[g]} = \Sigma_{f,g \in S_p} c_i^{[f,g]}$ by summing over the different iterations of f and g with digital electronics, such as a processor.

The precision of the ADC used to capture a fully precise computation according to some embodiments of this method is only $2k+\log_2(n)$ bits, which is fewer than the $2m+\log_2(n)$ bits of precision that would otherwise be needed.

The inventors have further recognized and appreciated that embodiments of the foregoing method can be generalized to operate on tensors. As previously described, the hybrid analog-digital processing system can perform matrix-matrix multiplications using tiles. The method described above can be applied to the matrix tiles and input data set tile rows to obtain the output data set tile row at full precision.

As described in detail further below, in some of the embodiments in which the analog processor comprises a photonic processor, the matrix may be represented in terms of the phases of the optical variable beam splitters (VBSs). In some such embodiments, the divisions may be performed on the bit strings representing the phases, instead of the matrix elements directly. In some embodiments, when the map between the phases to the matrix elements is a linear map, then the relationship between the input parameters—the phases of the VBSs and the input vector elements in this case—and the output vector may be linear. When this relationship is linear, the method described above is still applicable. However, in general, a nonlinear map from the elementary representation of the matrix to the photonic representation may be considered, according to some embodiments. For example, the bit-string division of the Euclidean space matrix elements from their most-significant k-bit string to the least-significant h-bit string may be used to produce a series of different matrices that are decomposed to a phase representation and implemented using a photonic processor.

The divisions need not be performed on both the weight matrix entries and the input data set entries simultaneously. In some embodiments, a photonic processor may propagate many input data sets for the same matrices. It may be efficient to only perform the divisions on the input data sets and keep the VBS controls at a set precision (e.g., full precision) because the digital-to-analog converters (DACs) for the vector preparations may operate at a high bandwidth while the DACs for the VBSs may be quasi-static for multiple vectors. In general, including a DAC with a high bit precision at higher bandwidth is more difficult than designing one at a lower bandwidth. Thus, in some embodiments, the output vector elements may be more precise than what is allowed by the ADC, but the ADC will automatically perform some rounding to the output vector value up to the bit precision allowed by the ADC.

IV. Analog Gain

The inventors have appreciated that low-precision (16-bit or less, 12-bit or less, 10-bit or less) fixed-point binary number representations are far less demanding than high-precision floating-point binary number representations in terms of chip area and power requirements. However, compared to high-precision floating-point representations (e.g., FP32) conventionally used in modern processors, low-precision fixed-point representations lead to significantly lower representational accuracy. Further, reducing the precision can reduce the dynamic range of an ADC. This results in a trade-off between representing the full dynamic range of a data vector, and representing smaller output values precisely. Described herein are techniques for performing matrix operations using hybrid analog-digital processors with low-precision ADCs. More specifically, some accelerator architectures according to some embodiments use techniques for shifting the readout window of an ADC. Shifting the readout window allows the ADC to focus the conversion on a portion of a signal that is likely to have the most amount of meaningful information, or at least to have some meaningful information. Leveraging these techniques, some accelerator architectures are designed to operate with low-precision fixed-point binary number representations, thus significantly reducing the power consumption compared to conventional high-precision floating-point representations.

FIG. 1-6A is a plot illustrating one such technique. The plot represents an example of a signal distribution that may be presented as input to an ADC (see curved labeled "input distribution"). (In this example, distributions are expressed as a function of voltage, but expressing distributions as a function of other quantities is also possible.) The input distribution depends upon the data that needs to be processed, and may vary dramatically from data to data. The dynamic range of the ADC (labeled "dynamic range") indicates the largest magnitude range the ADC can read. At one end of the dynamic range is the smallest signal (e.g., voltage) that the ADC can read. At the opposite end of the dynamic range is the largest signal that the ADC can read. In this particular example, the input distribution extends over only a fraction of the dynamic range of the ADC. In other circumstances, however, the input data may be such that the signal extends predominantly outside the dynamic range.

The techniques described herein allow for adjustments of the input distribution to match more closely the dynamic range of an ADC. In some embodiments, this may be accomplished by scaling (e.g., amplifying or attenuating) an analog signal prior to be provided as input to an ADC. In some embodiments, analog signals may be scaled so that the signal distribution extends from one end of the dynamic range to the other end of the dynamic range. In some embodiments, as illustrated in FIG. 1-6A, analog signals may be scaled so that a small portion of the tail of the distribution is outside the dynamic range. In the example of FIG. 1-6A, an amplification is applied that stretches the input distribution (the resulting distribution being labelled "amplified distribution") across the entire dynamic range, with portions of the tails being outside the dynamic range. Those inputs that are not within the dynamic range may be clipped into the minimum and maximum values of the ADC range. In FIG. 1-6A this is illustrated with the vertical spikes in the "amplified distribution" at the endpoints of the ADC range. The inventors have recognized that, although cutting off portions of the distribution as shown in FIG. 1-6A may result in loss of information, the lost information may not be as meaningful as the information inside the dynamic range.

This concept is illustrated in FIG. 1-6B. Consider for example a matrix-vector multiplication $\vec{c}=A\vec{b}$ with integer (or fixed-point) arithmetic, where A is an n×n matrix. The entries of A are unsigned numbers represented with $m_1$ bits, and the entries of b are unsigned numbers represented with $m_2$ bits. The full accuracy representation of the entries of the output vector c requires $b_c$ bits, where $b_c=\log_2(n)+m_1+m_2$ (see bit string 1). However, if the output of such a computation is read with an ADC having $b_{adc}<b_c$ bits, there is a tradeoff between representing the full dynamic range of c, and representing smaller output values more precisely. Considering by way of example n=16, $m_1=2$ and $m_2=4$, the full precision would be $b_c=10$. As further shown in the figure, a 4-bit ADC configured to readout the full dynamic range of c will read the uppermost 4-bits of the output (see bit string 2). For some distributions of values, there may be useful information in this range. However, there is generally a high probability that the uppermost bits will not be set. As a result, the conversion does not produce any meaningful information.

In some embodiments, the ADC readout window can be shifted by amplifying the signal. Bit string 3 is obtained by amplifying the signal with a gain equal to 4, which shifts the readout window 2 bits towards the lowermost bit. As a result, useful information begins to appear inside the window. The resulting 4-bit output captures most of the meaningful information of the output having full precision. Bit string 4 is obtained by amplifying the signal with a gain equal to 64 (which in this case happens to saturate the ADC), which further shifts the readout window 3 bits towards the lowermost bit. The saturated result indicates that the true value is larger than the largest data value that is representable at the scale of these lowest bits, and is thus the most accurate representation of this input bit string on this data scale.

The inventors have appreciated the fact that useful information in the lower bits may be limited by the input quantization noise. Consider an example where the analog device programming a normalized matrix A (with values between 0 and 1) is precise to $m_1$ bits and has an encoding noise at the level of $2^{-(m_1+1)}$, and the analog device programming the normalized entries of b (with values between 0 and 1) is precise to $m_2$ bits and has an encoding noise at the level of $2^{-(m_2+1)}$. For n=16, $m_1$=2 and $m_2$=4, the full precision would be $b_c$=10. But, consider the case where the maximum value of A (all values equal to 1) is programmed in, then the ($\log_2 n+m_2+1$)-th bit may be noisy. Similarly, in the case where the maximum value of b (all values equal to 1) is programmed in, then the ($\log_2 n+m_1+1$)-th bit may be noisy. Amplifying the signal to read this bit and the lesser significant bits may produce noisy results. However, it may be possible to recover the value of these noisy bits by taking multiple measurements and averaging. This encoding quantization noise essentially provides a limit to how much amplification one can apply to the signal before one encounters noisy bits. In some embodiments, the encoding quantization noise is not the only source of noise. The noise floor of the TIA and the optical receiver (in the case of a photonic processor) can limit the amount of amplification before noisy bits are read out.

In general, it may be difficult to predict how much gain is needed to maximize the collection of meaningful information. In some embodiments, the gain may be determined on the basis of the statistics of a weight matrix (e.g., matrix A). This determination may be further based, in some embodiments, on either known statistics of the input vector data (matrix B) or bounds on the statistics of the input vector data. In one example, the gain may be determined as part of a training procedure. That is, the gain is a parameter that can be learned. In other embodiments, the gain parameter may be learned without using machine learning techniques. For example, it may be determined whether a particular gain level is sufficiently accurate for the training data, and if not, it may be tuned until it is. Further, it may be desirable to regularize the gain during a training procedure towards lower values, for example by adding a regularization loss term to the overall training loss function, to reduce the amount of energy needed when evaluating the computation in the analog processor or to enable the analog processor to be operated at a higher bandwidth while conserving the gain-bandwidth product of amplifiers.

In some embodiments, the gain settings may differ for each layer of a neural network. In some such embodiments, it may be desirable to learn the gain settings for each layer, and the gain may be varied when transitioning from one layer to the next. In some embodiments, when an accelerator receives new data, the controller may set the gain to the value used in training the new data.

An example of an accelerator based on the techniques described above is illustrated in FIG. 1-7A, in accordance with some embodiments. Similar to accelerator 1-100, accelerator 1-700 includes DAC unit 1-102, analog processor 1-104 and ADC unit 1-106. Accelerator 1-700 further includes analog scaling unit 1-103, which is placed between DAC unit 1-102 and analog processor 1-104, and analog scaling unit 1-105, which is placed between analog processor 1-104 and ADC unit 1-106. The components of FIG. 1-7A, and optionally other components, are collectively referred to herein as "circuitry."

Unlike accelerator 1-100, accelerator 1-700 is configured to perform mathematical operations in a single pass. Therefore, digital accumulator 1-110 is omitted. However, as described in detail further above, techniques for improving the accuracy of low-precision fixed-point representations may be used with accelerators arranged to perform multiple passes. In particular, multiple passes can be performed between different levels of precision of the input data and the values encoded in the analog processor.

The scaling described in connection with FIG. 1-6A may be performed anywhere along the data path from the DAC unit to the ADC unit. Analog scaling unit 1-103 may be configured to scale (e.g., amplify or attenuate) the analog signals before they are provided to the analog processor. Analog scaling unit 1-105 may be configured to scale the analog signals after the analog processor 1-104. The analog scaling units may comprise any suitable type of controllable amplifier or attenuator, including voltage amplifiers, current amplifiers, power amplifiers, transimpedance amplifiers, transconductance amplifiers, voltage attenuators, current attenuators, and power attenuators, among others. In a photonic analog processor, as described in detail further below, the analog scaling unit can be one of the aforementioned analog scaling units, an optical amplifier, or a variable gain laser, among others. In the example of FIG. 1-7B, analog scaling unit 1-103 comprises a plurality of amplifiers or attenuators 1-702. Controller 1-120 sets the gains of these devices. (Gain is referred to herein to indicate amplification or attenuation, depending on whether the gain is greater or less than 1).

FIG. 1-8 is a flowchart illustrating an example of a method for performing a mathematical operation, in accordance with some embodiments. In some embodiments, accelerator 1-700 (FIG. 1-7A) may perform method 1-800, though any other suitable accelerator may be used. It should be appreciated that the steps of method 1-800 may be performed in the order depicted in FIG. 1-8, or in any other suitable order.

At step 1-801, accelerator 1-700 receives an input data set. Referring back to FIG. 1-2B, for example, the accelerator may receive the entries of matrix B.

At step 1-802, accelerator 1-700 generates a plurality of input analog signals based on the input data set received at step 1-801. Referring back to FIG. 1-7A, in some embodiments, the generation of step 1-804 involves converting the input data set to analog signals using DAC unit 1-102.

At step 1-804, controller 1-120 determines one or more scaling factors. As described above, the scaling factor(s) may be determined in some embodiments based on the set of parameters and the input data set. For example, the scaling factor may be determined based on statistics of the set of parameters and statistics of the input data set. Alternatively, the scaling factor may be determined based on statistics of the set of parameters and assumptions about the statistics of the input data set. In some embodiments, two scaling factors may be determined—one for analog scaling unit 1-103 and one for analog scaling unit 1-105.

As described above, there may be an optimum gain value that maximizes the accuracy of the computation being performed with the numeric representation. Though the optimum gain may not be known a priori, in some embodiments, the gain may be learned as part of a training procedure. FIG. 1-9A is a plot illustrating the accuracy, expressed in percentage, of a neural network performing an image classification task, as a function of the gain. As shown in the figure, there is an optimum gain that maximizes the accuracy, which may be learned as part of a training procedure. In some embodiments, the optimum may be computed prior to performing method 1-800, and information indicative of the optimum gain may be stored in a memory or look-up table to be retrieved during methods 1-800.

At step 1-806, controller 1-120 sets the gain of analog scaling unit 1-103 and/or the gain of analog scaling unit 1-105 based on the scaling factor(s) determined at step 1-806.

At step 1-808, analog scaling unit 1-103 amplifies or attenuates the input analog signal produced by DAC unit 1-102 based on the scaling factor(s). As discussed above, this may cause the signal distribution to match the dynamic range of the ADCs more closely.

At step 1-810, controller 1-120 programs analog processor 1-104. More specifically, controller 1-120 programs analog processor 1-104 based on the set of parameters (e.g., based on the parameters of matrix A). Programming the analog processor may involve setting certain characteristics of the analog processor based on the parameters, as described above in connection with FIG. 1-2A and FIG. 1-3.

At step 1-812, analog processor 1-104 generates a plurality of output analog signals based on the plurality of input analog signals and the set of parameters with which the analog processor was programmed at step 1-810. This may involve, in some embodiments, performing a matrix multiplication or a convolution. As in the example of FIG. 1-3, the operation may be performed using a matrix decomposition.

At step 1-814, accelerator 1-700 amplifies or attenuates the analog signals output by DAC unit 1-102 with the gain or attenuation factor determined at step 1-806. The amplification or attenuation may be performed using analog scaling unit 1-105. In some embodiments, only one between steps 1-808 and 1-814 is performed. That is, signals are amplified or attenuated only before or after passing through analog processor 1-104. In other embodiments, both steps are performed.

At step 1-816, accelerator 1-700 generates an output data set based on the plurality of output analog signals obtained at step 1-814. In some embodiments, the generation of step 1-816 involves passing the output analog signals through ADC unit 1-106.

The inventors have appreciated that, in some embodiments, it may be beneficial to vary the gain or attenuation factor in a multi-layer (e.g., multi-pass) neural network model from layer to layer. In fact, the inventors have appreciated that the error of a low-precision fixed-point representation may be layer-dependent. FIG. 1-9B plots how the mean square error associated with a low-precision fixed-point representation varies as a function of the gain over three different layers of a neural network. The mean square error is computed relative to a FP32 representation. In this particular example, setting the gain to 2 minimizes the mean square error of the second layer, setting the gain to 4 minimizes the mean square error of the third layer and setting the gain to 6 minimizes the mean square error of the fourth layer. This occurs primarily due to changing data distributions at different layers of the neural network model. Accordingly, in some embodiments, the gain may be varied from layer to layer. The gain may additionally be varied between any suitable sub-portion of the network that is assigned to the processor, including but not limited to tiles of matrices within a layer.

The accelerator of FIG. 1-10 combines aspects described in connection with the accelerator of FIG. 1-2A with aspects described in connection with the accelerator of FIG. 1-7A. Accelerator 1-1000 includes DAC unit 1-102, analog scaling unit 1-103, analog processor 1-104, analog scaling unit 1-105, ADC unit 1-106, digital scaling unit 1-108, digital accumulation unit 1-110 and controller 1-120. Accelerator 1-1000 is configured to perform multiple passes through analog processor 1-104 as described in connection with FIG. 1-2A, and is also configured to perform amplification or attenuation as described in connection with FIG. 1-7A. The components of FIG. 1-10, and optionally other components, are collectively referred to herein as "circuitry."

FIG. 1-11 is a flowchart illustrating an example of a method for performing a mathematical operation, in accordance with some embodiments. Method 1-1100 may be performed using accelerator 1-1000 (FIG. 1-10), though any other suitable accelerator may be used. Method 1-1100 is similar to method 1-300, though it further includes some of the steps of method 1-800.

V. Examples of Optical Analog-Digital Matrix Processors

The inventors have developed a particular class of analog processors that uses light signals. The inventors have appreciated that, because light signals travel at the speed of light in the medium in which the light is traveling, latency is far less of a limitation than in electrical systems. Additionally, virtually no power is dissipated by increasing the distance traveled by the light signals, opening up new topologies and processor layouts that would not be feasible using electrical signals. Thus, photonic processors may be used in some embodiments as part of an accelerator.

Any of the techniques described above may be applied to accelerators that include photonic processors. One example of such an accelerator is illustrated in FIG. 1-12, in accordance with some embodiments. Accelerator 1-1200 includes a DAC unit 1-102, one or more lasers 1-1250, an optical encoder 1-1201, an optical scaling unit 1-1203, a photonic processor 1-1204, an optical scaling unit 1-1205, an optical receiver 1-1207, an electronic analog scaling unit 1-105, an ADC unit 1-106, a digital scaling unit 1-108, a digital accumulation unit 1-110 and a controller 1-120. Though using optical signals, accelerator 1-1200 may be configured to operate in a manner similar to that of accelerator 1-100 (FIG. 1-2A), in a manner similar to that of accelerator 1-700 (FIG. 1-7A), in a manner similar to that of accelerator 1-1000 (FIG. 1-10), or any suitable combination of these accelerators. Photonic processor 1-1204 may be designed to perform mathematical operations similar to those performed by analog processor 1-104 (FIG. 1-2A and FIG. 1-7A), but in the optical domain. Examples of photonic processors are described in detail further below. The components of FIG. 1-12 (whether optical or electronic), and optionally other components, are collectively referred to herein as "circuitry."

DAC unit 1-102, electronic analog scaling unit 1-105, ADC unit 1-106, digital scaling unit 1-108 and digital accumulation unit 1-110 have characteristics similar to those described in connection with FIG. 1-2A and FIG. 1-7A.

Laser 1-1250 provides a reference optical signal to optical encoder 1-1201. In some embodiments, controller 1-120 may control the output power of the laser. Optical encoder 1-1201 is configured to convert analog signal received from DAC unit 1-102 to optically encoded signals to be processed by photonic processor 1-1204. In some embodiments, the optical signals represent the value and sign of the associated bit string as an amplitude and a phase of an optical pulse. In some embodiments, the phase may be limited to a binary choice of either a zero phase shift or a π phase shift, representing a positive and negative value, respectively. Embodiments are not limited to real input vector values. Complex vector components may be represented by, for example, using more than two phase values when encoding the optical signal.

Similar to analog scaling unit 1-103 (FIG. 1-7A), optical scaling unit 1-1203 may be configured to scale the optical input signals produced by optical encoder 1-1201 to match more closely the dynamic range of the ADCs. Further, optical scaling unit 1-1205 may be configured to scale the optical outputs of processor 1-1204. As in FIG. 1-7A, analog scaling unit 1-105 may be configured to scale the received electrical outputs to match more closely the dynamic range of the ADCs. In some embodiments, analog scaling unit 1-105 is implemented with a transimpedance amplifier. In addition or in alternative, the signal distribution may be adjusted to match more closely the dynamic range of the ADCs based on the output power of the laser. Effectively, the laser, which includes an optical amplification medium, may be utilized an amplifier. It should be appreciated that, while the example of FIG. 1-12 includes optical scaling unit 1-1203, optical scaling unit 1-1205, and electrical analog scaling unit 1-105, other embodiments may include only a subset of these units. In some embodiments, accelerator 1-1200 generates a plurality of amplified output optical signals using any combination of the following optical amplifiers: laser 1-1250, optical scaling unit 1-1203 and optical scaling 1-1205, as amplification or attenuation may be performed anywhere along the path to the ADCs.

Optical receiver 1-1207 is configured to convert optical signals into electrical signals. For example, optical receiver 1-1207 may include a plurality of photodetectors, such pn-junction photodiodes, pin-junction photodiodes, avalanche photodiodes or phototransistors. In some embodiments, the photodetectors include germanium photodiodes.

As in FIG. 1-2A, digital scaling unit 1-108 may be configured to scale partial output data sets, and digital accumulation unit 1-110 may be configured to accumulate scaled partial output data sets.

Photonic processor 1-1204 may be implemented in any of numerous ways. As described in connection with analog processor 1-104, photonic processor 1-1204 may be designed to perform matrix operations based on a matrix decomposition, examples of which are provided below. Different processor architectures may be used to encode a weight matrix. In some embodiments, this may be accomplished programmable photonic devices, such as optical modulators. Examples of optical modulators are optical resonant modulators, including ring and disk modulators. Another example is a Franz-Keldysh modulator. In some embodiments, programming a photonic processor based on the parameters of a matrix involves setting optical characteristics for the programmable photonic devices. For example, programming an optical resonator may involve programming the resonant frequency of the resonator, and programming a Franz-Keldysh modulator may involve programming the absorption of the modulator.

Other implementations of the photonic processor are now discussed.

FIG. 2-1 illustrates a photonic processing system 2-100 that may be used to implement some of the components of accelerator 1-1200, in accordance with some embodiments. Photonic processing system 2-100 includes an optical encoder 2-101, a photonic processor 2-103, an optical receiver 2-105, and a controller 2-107. Optical encoder 2-100 serves as optical encoder 1-1201 (FIG. 1-12), photonic processor 2-103 serves as photonic processor 1-1204, optical receiver 2-105 serves as optical receiver 1-1207 and controller 2-107 serves as controller 1-120. Though not illustrated in FIG. 2-1, in some embodiments an optical analog scaling unit may be inserted between optical encoder 2-101 and a photonic processor 2-103. Additionally, or alternatively, an optical analog scaling unit may be inserted between photonic processor 2-103 and optical receiver 2-105.

The photonic processing system 2-100 receives, for example from an external processor (e.g., a CPU), an input vector represented by a group of input bit strings and produces an output vector represented by a group of output bit strings. For example, if the input vector is an n-dimensional vector, the input vector may be represented by n separate bit strings, each bit string representing a respective component of the vector. The input bit string may be received as an electrical or optical signal from the external processor and the output bit string may be transmitted as an electrical or optical signal to the external processor. In some embodiments, the controller 2-107 does not necessarily output an output bit string after every process iteration. Instead, the controller 2-107 may use one or more output bit strings to determine a new input bit stream to feed through the components of the photonic processing system 2-100. In some embodiments, the output bit string itself may be used as the input bit string for a subsequent iteration of the process implemented by the photonic processing system 2-100. In other embodiments, multiple output bit streams are combined in various ways to determine a subsequent input bit string. For example, one or more output bit strings may be summed together as part of the determination of the subsequent input bit string.

The optical encoder 2-101 outputs n separate optical pulses that are transmitted to the photonic processor 2-103. Each output of the optical encoder 2-101 is coupled one-to-one to a single input of the photonic processor 2-103. In some embodiments, the optical encoder 2-101 may be disposed on the same substrate as the photonic processor 2-103 (e.g., the optical encoder 2-101 and the photonic processor 2-103 are on the same chip). In such embodiments, the optical signals may be transmitted from the optical encoder 2-101 to the photonic processor 2-103 in waveguides, such as silicon photonic waveguides. In other embodiments, the optical encoder 2-101 may be disposed on a separate substrate from the photonic processor 2-103. In such embodiments, the optical signals may be transmitted from the optical encoder 2-101 to the photonic processor 103 in optical fiber.

The photonic processor 2-103 performs the multiplication of the input vector by a matrix M. As described in detail below, the matrix M may be decomposed into three matrices using a combination of a singular value decomposition (SVD) and a unitary matrix decomposition. In some embodiments, the unitary matrix decomposition is performed with operations similar to Givens rotations in QR decomposition. For example, an SVD in combination with a Householder decomposition may be used. The decomposition of the matrix M into three constituent parts may be performed by the controller 2-107 and each of the constituent parts may be implemented by a portion of the photonic processor 2-103. In some embodiments, the photonic processor 2-103 includes three parts: a first array of variable beam splitters (VBSs) configured to implement a transformation on the array of input optical pulses that is equivalent to a first matrix multiplication (see, e.g., the first matrix module 2-301 of FIG. 2-3); a group of controllable optical elements configured to adjust the intensity and/or phase of each of the optical pulses received from the first array, the adjustment being equivalent to a second matrix multiplication by a diagonal matrix (see, e.g., the second matrix module 2-303 of FIG. 2-3); and a second array of VBSs configured to implement a transformation on the optical pulses received from the group of controllable electro-optical element, the transformation being equivalent to a third matrix multiplication (see, e.g., the third matrix module 2-305 of FIG. 3).

The photonic processor 2-103 outputs n separate optical pulses that are transmitted to the optical receiver 2-105. Each output of the photonic processor 2-103 is coupled one-to-one to a single input of the optical receiver 2-105. In some embodiments, the photonic processor 2-103 may be disposed on the same substrate as the optical receiver 2-105 (e.g., the photonic processor 2-103 and the optical receiver 2-105 are on the same chip). In such embodiments, the optical signals may be transmitted from the photonic processor 2-103 to the optical receiver 2-105 in silicon photonic waveguides. In other embodiments, the photonic processor 2-103 may be disposed on a separate substrate from the optical receiver 2-105. In such embodiments, the optical signals may be transmitted from the photonic processor 103 to the optical receiver 2-105 in optical fibers.

The optical receiver 2-105 receives the n optical pulses from the photonic processor 2-103. Each of the optical pulses is then converted to electrical signals. In some embodiments, the intensity and phase of each of the optical pulses is measured by optical detectors within the optical receiver. The electrical signals representing those measured values are then output to the controller 2-107.

The controller 2-107 includes a memory 2-109 and a processor 2-111 for controlling the optical encoder 2-101, the photonic processor 2-103 and the optical receiver 2-105. The memory 2-109 may be used to store input and output bit strings and measurement results from the optical receiver 2-105. The memory 2-109 also stores executable instructions that, when executed by the processor 2-111, control the optical encoder 2-101, perform the matrix decomposition algorithm, control the VBSs of the photonic processor 103, and control the optical receivers 2-105. The memory 2-109 may also include executable instructions that cause the processor 2-111 to determine a new input vector to send to the optical encoder based on a collection of one or more output vectors determined by the measurement performed by the optical receiver 2-105. In this way, the controller 2-107 can control an iterative process by which an input vector is multiplied by multiple matrices by adjusting the settings of the photonic processor 2-103 and feeding detection information from the optical receiver 2-105 back to the optical encoder 2-101. Thus, the output vector transmitted by the photonic processing system 2-100 to the external processor may be the result of multiple matrix multiplications, not simply a single matrix multiplication.

In some embodiments, a matrix may be too large to be encoded in the photonic processor using a single pass. In such situations, one portion of the large matrix may be encoded in the photonic processor and the multiplication process may be performed for that single portion of the large matrix. The results of that first operation may be stored in memory 2-109. Subsequently, a second portion of the large matrix may be encoded in the photonic processor and a second multiplication process may be performed. This "chunking" of the large matrix may continue until the multiplication process has been performed on all portions of the large matrix. The results of the multiple multiplication processes, which may be stored in memory 2-109, may then be combined to form the final result of the multiplication of the input vector by the large matrix.

In other embodiments, only collective behavior of the output vectors is used by the external processor. In such embodiments, only the collective result, such as the average or the maximum/minimum of multiple output vectors, is transmitted to the external processor.

A. Optical Encoders

Referring to FIG. 2-2, the optical encoder includes at least one light source 2-201, a power tree 2-203, an amplitude modulator 2-205, a phase modulator 2-207, a digital to analog converter (DAC) 2-209 associated with the amplitude modulator 2-205, and a DAC 2-211 associated with the phase modulator 2-207, according to some embodiments. DACs 2-209 and 2-211 may be part of DAC unit 1-102 (FIG. 1-12). While the amplitude modulator 2-205 and phase modulator 2-207 are illustrated in FIG. 2-2 as single blocks with n inputs and n outputs (each of the inputs and outputs being, for example, a waveguide), in some embodiments each waveguide may include a respective amplitude modulator and a respective phase modulator such that the optical encoder includes n amplitude modulators and n phase modulators. Moreover, there may be an individual DAC for each amplitude and phase modulator. In some embodiments, rather than having an amplitude modulator and a separate phase modulator associated with each waveguide, a single modulator may be used to encode both amplitude and phase information. While using a single modulator to perform such an encoding limits the ability to precisely tune both the amplitude and phase of each optical pulse, there are some encoding schemes that do not require precise tuning of both the amplitude and phase of the optical pulses. Such a scheme is described later herein.

The light source 2-201 may be any suitable source of coherent light. In some embodiments, the light source 2-201 may be a diode laser or a vertical-cavity surface emitting lasers (VCSEL). In some embodiments, the light source 2-201 is configured to have an output power greater than 10 mW, greater than 25 mW, greater than 50 mW, or greater than 75 mW. In some embodiments, the light source 2-201 is configured to have an output power less than 100 mW. The light source 2-201 may be configured to emit a continuous wave of light or pulses of light ("optical pulses") at one or more wavelengths (e.g., the C-band or O-band). The temporal duration of the optical pulses may be, for example, about 100 ps.

While light source 2-201 is illustrated in FIG. 2-2 as being on the same semiconductor substrate as the other components of the optical encoder, embodiments are not so limited. For example, the light source 2-201 may be a separate laser packaging that is edge-bonded or surface-bonded to the optical encoder chip. Alternatively, the light source 2-201 may be completely off-chip and the optical pulses may be coupled to a waveguide 2-202 of the optical encoder 2-101 via an optical fiber and/or a grating coupler.

The light source 2-201 is illustrated as two light sources 2-201a and 2-201b, but embodiments are not so limited. Some embodiments may include a single light source. Including multiple light sources 201a-b, which may include more than two light sources, can provide redundancy in case one of the light sources fails. Including multiple light sources may extend the useful lifetime of the photonic processing system 2-100. The multiple light sources 2-201a-b may each be coupled to a waveguide of the optical encoder 2-101 and then combined at a waveguide combiner that is configured to direct optical pulses from each light source to the power tree 2-203. In such embodiments, only one light source is used at any given time.

Some embodiments may use two or more phase-locked light sources of the same wavelength at the same time to increase the optical power entering the optical encoder system. A small portion of light from each of the two or more light sources (e.g., acquired via a waveguide tap) may be directed to a homodyne detector, where a beat error signal may be measured. The bear error signal may be used to determine possible phase drifts between the two light sources. The beat error signal may, for example, be fed into a feedback circuit that controls a phase modulator that phase locks the output of one light source to the phase of the other light source. The phase-locking can be generalized in a master-slave scheme, where N≥1 slave light sources are phase-locked to a single master light source. The result is a total of N+1 phase-locked light sources available to the optical encoder system.

In other embodiments, each separate light source may be associated with light of different wavelengths. Using multiple wavelengths of light allows some embodiments to be multiplexed such that multiple calculations may be performed simultaneously using the same optical hardware.

The power tree 2-203 is configured to divide a single optical pulse from the light source 2-201 into an array of spatially separated optical pulses. Thus, the power tree 2-203 has one optical input and n optical outputs. In some embodiments, the optical power from the light source 2-201 is split evenly across n optical modes associated with n waveguides. In some embodiments, the power tree 2-203 is an array of 50:50 beam splitters 2-801, as illustrated in FIG. 2-8. The number "depth" of the power tree 2-203 depends on the number of waveguides at the output. For a power tree with n output modes, the depth of the power tree 2-203 is ceil($\log_2(n)$). The power tree 2-203 of FIG. 2-8 only illustrates a tree depth of three (each layer of the tree is labeled across the bottom of the power tree 2-203). Each layer includes $2^{m-1}$ beam splitters, where m is the layer number. Consequently, the first layer has a single beam splitter 2-801a, the second layer has two beam splitters 2-801b-2-801c, and the third layer has four beam splitters 2-801d-2-801g.

While the power tree 2-203 is illustrated as an array of cascading beam splitters, which may be implemented as evanescent waveguide couplers, embodiments are not so limited as any optical device that converts one optical pulse into a plurality of spatially separated optical pulses may be used. For example, the power tree 2-203 may be implemented using one or more multimode interferometers (MMI), in which case the equations governing layer width and depth would be modified appropriately.

No matter what type of power tree 2-203 is used, it is likely that manufacturing a power tree 2-203 such that the splitting ratios are precisely even between the n output modes will be difficult, if not impossible. Accordingly, adjustments can be made to the setting of the amplitude modulators to correct for the unequal intensities of the n optical pulses output by the power tree. For example, the waveguide with the lowest optical power can be set as the maximum power for any given pulse transmitted to the photonic processor 2-103. Thus, any optical pulse with a power higher than the maximum power may be modulated to have a lower power by the amplitude modulator 2-205, in addition to the modulation to the amplitude being made to encode information into the optical pulse. A phase modulator may also be placed at each of the n output modes, which may be used to adjust the phase of each output mode of the power tree 2-203 such that all of the output signals have the same phase.

Alternatively or additionally, the power tree 2-203 may be implemented using one or more Mach-Zehnder Interferometers (MZI) that may be tuned such that the splitting ratios of each beam splitter in the power tree results in substantially equal intensity pulses at the output of the power tree 2-203.

The amplitude modulator 2-205 is configured to modify, based on a respective input bit string, the amplitude of each optical pulse received from the power tree 2-203. The amplitude modulator 2-205 may be a variable attenuator or any other suitable amplitude modulator controlled by the DAC 2-209, which may further be controlled by the controller 2-107. Some amplitude modulators are known for telecommunication applications and may be used in some embodiments. In some embodiments, a variable beam splitter may be used as an amplitude modulator 2-205, where only one output of the variable beam splitter is kept and the other output is discarded or ignored. Other examples of amplitude modulators that may be used in some embodiments include traveling wave modulators, cavity-based modulators, Franz-Keldysh modulators, plasmon-based modulators, 2-D material-based modulators and nano-opto-electro-mechanical switches (NOEMS).

The phase modulator 2-207 is configured to modify, based on the respective input bit string, the phase of each optical pulse received from the power tree 2-203. The phase modulator may be a thermo-optic phase shifter or any other suitable phase shifter that may be electrically controlled by the 2-211, which may further be controlled by the controller 2-107.

While FIG. 2-2 illustrates the amplitude modulator 2-205 and phase modulator 2-207 as two separate components, they may be combined into a single element that controls both the amplitudes and phases of the optical pulses. However, there are advantages to separately controlling the amplitude and phase of the optical pulse. Namely, due to the connection between amplitude shifts and phase shifts via the Kramers-Kronenig relations, there is a phase shift associated with any amplitude shift. To precisely control the phase of an optical pulse, the phase shift created by the amplitude modulator 2-205 should be compensated for using the phase modulator 2-207. By way of example, the total amplitude of an optical pulse exiting the optical encoder 2-101 is $A=a_0 a_1 a_2$ and the total phase of the optical pulse exiting the optical encoder is $\theta=\Delta\theta+\Delta\varphi+\varphi$, where $a_0$ is the input intensity of the input optical pulse (with an assumption of zero phase at the input of the modulators), $a_1$ is the amplitude attenuation of the amplitude modulator 2-205, $\Delta\theta$ is the phase shift imparted by the amplitude modulator 2-205 while modulating the amplitude, $\Delta\varphi$ is the phase shift imparted by the phase modulator 2-207, $a_2$ is the attenuation associated with the optical pulse passing through the phase modulator 2-209, and $\varphi$ is the phase imparted on the optical signal due to propagation of the light signal. Thus, setting the amplitude and the phase of an optical pulse is not two independent determinations. Rather, to accurately encode a particular amplitude and phase into an optical pulse output from the optical encoder 2-101, the settings of both the amplitude modulator 2-205 and the phase modulator 2-207 should be taken into account for both settings.

In some embodiments, the amplitude of an optical pulse is directly related to the bit string value. For example, a high amplitude pulse corresponds to a high bit string value and a low amplitude pulse corresponds to a low bit string value.

The phase of an optical pulse encodes whether the bit string value is positive or negative. In some embodiments, the phase of an optical pulse output by the optical encoder 2-101 may be selected from two phases that are 180 degrees (π radians) apart. For example, positive bit string values may be encoded with a zero degree phase shift and negative bit string values may be encoded with a 180 degree (π radians) phase shift. In some embodiments, the vector is intended to be complex-valued and thus the phase of the optical pulse is chosen from more than just two values between 0 and 2π.

In some embodiments, the controller 2-107 determines the amplitude and phase to be applied by both the amplitude modulator 2-205 and the phase modulator 2-207 based on the input bit string and the equations above linking the output amplitude and output phase to the amplitudes and phases imparted by the amplitude modulator 2-204 and the phase modulator 2-207. In some embodiments, the controller 2-107 may store in memory 2-109 a table of digital values for driving the amplitude modulator 2-205 and the phase modulator 2-207. In some embodiments, the memory may be placed in close proximity to the modulators to reduce the communication temporal latency and power consumption.

DAC 2-209, associated with and communicatively coupled to the amplitude modulator 2-205, receives the digital driving value from the controller 2-107 and converts the digital driving value to an analog voltage that drives the amplitude modulator 2-205. Similarly, the DAC 2-211, associated with and communicatively coupled to the phase modulator 2-207, receives the digital driving value from the controller 2-107 and converts the digital driving value to an analog voltage that drives the phase modulator 2-207. In some embodiments, the DAC may include an amplifier that amplifies the analog voltages to sufficiently high levels to achieve the desired extinction ratio within the amplitude modulators (e.g., the highest extinction ratio physically possible to implement using the particular phase modulator) and the desired phase shift range within the phase modulators (e.g., a phase shift range that covers the full range between 0 and 2n). While the DAC 2-209 and the DAC 2-211 are illustrated in FIG. 2-2 as being located in and/or on the chip of the optical encoder 2-101, in some embodiments, the DACs 2-209 and 2-211 may be located off-chip while still being communicatively coupled to the amplitude modulator 2-205 and the phase modulator 2-207, respectively, with electrically conductive traces and/or wires.

After modulation by the amplitude modulator 2-205 and the phase modulator 2-207, the n optical pulses are transmitted from the optical encoder 2-101 to the photonic processor 2-103.

B. Photonic Processors

Referring to FIG. 2-3, the photonic processor 2-103 implements matrix multiplication on an input vector represented by the n input optical pulse and includes three main components: a first matrix module 2-301, a second matrix module 2-303, and a third matrix module 2-305. In some embodiments, as discussed in more detail below, the first matrix module 2-301 and the third matrix module 2-305 include an interconnected array of programmable, reconfigurable, variable beam splitters (VBSs) configured to transform the n input optical pulses from an input vector to an output vector, the components of the vectors being represented by the amplitude and phase of each of the optical pulses. In some embodiments, the second matrix module 2-303 includes a group of electro-optic elements.

The matrix by which the input vector is multiplied, by passing the input optical pulses through the photonic processor 2-103, is referred to as A. The matrix A is a general m×n known to the controller 2-107 as the matrix that should be implemented by the photonic processor 2-103. As such, the controller 2-107 decomposes the matrix A using a singular value decomposition (SVD) such that the matrix A is represented by three constituent matrices: $A=V^T\Sigma U$, where U and V are real orthogonal n×n and m×m matrices, respectively ($U^TU=UU^T=I$ and $V^TV=VV^T=I$), and I is an m×n diagonal matrix with real entries. The superscript "T" in all equations represents the transpose of the associated matrix. Determining the SVD of a matrix is known and the controller 2-107 may use any suitable technique to determine the SVD of the matrix A. In some embodiments, the matrix A is a complex matrix, in which case the matrix A can be decomposed into $A=V^T\Sigma U$, where V and U are complex unitary n×n and m×m matrices, respectively $U^\dagger U=UU^\dagger=I$ and $V^\dagger V=VV^\dagger=I$), and Σ is an m×n diagonal matrix with real or complex entries. The values of the diagonal singular values may also be further normalized such that the maximum absolute value of the singular values is 1.

Once the controller 2-107 has determined the matrices U, Σ and V for the matrix A, in the case where the matrices U and V are orthogonal real matrices, the control may further decompose the two orthogonal matrices U and V into a series of real-valued Givens rotation matrices. A Givens rotation matrix G (i, j, θ) is defined component-wise by the following equations:

$g_{kk}=1$ for $k \neq i,j$ $g_{kk}=\cos(\theta)$ for $k=i,j$ $g_{ij}=-g_{ji}=-\sin(\theta)$, $g_{ki}=0$ otherwise, where $g_{ij}$ represents the element in the i-th row and j-th column of the matrix G and θ is the angle of rotation associated with the matrix. Generally, the matrix G is an arbitrary 2×2 unitary matrix with determinant 1 (SU(2) group) and it is parameterized by two parameters. In some embodiments, those two parameters are the rotation angle θ and another phase value φ. Nevertheless, the matrix G can be parameterized by other values other than angles or phases, e.g. by reflectivities/transmissivities or by separation distances (in the case of NOEMS).

Algorithms for expressing an arbitrary real orthogonal matrix in terms of a product of sets of Givens rotations in the complex space are provided in M. Reck, et al., "Experimental realization of any discrete unitary operator," Physical Review Letters 73, 58 (1994) ("Reck"), and W. R. Clements, et al., "Optimal design for universal multiport interferometers," Optica 3, 12 (2016) ("Clements"), both of which are incorporated herein by reference in their entirety and at least for their discussions of techniques for decomposing a real orthogonal matrix in terms of Givens rotations. (In the case that any terminology used herein conflicts with the usage of that terminology in Reck and/or Clements, the terminology should be afforded a meaning most consistent with how a person of ordinary skill would understand its usage herein.). The resulting decomposition is given by the following equation:

$$U = D \prod_{k=1}^{n} \prod_{(i,j) \in S_k} G(i, j, \theta_{ij}^{(k)}),$$

where U is an n×n orthogonal matrix, $S_k$ is the set of indices relevant to the k-th set of Givens rotations applied (as defined by the decomposition algorithm), $\theta_{ij}^{(k)}$ represents the angle applied for the Givens rotation between components i and j in the k-th set of Givens rotations, and D is a diagonal matrix of either +1 or −1 entries representing global signs on each component. The set of indices $S_k$ is dependent on whether n is even or odd. For example, when n is even:

$S_k = \{(1,2),(3,4), \ldots ,(n-1,n)\}$ for odd $k$ $S_k = \{(2,3),(4,5), \ldots ,(n-2,n+1)\}$ for even $k$ When n is odd:

$S_k = \{(1,2),(3,4), \ldots ,(n-2,n-1)\}$ for odd $k$ $S_k = \{(2,3),(4,5), \ldots ,(n-1,n)\}$ for even $k$ By way of example and not limitation, the decomposition of a 4×4 orthogonal matrix can be represented as:

$$U = DG(1,2,\theta_{12}^{(1)})G(3,4,\theta_{34}^{(1)})G(2,3,\theta_{23}^{(2)})$$
$$G(1,2,\theta_{12}^{(3)})G(3,4,\theta_{34}^{(3)})G(2,3,\theta_{23}^{(4)})$$

A brief overview of one embodiment of an algorithm for decomposing an n×n matrix U in terms of n sets of real-valued Givens rotations, which may be implemented using the controller 2-107, is as follows:

U'←U
For i from 1 to n−1
  If i is odd:|
    For j=0 to i−1:
      Find $G^T_{i-j, i-j-1}(\theta)$ that nullifies element $U'_{n-j,i-j}$
      i.e. $\theta = \tan^{-1}(U'_{n-j,i-j}/U'_{n-j,i-j+1})$
      $U' \leftarrow U'G^T_{i-j,i-j+1}(\theta)$
  Else if i is even:
    For i=1 to i:
      Find $G_{n+j-i-1, n-j-1}(\theta)$ that nullifies element $U'_{n+j,i-j}$ i.e. $\theta = \tan^{-1}(-U'_{n-j-i,j}/U'_{n+j,i-j})$
      $U' \leftarrow G_{n+j-i-1,n-j-1}(\theta)U'$ The resultant matrix U' of the above algorithm is lower triangular and is related to the original matrix U by the equation:

$$U = \prod_{(j,k) \in S_L} G^T_{jk} U' \prod_{(j,k) \in S_R} G_{jk} = D_U \prod_{(j,k) \in S} G_{jk},$$

where the label $S_L$ labels the set of two modes connected by the VBS to the left of U' and the label $S_R$ labels the set of two modes connected by the VBS to the right of U'. Because U is an orthogonal matrix, U' is a diagonal matrix with $\{-1,1\}$ entries along the diagonal. This matrix, $U' = D_U$, is referred to as a "phase screen."

The next step of the algorithm, is to repeatedly find $(G^T_{jk}(\theta_1)D_U = D_U G_{jk}(\theta_2))$ which is accomplished using the following algorithm, which may be implemented using the controller 2-107:

For every (j,k) in S:
  If $U'_{j,j}$ and $U'_{k,k}$ have different signs:
    $\eta_2 = -\theta_1$
  Else:
    $\theta_2 = \theta_1$ The above algorithm may also be used to decompose V and/or $V^T$ to determine the m layers of VBS values and the associated phase screen.

The above concept of decomposing an orthogonal matrix into real-valued Givens rotation matrices can be expanded to complex matrices, e.g., unitary matrices rather than orthogonal matrices. In some embodiments, this may be accomplished by including an additional phase in the parameterization of the Givens rotation matrices. Thus, a general form of the Givens matrices with the addition of the additional phase term is $T(i,j,\theta,\phi)$, where $t_{kk}=1$ for $k \neq i,j$, $t_{ii}=e^{i\phi} \cos(\theta)$, $t_{jj}=\cos(\theta)$, $t_{ij}=-\sin(\theta)$, $t_{ji}=e^{i\phi} \sin(\theta)$, $t_{kl}=0$ otherwise, where $t_{ij}$ represents the i-th row and j-th column of the matrix T, $\theta$ is the angle of rotation associated with the matrix, and $\phi$ is the additional phase. Any unitary matrix can be decomposed into matrices of the type $T(i,j,\theta,\phi)$. By making the choice to set the phase $\phi=0$, the conventional real-valued Givens rotation matrices described above are obtained. If, instead, the phase $\phi=\eta$, then a set of matrices known as Householder matrices are obtained. A Householder matrix, H, has the form $H=I-(v \otimes v)$, where I is the n×n identity matrix, v is a unit vector, and $\otimes$ is the outer product. Householder matrices represent reflections about a hyperplane orthogonal to the unit vector v. In this parameterization the hyperplane is a two-dimensional subspace, rather than an n−1 dimensional subspace as is common in defining Householder matrices for the QR decomposition. Thus, a decomposition of a matrix into Givens rotations is equivalent to a decomposition of the matrix into Householder matrices.

Based on the aforementioned decomposition of an arbitrary unitary matrix into a restricted set of Givens rotations, any unitary matrix can be implemented by a particular sequence of rotations and phase shifts. And in photonics, rotations may be represented by variable beam splitters (VBS) and phase shifts are readily implemented using phase modulators. Accordingly, for the n optical inputs of the photonic processor 2-103, the first matrix module 2-301 and the third matrix module 2-305, representing the unitary matrices of the SVD of the matrix A may be implemented by an interconnected array of VBSs and phase shifters. Because of the parallel nature of simultaneously passing n optical pulses through a VBS array, matrix multiplication of dimension $(I,K) \times (K,J)$ can be performed in $O(IJK/n^2)$ time. The second matrix module 2-303 is a diagonal matrix of the SVD of the matrix A combined with the diagonal matrices D associated with each of the orthogonal matrices of the SVD. As mentioned above, each matrix D is referred to as a "phase screen" and can be labeled with a subscript to denote whether it is the phase screen associated with the matrix U or the matrix V. Thus, the second matrix module 303 is the matrix $\Sigma' = D_V \Sigma D_U$. Factoring these phase screens out of the matrix U and the matrix V, we obtain the matrix U and V in FIG. 2-3.

In some embodiments, the VBS unit cell of the photonic processor 2-103 associated with the first matrix module 2-301 and the third matrix module 2-305 may be a Mach-Zehnder interferometer (MZI) with an internal phase shifter. In other embodiments, the VBS unit cell may be a microelectromechanical systems (MEMS) actuator. An external phase shifter may be used in some embodiments to implement the additional phase needed for the Givens rotations.

The second matrix module 2-303, representing the diagonal matrix $D_V \Sigma D_U$ may be implemented using an amplitude modulator and a phase shifter. In some embodiments, a VBS may be used to split off a portion of light that can be dumped to variably attenuate an optical pulse. Additionally or alternatively, a controllable gain medium may be used to amplify an optical signal. For example, GaAs, InGaAs, GaN, or InP may be used as an active gain medium for amplifying an optical signal. Other active gain processes such as the second harmonic generation in materials with crystal inversion symmetric, e.g. KTP and lithium niobate, and the four-wave mixing processes in materials that lack inversion symmetry, e.g. silicon, can also be used. A phase shifter in each optical mode may be used to apply either a zero or a π phase shift, depending on the phase screen being implemented. In some embodiments, only a single phase shifter for each optical mode is used rather than one phase shifter for each phase screen. This is possible because each of the matrices $D_V$, $\Sigma$, and $D_U$ are diagonal and therefore commute. Thus, the value of each phase shifter of the second matrix module 2-303 of the photonic processor 2-103 is the result of the product of the two phase screens: $D_V D_U$.

Figures 1, 2, 3, 4, 4A:
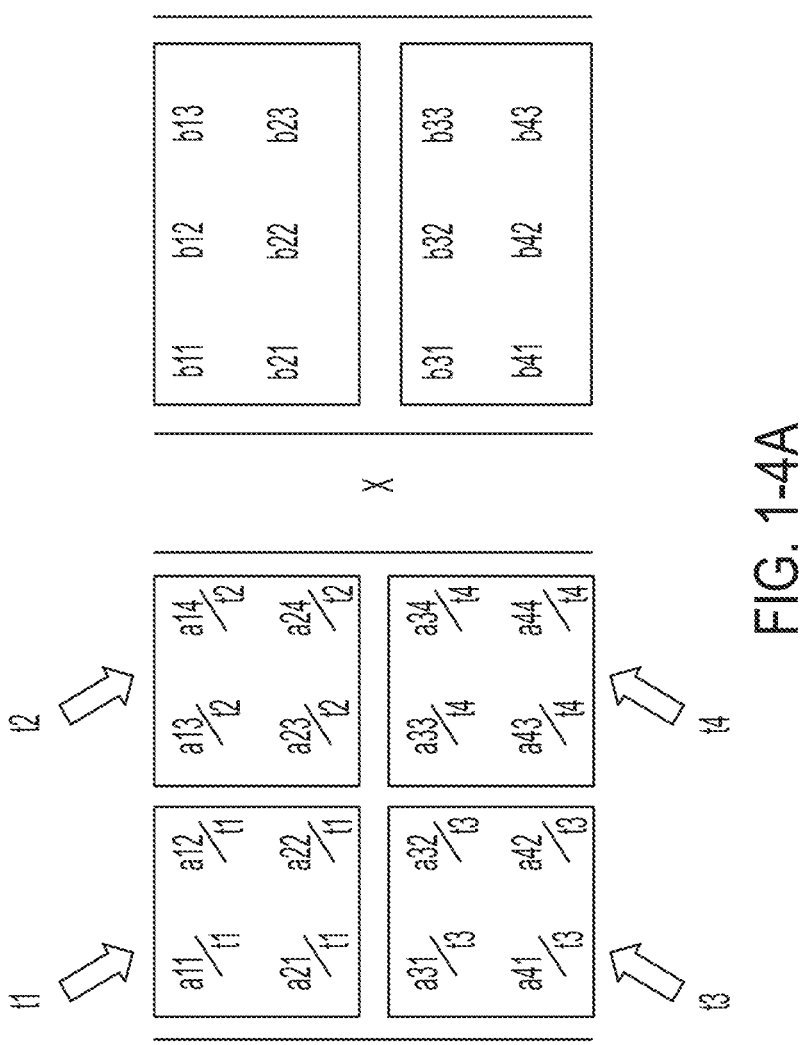
Figures 1, 2, 3, 4, 4B:
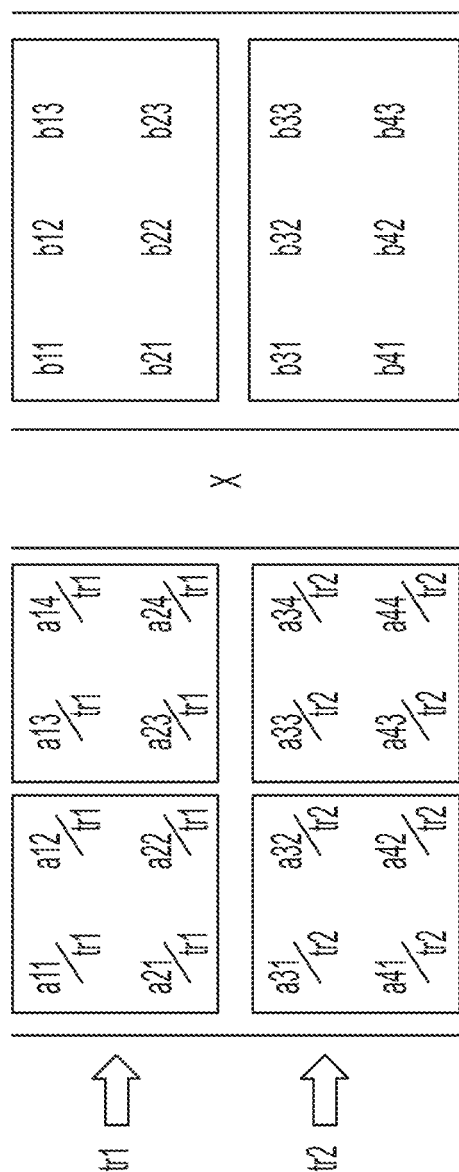
Figures 1, 2, 3, 4, 4C:
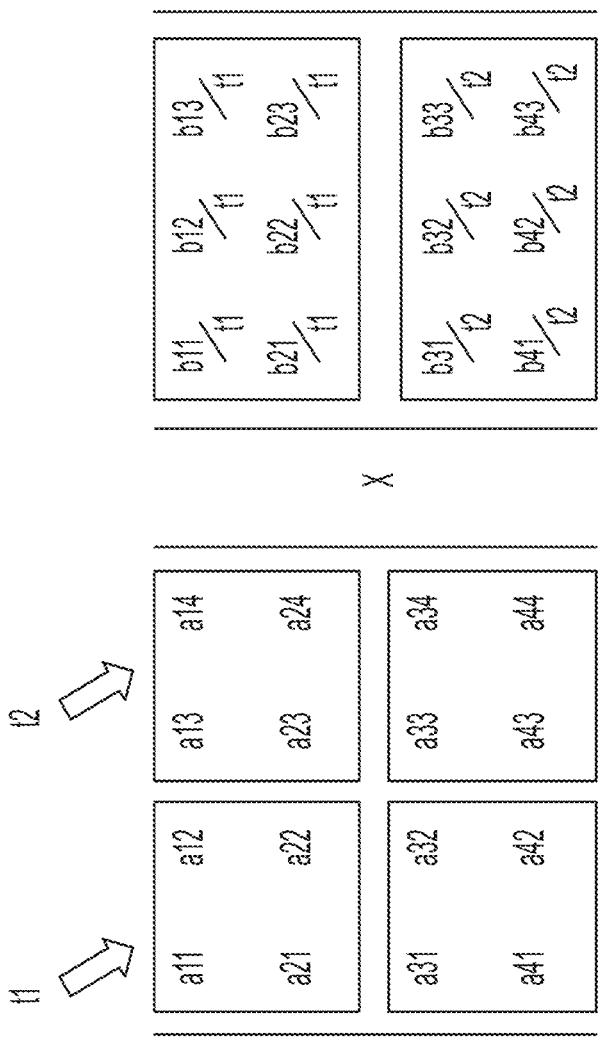
Figures 1, 2, 3, 4, 4D:
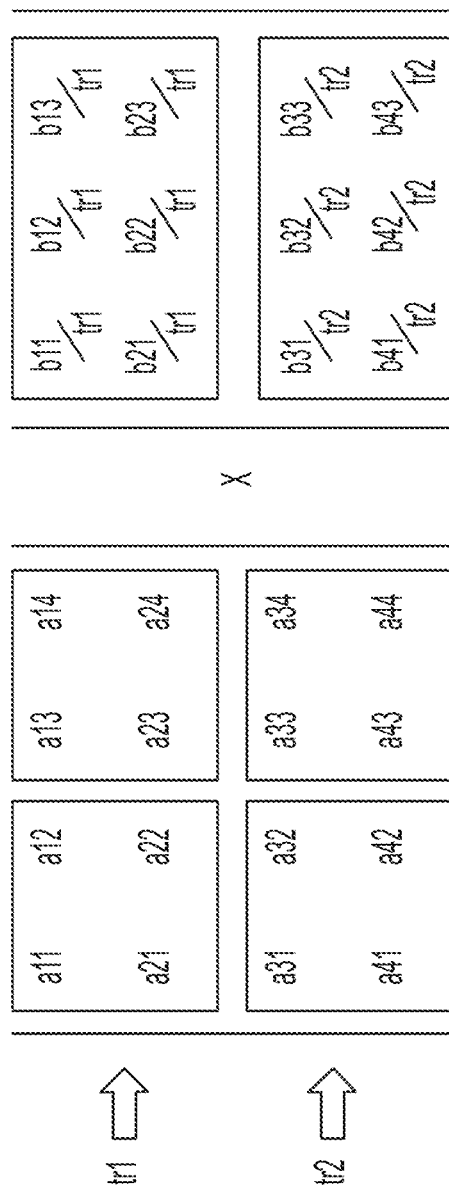
Figures 1, 2, 3, 4, 5, 5A:
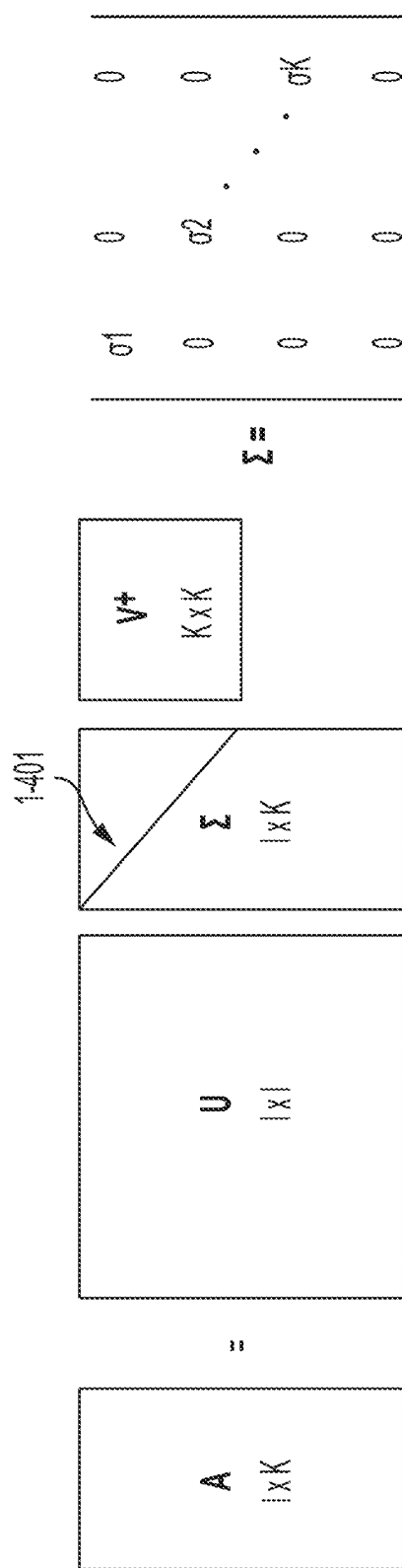
Figures 1, 2, 3, 4, 5, 5B:
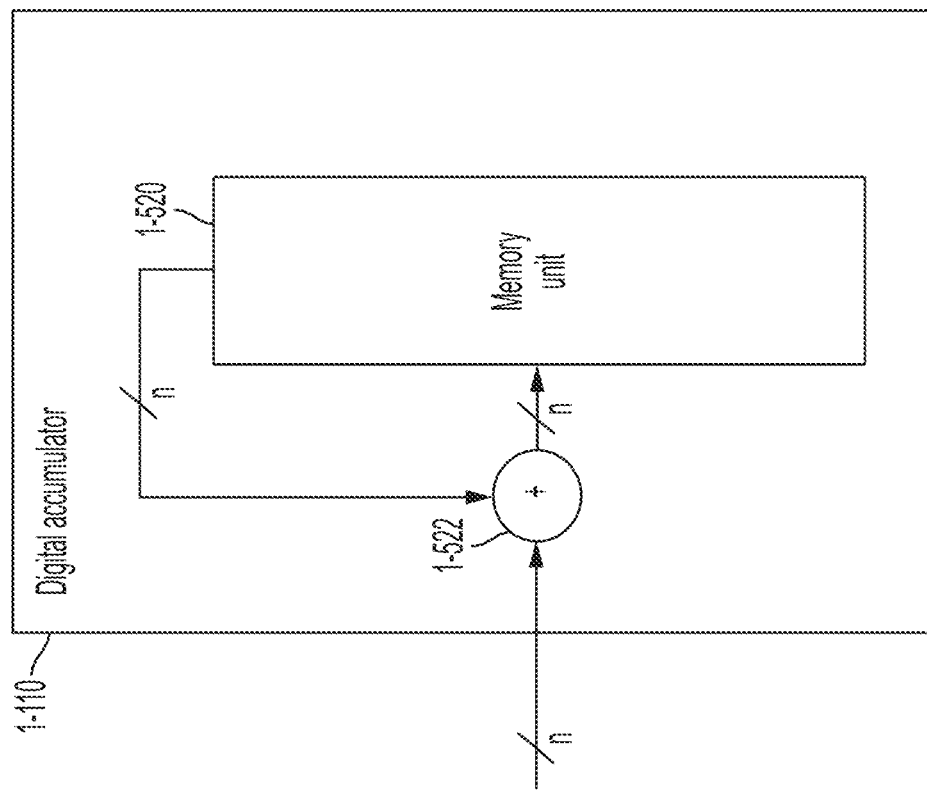
Figures 1, 2, 3, 4, 5, 6, 6A:
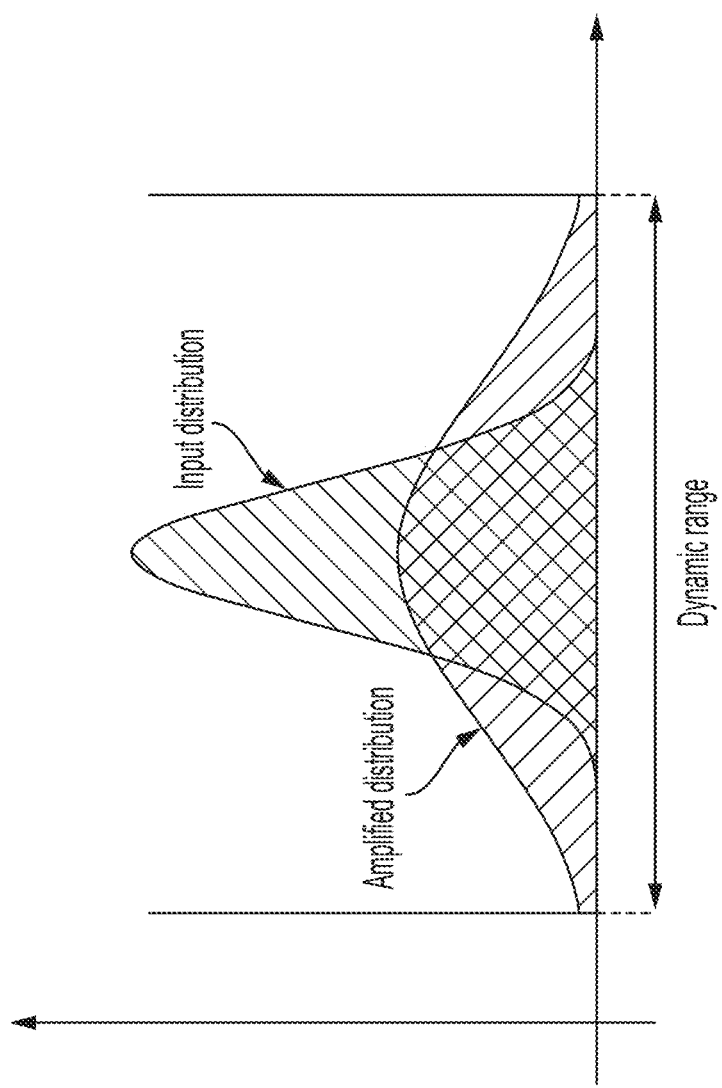
Figures 1, 2, 3, 4, 5, 6, 6B:
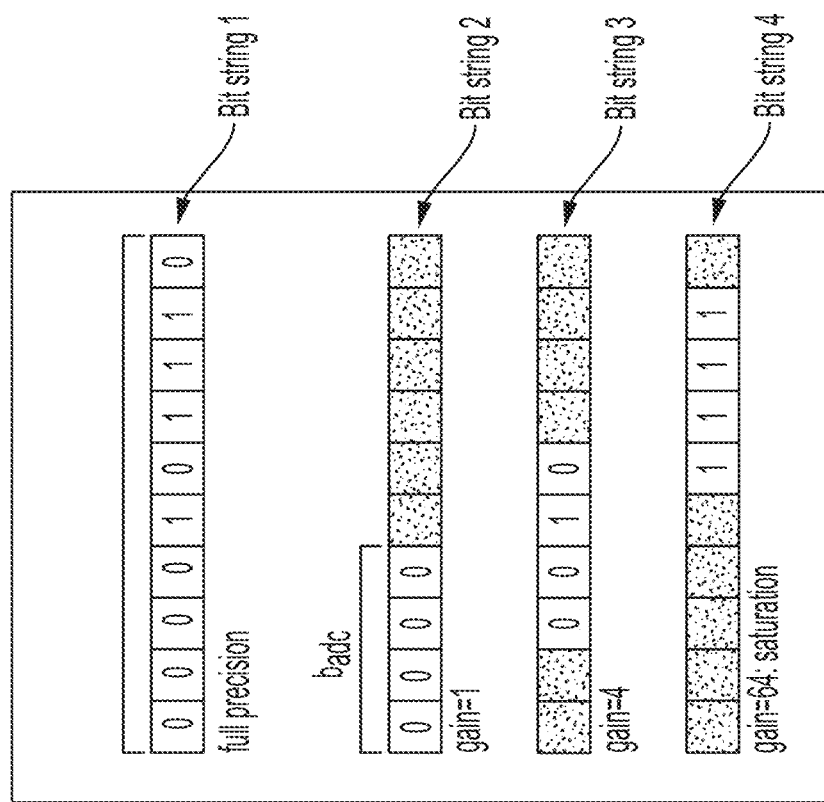
Figures 1, 2, 3, 4, 5, 6, 7, 7A:
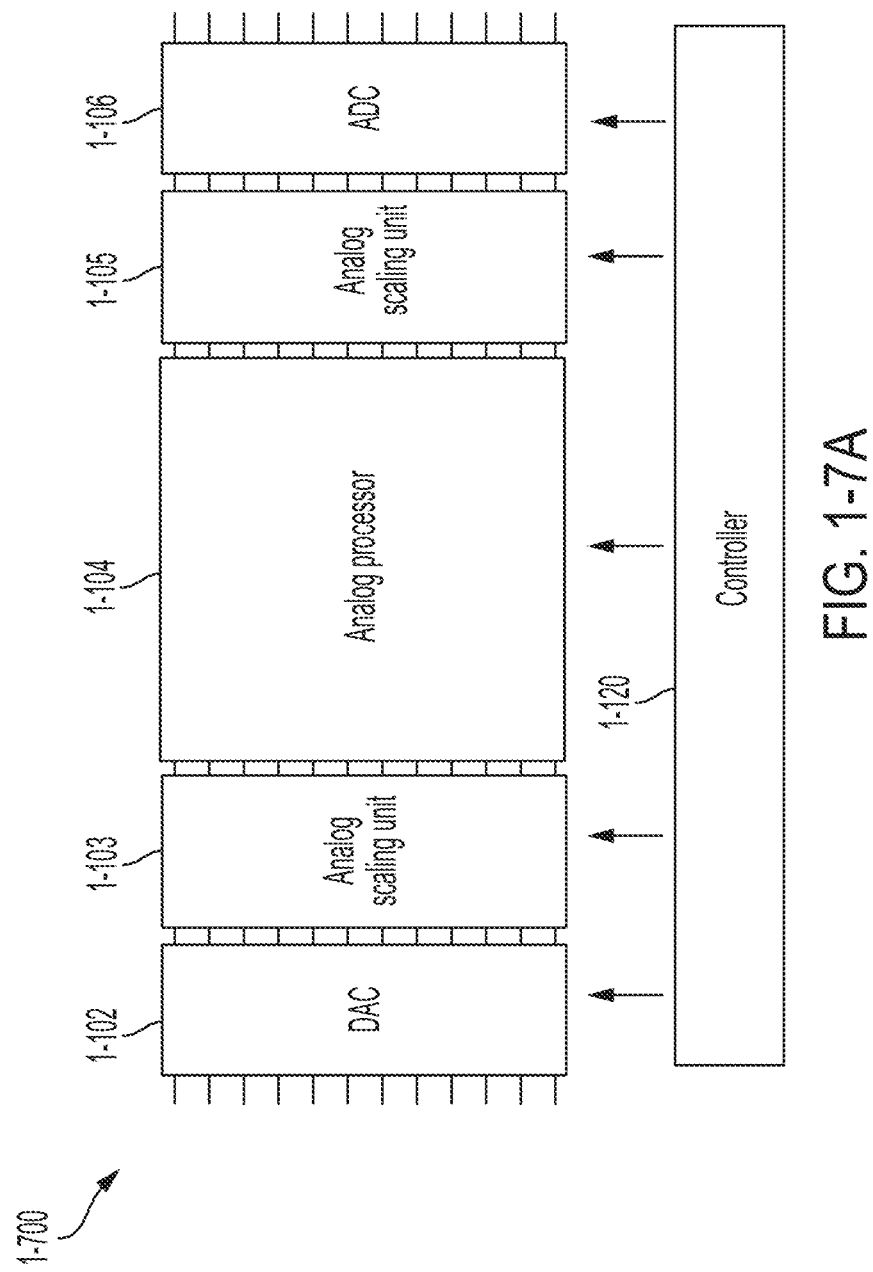
Figures 1, 2, 3, 4, 5, 6, 7, 7B:
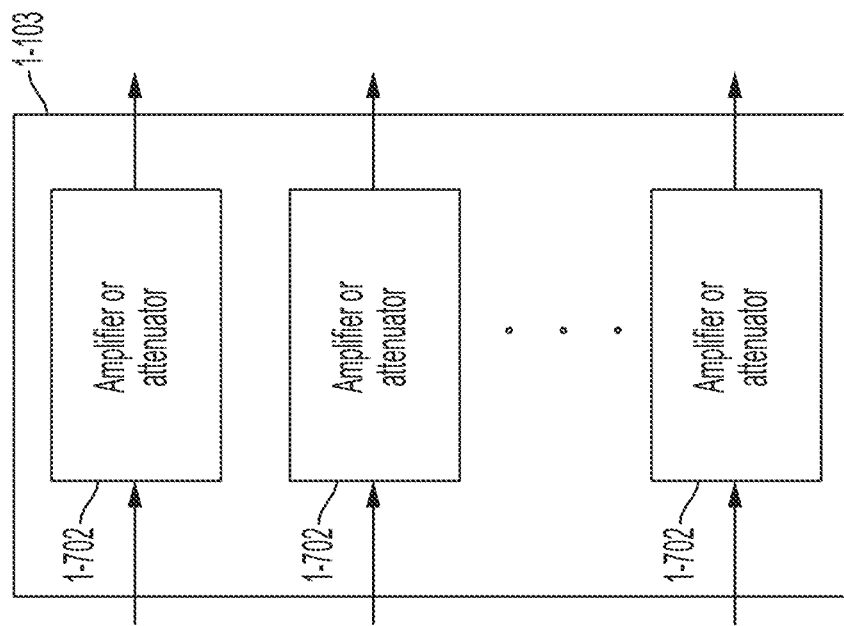
Figures 1, 2, 3, 4, 5, 6, 7, 8:
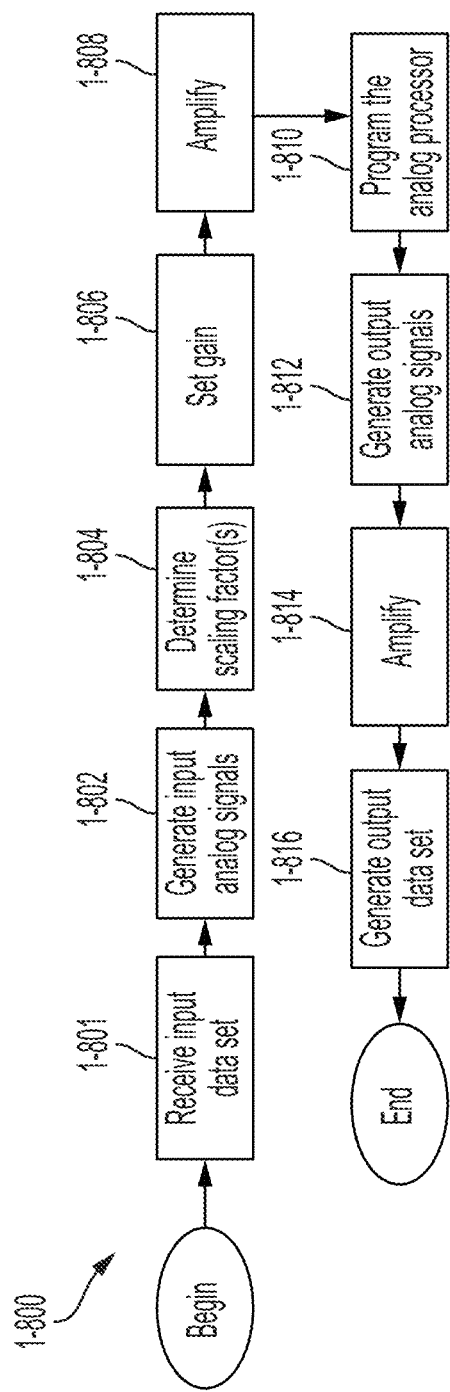
Figures 1, 2, 3, 4, 5, 6, 7, 8, 9, 9A:
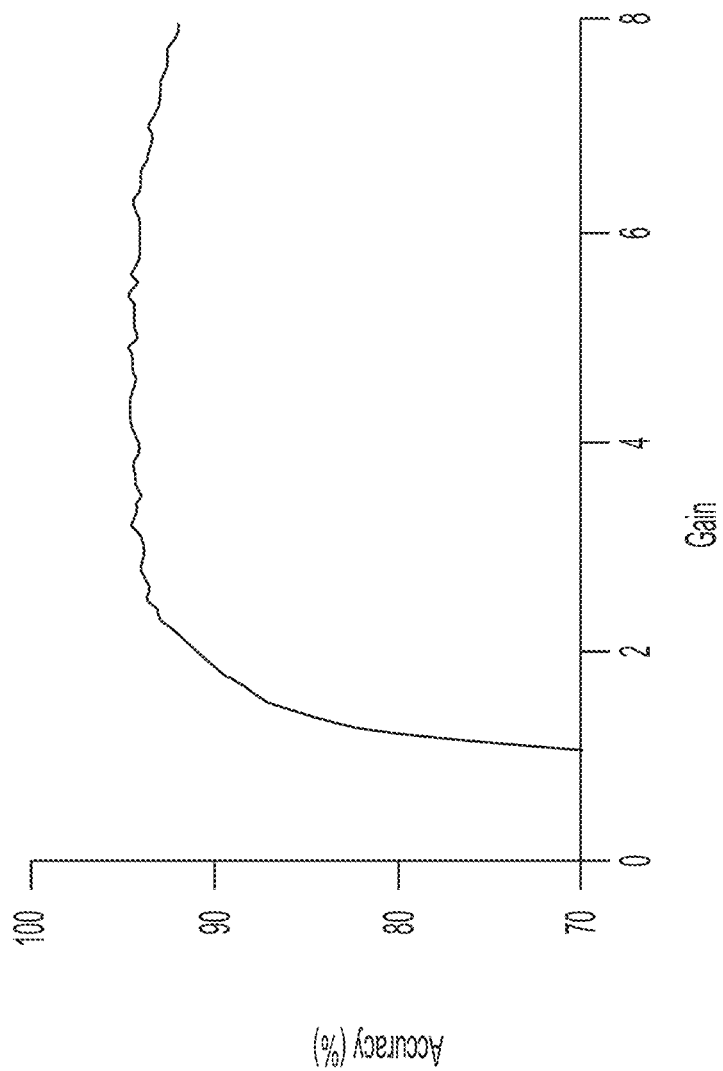
Figures 1, 2, 3, 4, 5, 6, 7, 8, 9, 9B:
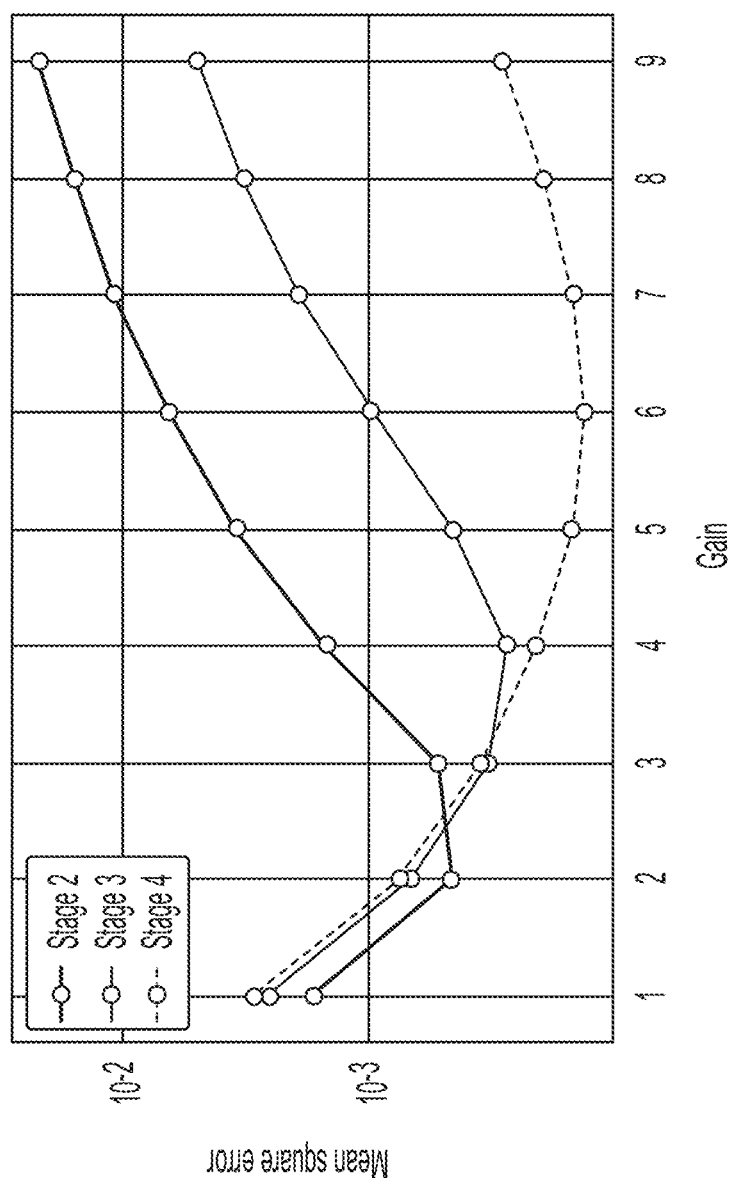
Figures 1, 2, 3, 4, 5, 6, 7, 8, 9, 10:
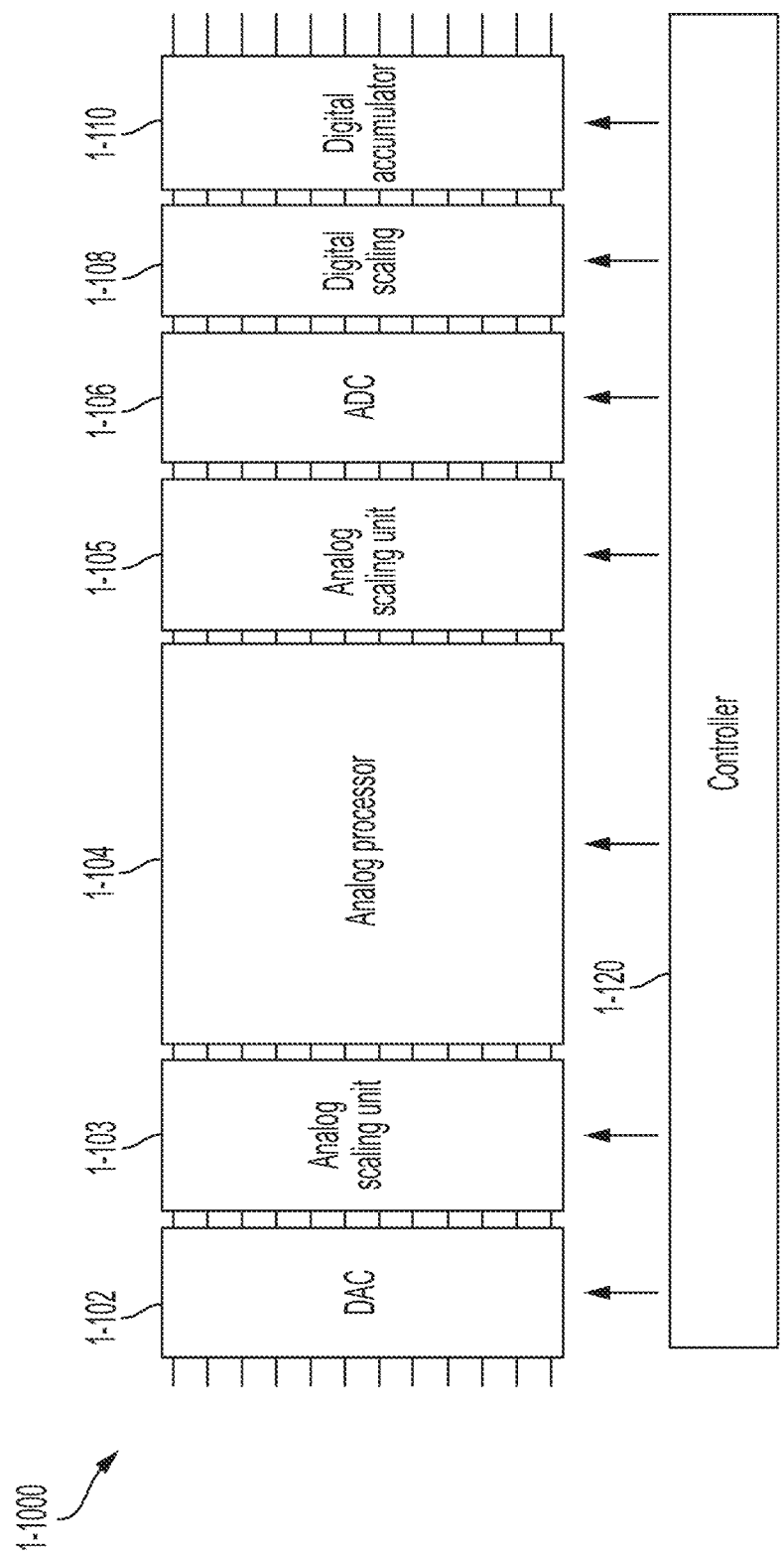
Figures 1, 2, 3, 4, 5, 6, 7, 8, 9, 10, 11:
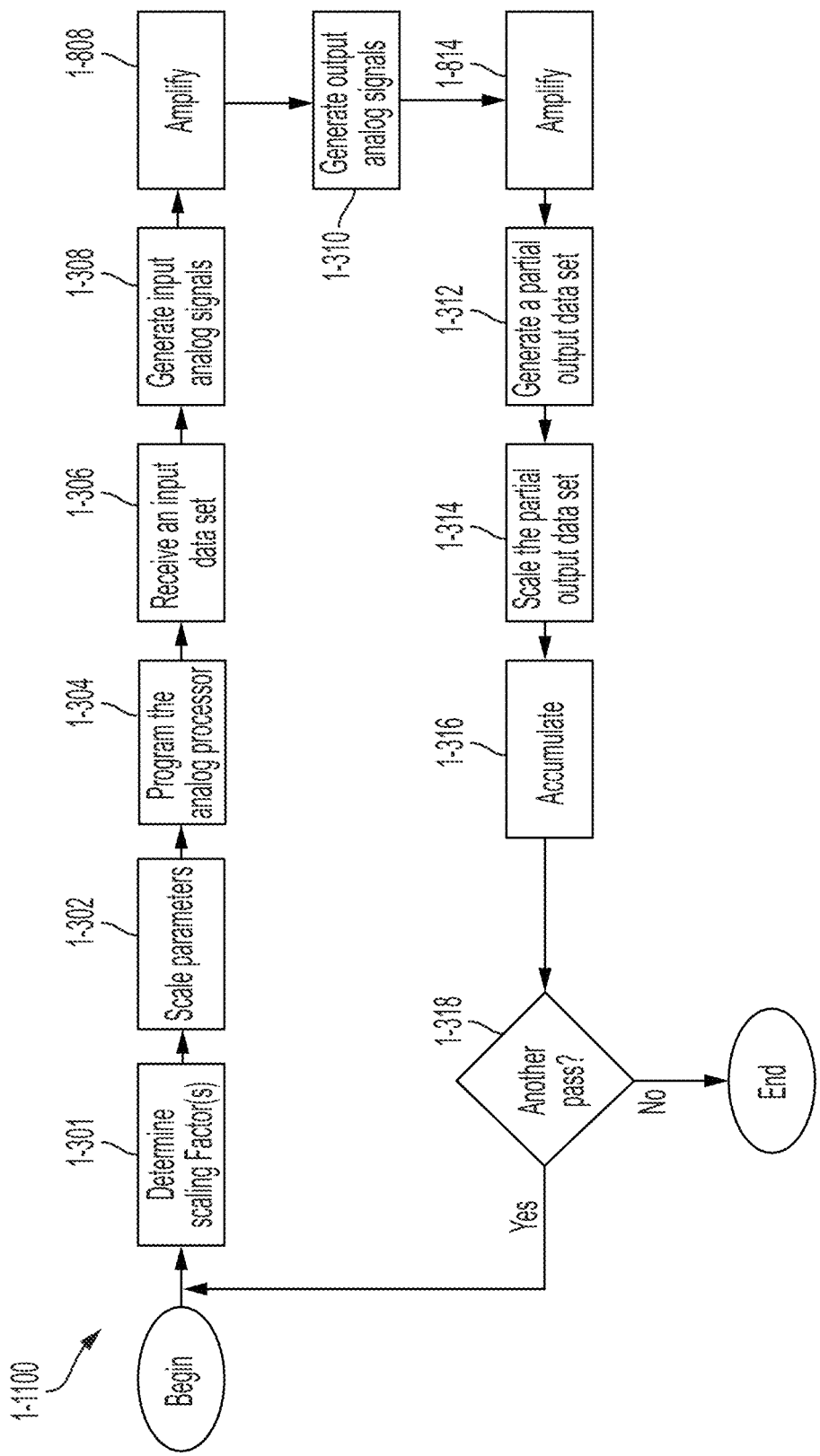
Figures 1, 2, 3, 4, 5, 6, 7, 8, 9, 10, 11, 12:
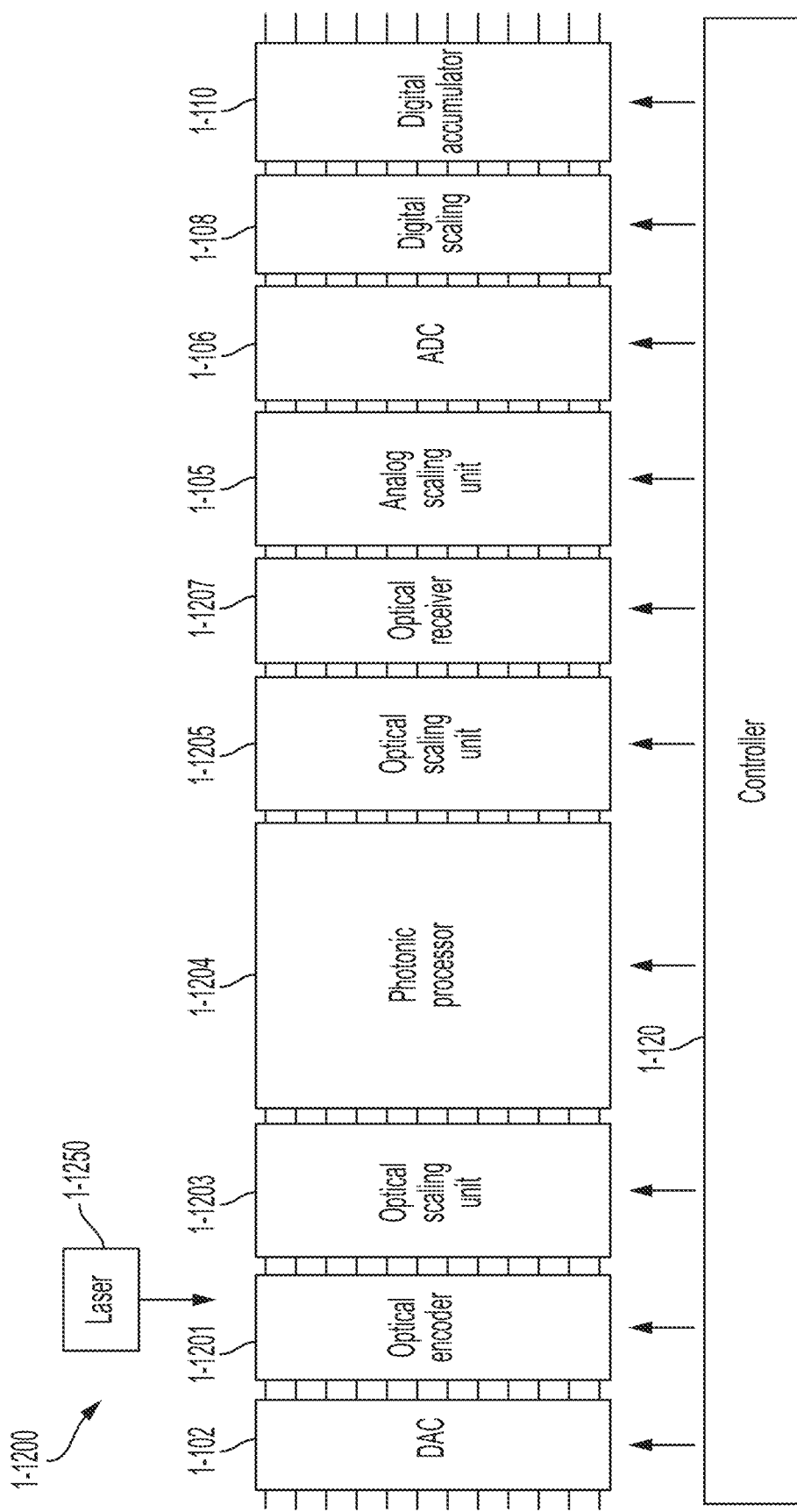
Figures 1, 2:
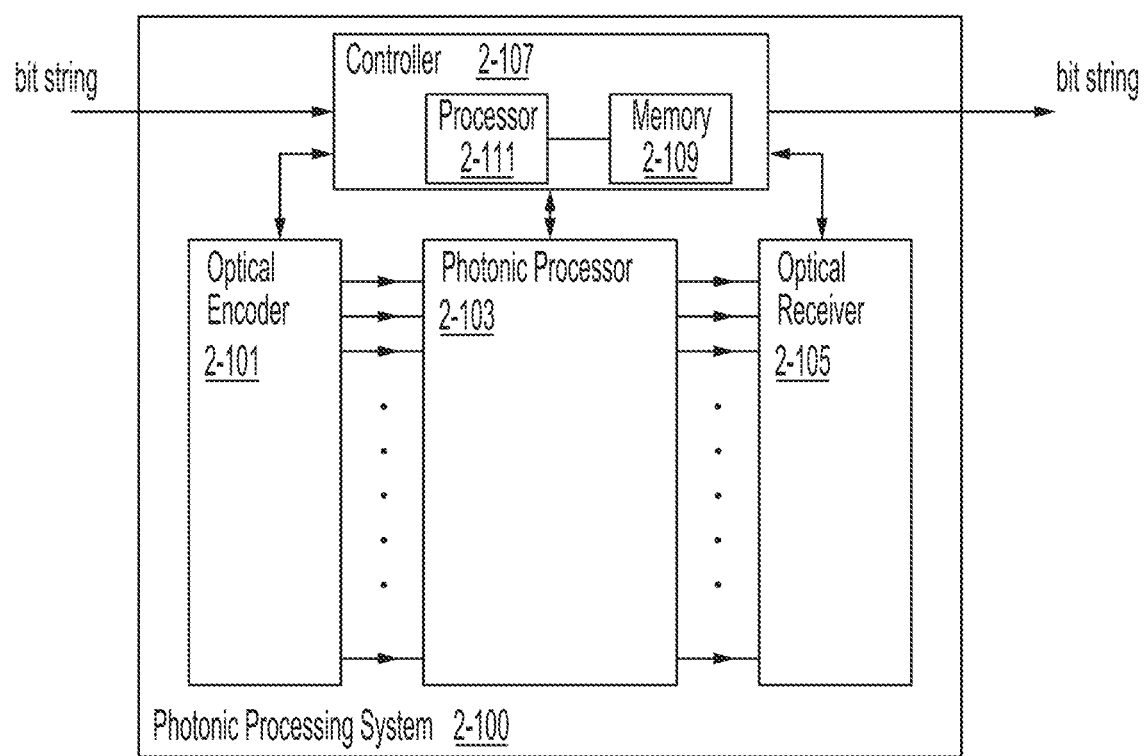
Figure 2:
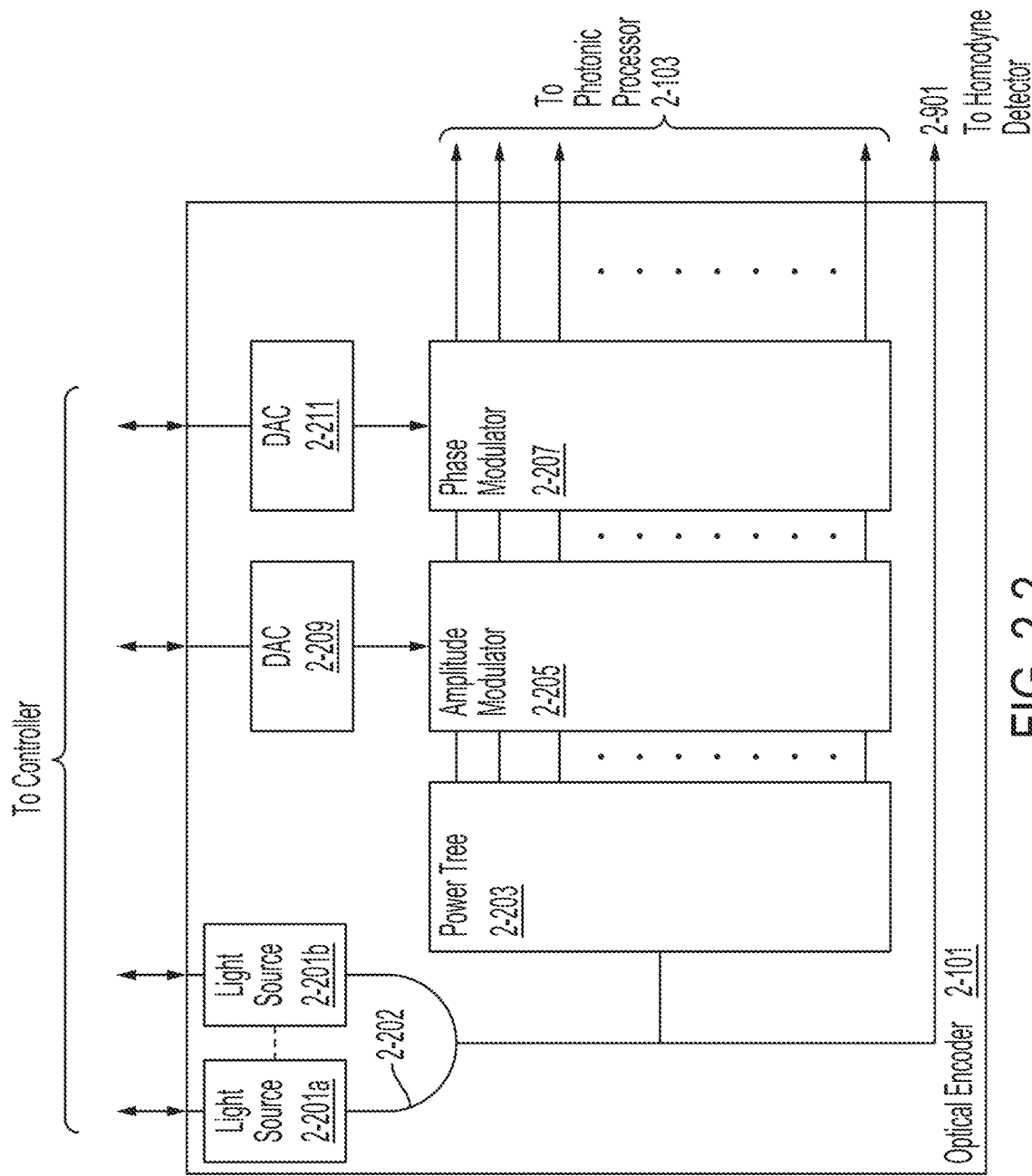
Figures 2, 3:
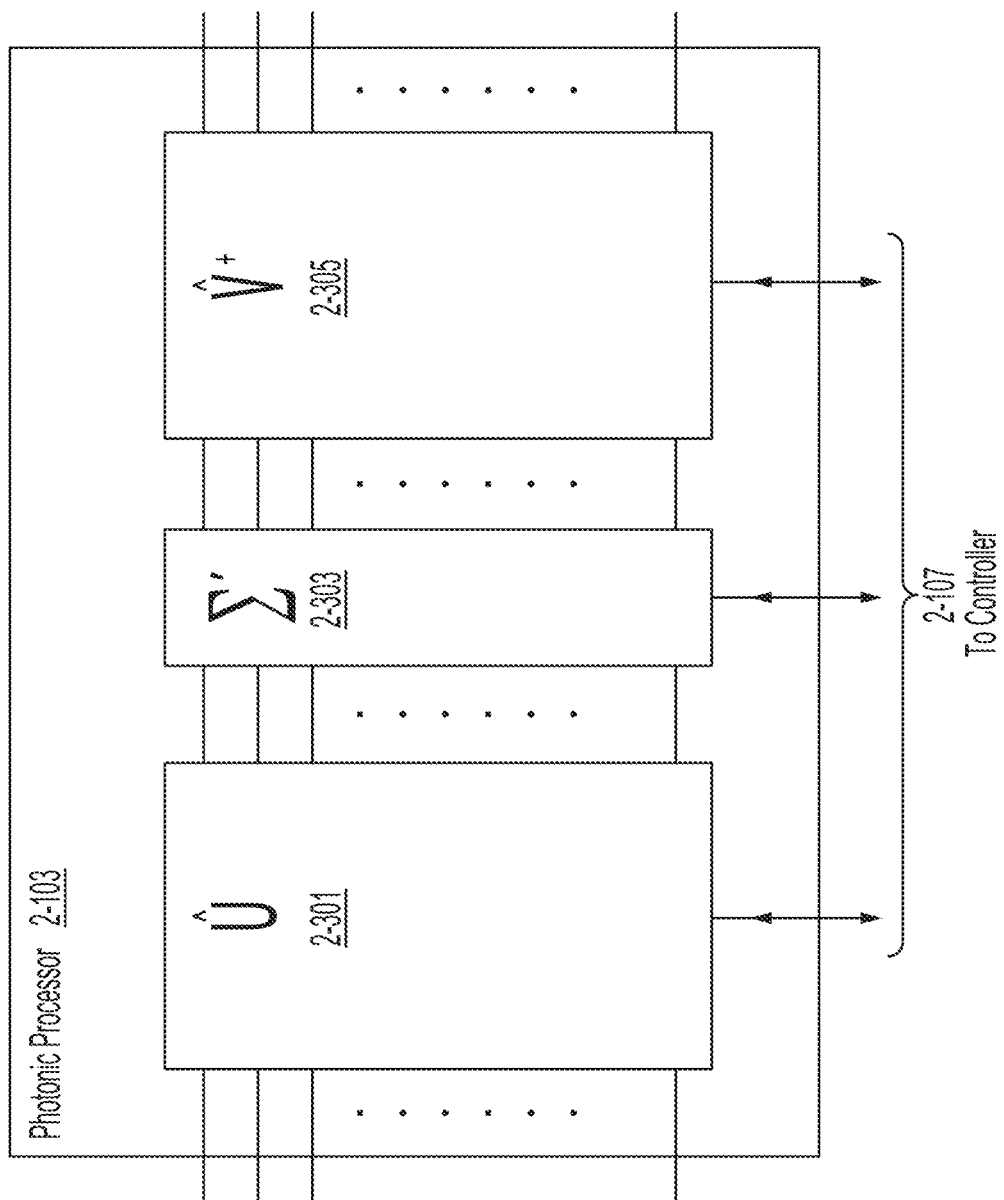
Figures 2, 3, 4:
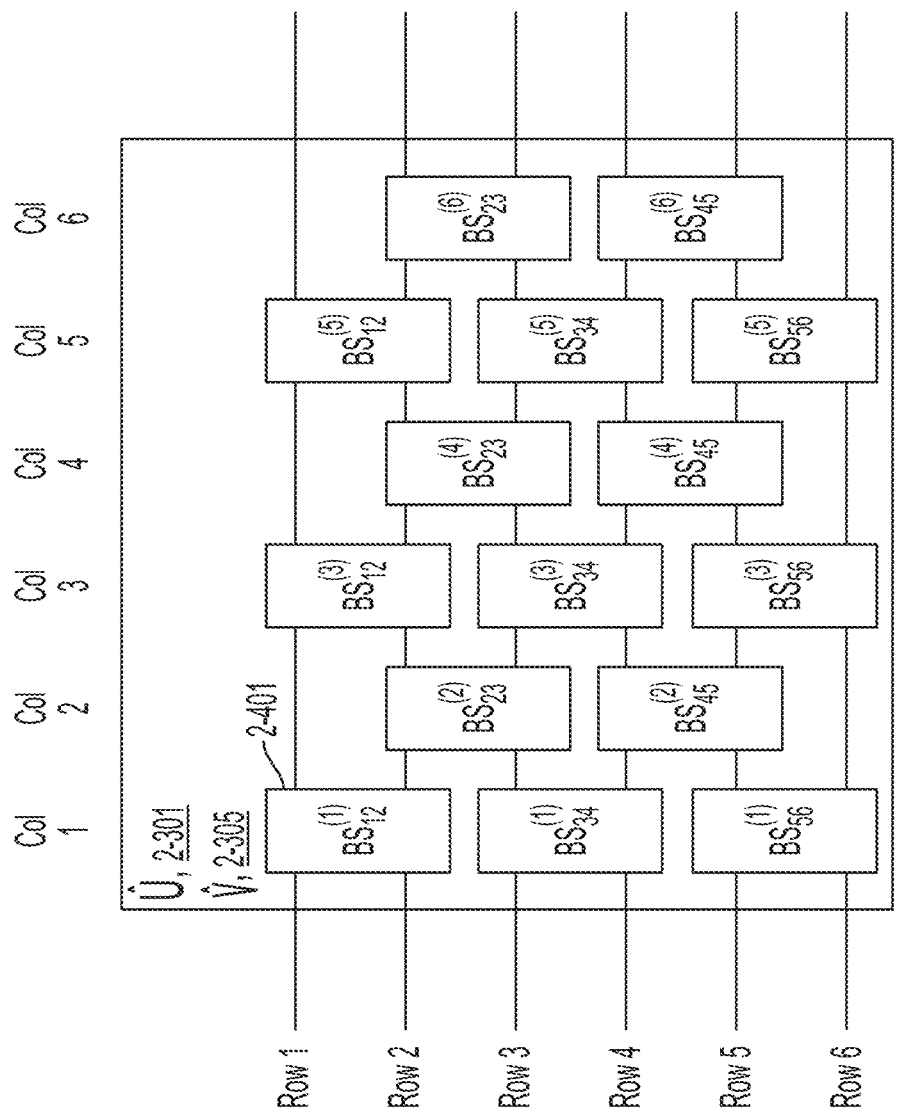
Figures 2, 3, 4, 5:
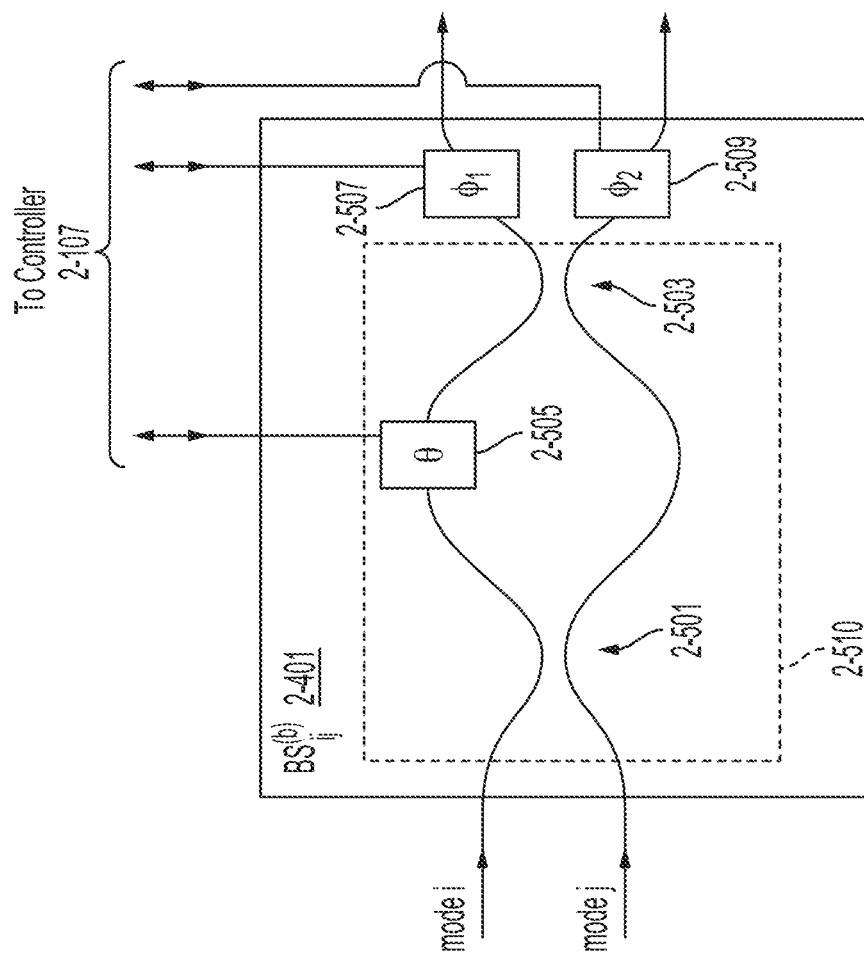
Figures 2, 3, 4, 5, 6, 7:
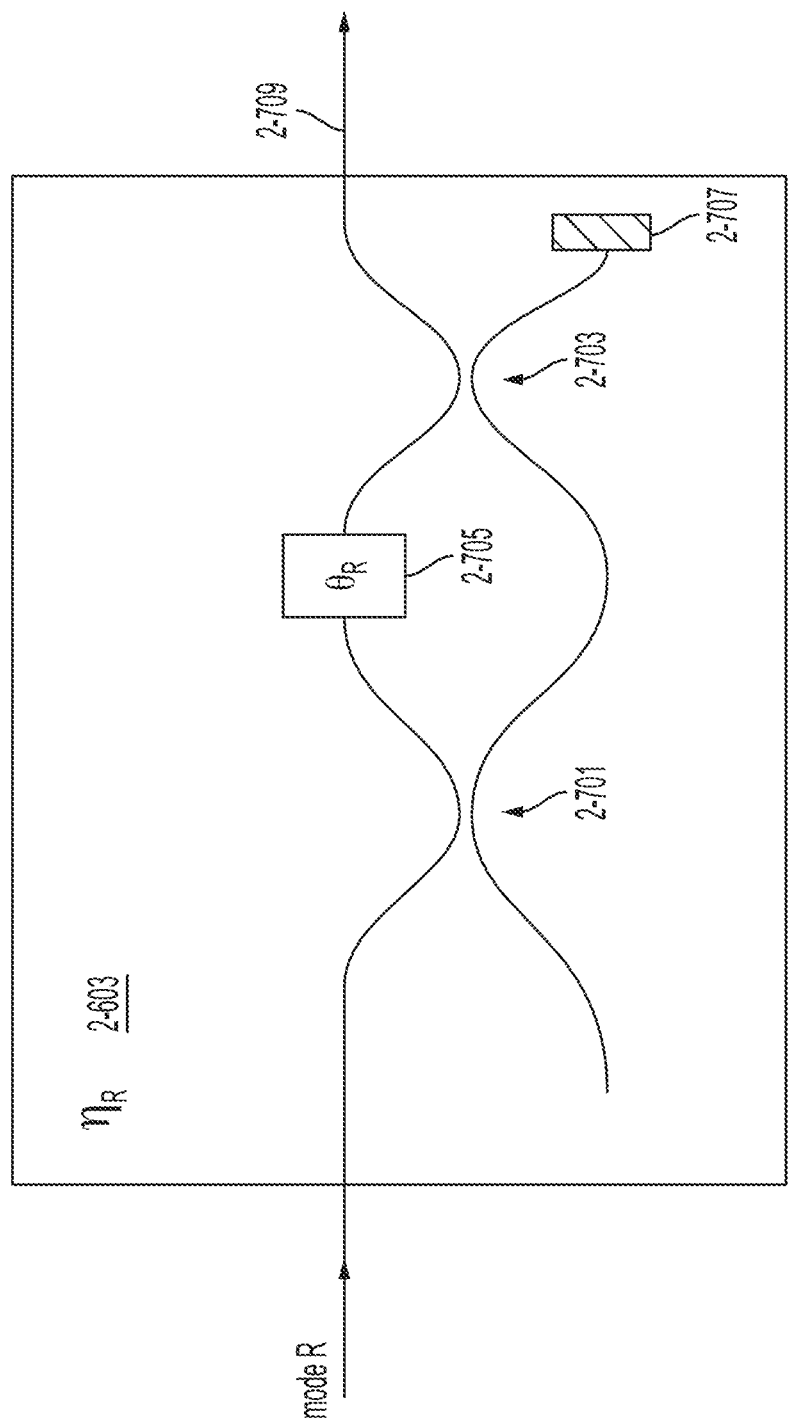
Figures 2, 3, 4, 5, 6, 7, 8:
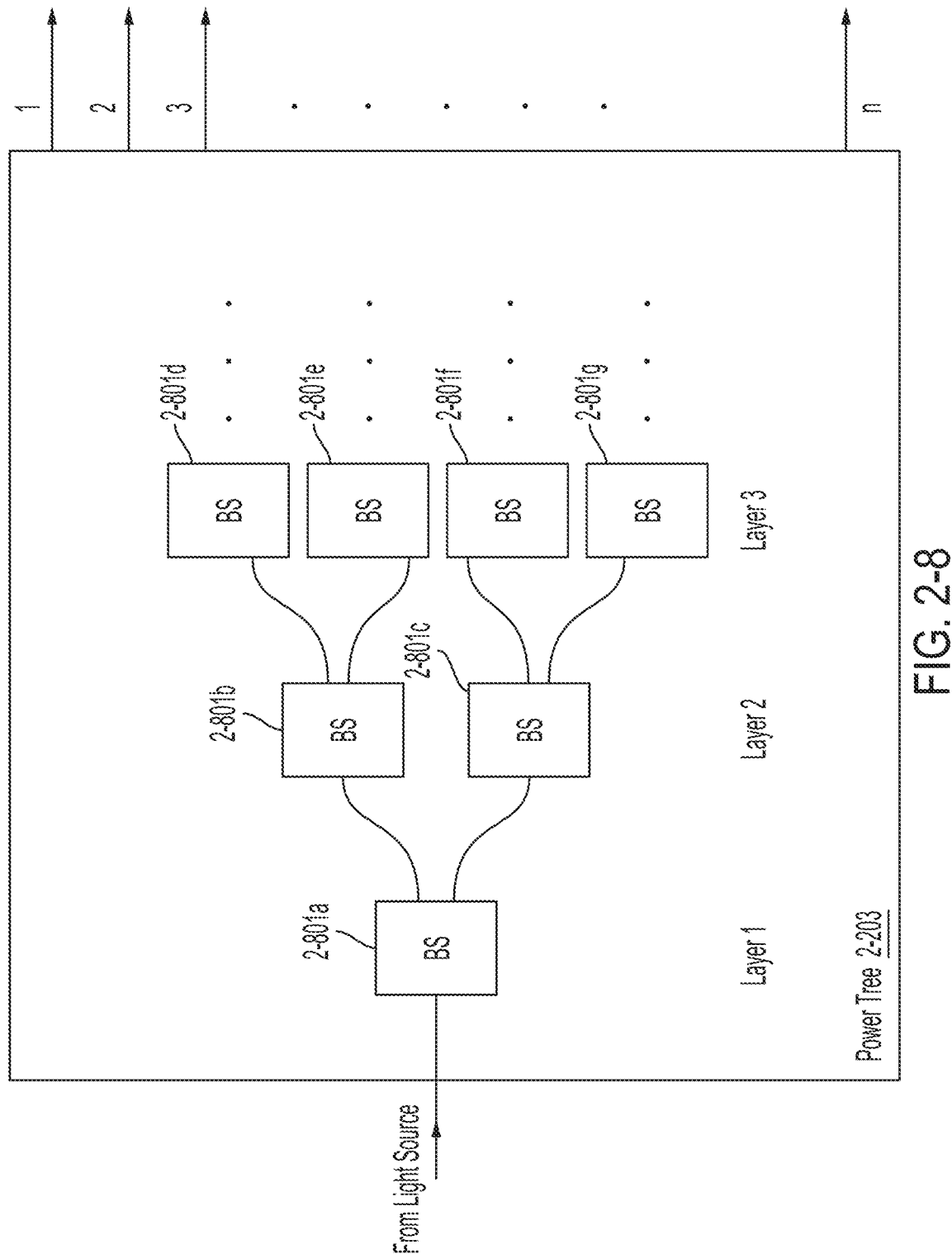
Figures 2, 3, 4, 5, 6, 7, 8, 9:
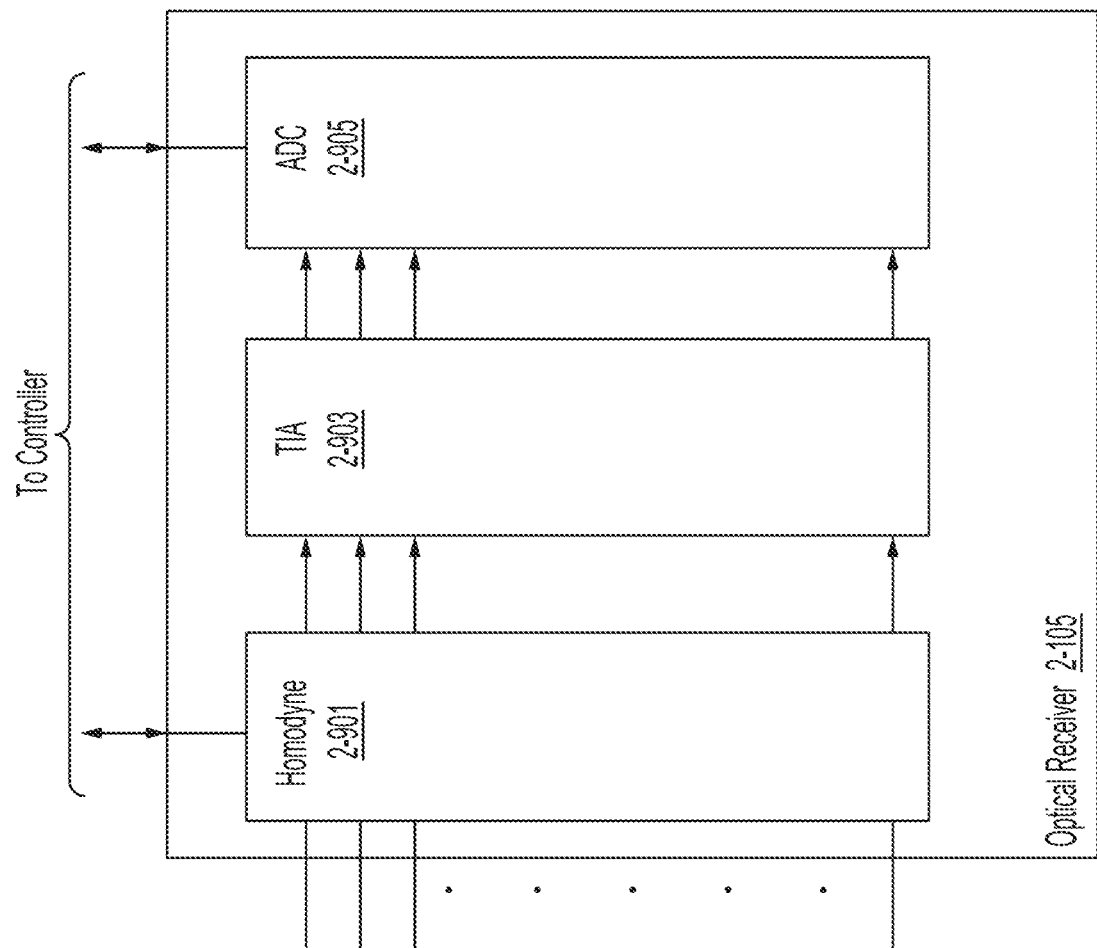
Figures 2, 3, 4, 5, 6, 7, 8, 9, 10:
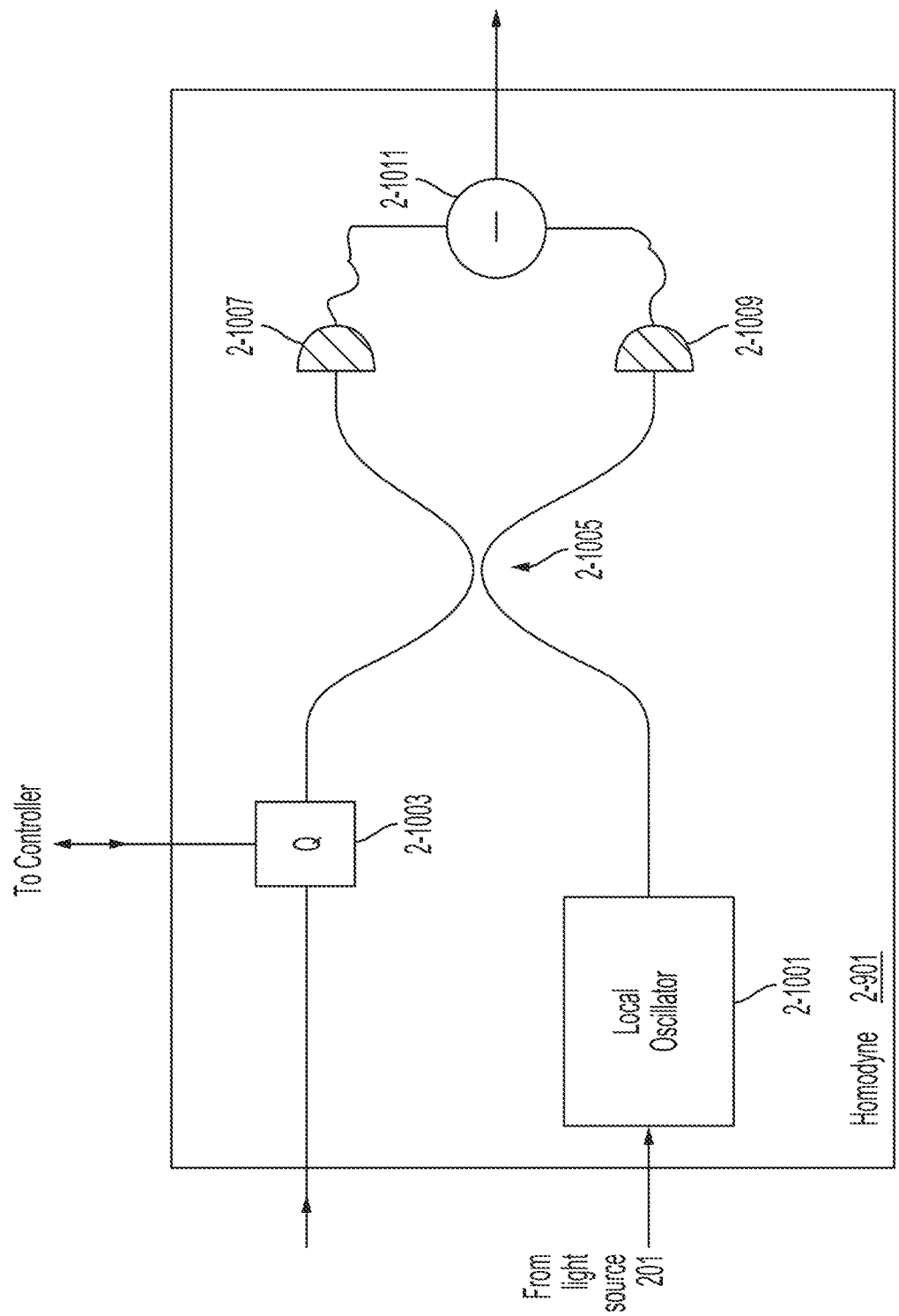
Figures 2, 3, 4, 5, 6, 7, 8, 9, 10, 11:
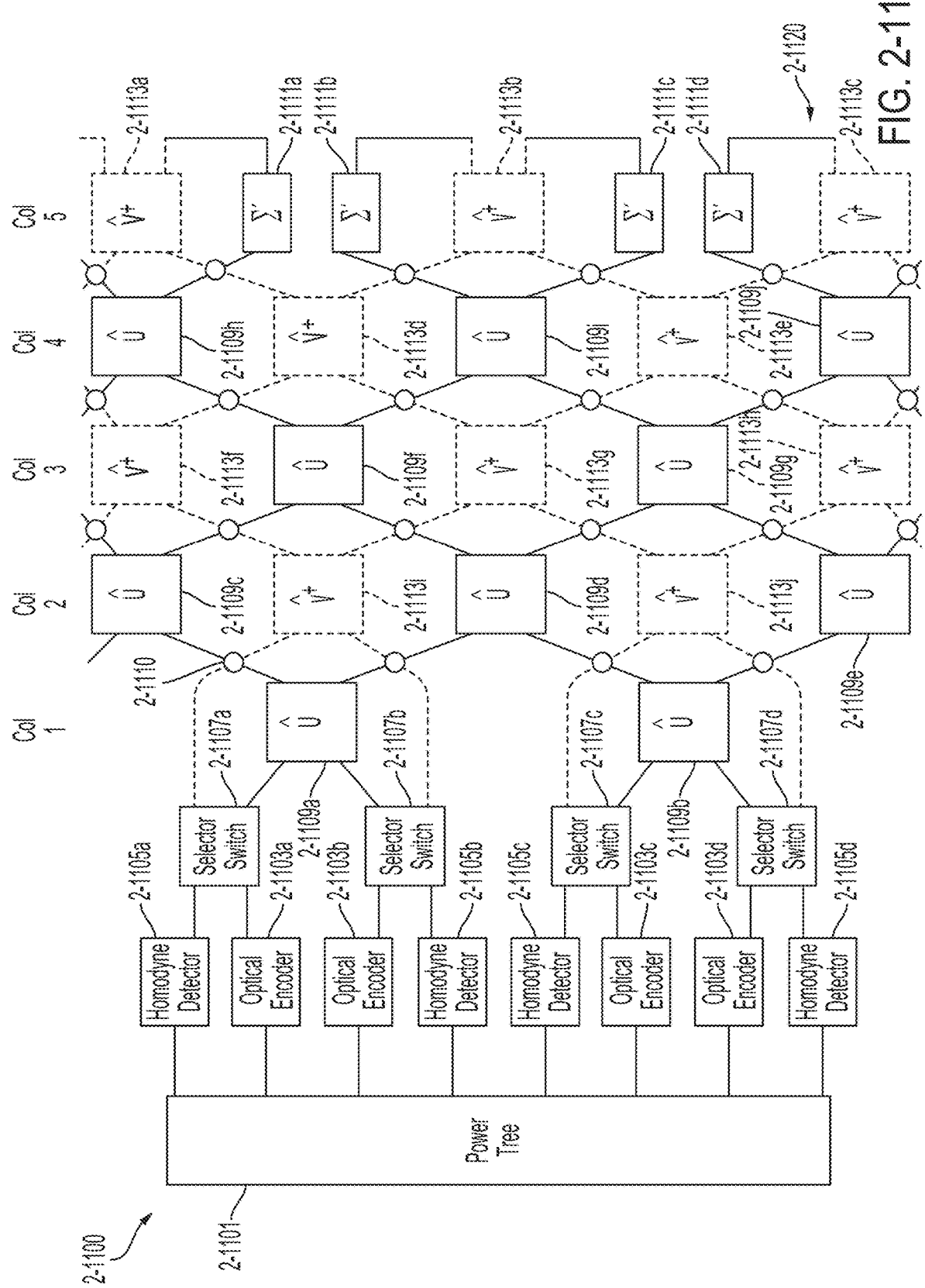

Referring to FIG. 2-4, the first and third matrix module 2-301 and 2-305 are implemented as an array of VBSs 2-401, according to some embodiments. For the sake of simplicity, only n=6 input optical pulses (the number of rows) are illustrated resulting in a "circuit depth" (e.g., the number of columns) equal to the number of input optical pulses (e.g., six). For the sake of clarity, only a single VBS 2-401 is labeled with a reference numeral. The VBS are labeled, however, with subscripts that identify which optical modes are being mixed by a particular VBS and a super script labeling the associated column. Each VBS 2-401 implements a complex Givens rotation, $T(i,j,\theta,\phi)$, as discussed above, where i and j are equivalent to the subscript labels of the VBSs 2-401, θ is the rotation angle of the Givens rotation, and q is the additional phase associated with the generalized rotation.

Referring to FIG. 2-5, each VBS 2-401 may be implemented using a MZI 2-510 and at least one external phase shifter 2-507. In some embodiments, a second external phase shifter 2-509 may also be included. The MZI 2-510 includes a first evanescent coupler 2-501 and a second evanescent coupler 2-503 for mixing the two input modes of the MZI 2-510. An internal phase shifter 2-505 modulates the phase θ in one arm of the MZI 2-510 to create a phase difference between the two arms. Adjusting the phase θ causes the intensity of light output by the VBS 2-401 to vary from one output mode of the MZI 2-510 to the other thereby creating a beam splitter that is controllable and variable. In some embodiments, a second internal phase shifter can be applied on the second arm. In this case, it is the difference between the two internal phase shifters that cause the output light intensity to vary. The average between the two internal phases will impart a global phase to the light that enter mode i and mode j. Thus the two parameters θ and φ may each be controlled by a phase shifter. In some embodiments, the second external phase shifter 2-509 may be used to correct for an unwanted differential phase across the output modes of the VBS due to static phase disorder.

In some embodiments, the phase shifters 2-505, 2-507 and 2-509 may include a thermo-optic, electro-optic, or optomechanic phase modulator. In other embodiments, rather than including an internal phase modulator 505 within an MZI 510, a NOEMS modulator may be used.

In some embodiments, the number of VBSs grows with the size of the matrix. The inventors have appreciated that controlling a large number of VBSs can be challenging and there is a benefit to sharing a single control circuit among multiple VBSs. An example of a parallel control circuit that may be used to control multiple VBSs is a digital-to-analog converter that receives as an input a digital string that encodes the analog signal to be imparted on a specific VBS. In some embodiments, the circuit also receives a second input the address of the VBS that is to be controlled. The circuit may then impart analog signals on the addressed VBS. In other embodiments, the control circuit may automatically scan through a number of VBSs and impart analog signals on the multiple VBSs without being actively given an address. In this case, the addressing sequence is predefined such that it traverses the VBS array in known order.

Referring to FIG. 2-6, the second matrix module 2-303 implements multiplication by the diagonal matrix $\Sigma' = D_V \Sigma D_U$. This may be accomplished using two phase shifters 2-601 and 2-605 to implement the two phase screens and an amplitude modulator 2-603 to adjust the intensity of an associate optical pulse by an amount η. As mentioned above, in some embodiments only a single phase modulator 2-601 may be used, as the two phase screens can be combined together since the three constituent matrices that form $\Sigma'$ are diagonal and therefore commute.

In some embodiments, the amplitude modulators 2-603 may be implemented using an attenuator and/or an amplifier. If the value of the amplitude modulation q is greater than one, the optical pulse is amplified. If the value of the amplitude modulation q is less than one, the optical pulse is attenuated. In some embodiments, only attenuation is used. In some embodiments, the attenuation may be implemented by a column of integrated attenuators. In other embodiments, as illustrated in FIG. 2-7, the attenuation 2-603 may be implemented using a MZI that includes two evanescent couplers 2-701 and 2-703 and a controllable internal phase shifter 2-705 to adjust how much of the input light is transmitted from the input of the MZI to a first output port 2-709 of the MZI. A second output port 2-707 of the MZI may be ignored, blocked or dumped.

In some embodiments, the controller 2-107 controls the value of each phase shifter in the photonic processor 2-103. Each phase shifter discussed above may include a DAC similar to the DACs discussed in connection with the phase modulator 2-207 of the optical encoder 2-101.

The photonic processor 2-103 can include any number of input modes, but the size and complexity of the interconnected VBS arrays 2-301 and 2-305 will increase as the number of input modes increases. For example, if there are n input optical modes, then the photonic processor 2-103 will have a circuit depth of 2n+1, where the first matrix module 2-301 and the second matrix module 2-305 each has a circuit depth n and the second matrix module 2-303 has a circuit depth of one. Importantly, the complexity in time of performing a single matrix multiplication linear with the number of columns of input data. If the dimensions of the matrix multiplication being processed are (I, K)×(K×J), the time complexity of performing this multiplication on an optical processor with n-modes is $O(IKJ/n^2)$. In some embodiments, this low order complexity afforded by the parallelization results in energy and time efficiencies that cannot be obtained using conventional electrical processors.

It is noted that, while embodiments described herein illustrate the photonic processor 2-103 as having n inputs and n outputs, in some embodiments, the matrix A implemented by the photonic processor 2-103 may not be a square matrix. In such embodiments, the photonic processor 2-103 may have a different number of outputs and inputs.

It is also noted that, due to the topology of the interconnections of the VBSs within the first and second matrix modules 2-301 and 2-305, it is possible to subdivide the photonic processor 2-103 into non-interacting subsets of rows such that more than one matrix multiplication can be performed at the same time. For example, in the VBS array illustrated in FIG. 2-4, if each VBS 2-401 that couples optical modes 3 and 4 is set such that optical modes 3 and 4 do not couple at all (e.g., as if the VBSs 2-401 with subscript "34" were absent from FIG. 2-4) then the top three optical modes would operate completely independently from the bottom three optical modes. Such a subdivision may be done at a much larger scale with a photonic processor with a larger number of input optical modes. For example, an n=64 photonic processor may multiply eight eight-component input vectors by a respective 8×8 matrix simultaneously (each of the 8×8 matrices being separately programmable and controllable). Moreover, the photonic processor 2-103 need not be subdivided evenly. For example, an n=64 photonic processor may subdivide into seven different input vectors with 20, 13, 11, 8, 6, 4, and 2 components, respectively, each multiplied by a respective matrix simultaneously. It should be understood that the above numerical examples are for illustration purposes only and any number of subdivisions is possible.

Additionally, while the photonic processor 2-103 performs matrix-vector multiplication, where a vector is multiplied by a matrix by passing the optical signals through the array of VBSs, the photonic processor 2-103 may also be used to perform matrix-matrix multiplication. For example, multiple input vectors may be passed through the photonic processor 2-103, one after the other, one input vector at a time, where each input vector represents a column of an input matrix. After optically computing each of the individual matrix-vector multiplications (each multiplication resulting in an output vector that corresponds to a column of an output column of the resulting matrix), the results may be combined digitally to form the output matrix resulting from the matrix-matrix multiplication.

C. Optical Receivers

The photonic processor 2-103 outputs n optical pulses that are transmitted to the optical receiver 2-105. The optical receiver 2-105 receives the optical pulses and generates an electrical signal based on the received optical signals. In some embodiments, the amplitude and phase of each optical pulse is determined. In some embodiments, this is achieved using homodyne or heterodyne detection schemes. In other embodiments, simple phase-insensitive photodetection may be performed using conventional photodiodes.

Referring to FIG. 2-9, the optical receiver 2-105 includes a homodyne detector 2-901, a transimpedance amplifier 2-903 and an ADC 2-905, according to some embodiments.

Transimpedance amplifier 2-903 may serve as electronic analog scaling unit 1-105 (FIG. 1-12) and ADC 2-905 may be part of ADC unit 1-106. While the components are shown as one element for all optical modes in FIG. 2-9, this is for the sake of simplicity. Each optical mode may have a dedicated homodyne detector 2-901, a dedicated transimpedance amplifier 2-903 and a dedicated ADC 2-905. In some embodiments, a transimpedance amplifier 2-903 may not be used. Instead, any other suitable electronic circuit that converts a current to a voltage may be used.

Referring to FIG. 2-10, the homodyne detector 2-903 includes a local oscillator (LO) 2-1001, a quadrature controller 2-1003, a beam splitter 2-1005 and two detectors 2-1007 and 2-1009, according to some embodiments. The homodyne detector 2-903 outputs an electrical current that is based on the difference between the current output by the first detector 2-1007 and the second detector 2-1009.

The local oscillator 2-1001 is combined with the input optical pulse at the beam splitter 2-1005. In some embodiments, a portion of the light source 2-201 is transmitted via an optical waveguide and/or an optical fiber to the homodyne detector 2-901. The light from the light source 2-201 may itself be used as the local oscillator 2-1001 or, in other embodiments, the local oscillator 2-1001 may be a separate light source that uses the light from the light source 2-201 to generate a phase matched optical pulse. In some embodiments, an MZI may replace the beam splitter 2-1005 such that adjustments can be made between the signal and the local oscillator.

The quadrature controller 2-1003 controls the cross-section angle in phase space in which the measurement is made. In some embodiments, the quadrature controller 2-1003 may be a phase shifter that controls the relative phase between the input optical pulse and the local oscillator. The quadrature controller 2-1003 is shown as a phase shifter in the input optical mode. But in some embodiments, the quadrature controller 2-1003 may be in the local oscillator mode.

The first detector 2-1007 detects light output by a first output of the beam splitter 2-1005 and the second detector 2-1009 detects light output by a second output of the beam splitter 2-1005. The detectors 2-1007 and 2-1009 may be photodiodes operated with zero bias.

A subtraction circuit 2-1011 subtracts the electrical current from the first detector 2-1007 from the electrical current from the second detector 2-1009. The resulting current therefore has an amplitude and a sign (plus or minus). The transimpedance amplifier 2-903 converts this difference in current into a voltage, which may be positive or negative. Finally, an ADC 2-905 converts the analog signal to a digital bit string. This output bit string represents the output vector result of the matrix multiplication and is an electrical, digital version of the optical output representation of the output vector that is output by the photonic processor 2-103. In some embodiments, the output bit string may be sent to the controller 2-107 for additional processing, which may include determining a next input bit string based on one or more output bit strings and/or transmitting the output bit string to an external processor, as described above.

The inventors have further appreciated that the components of the above-described photonic processing system 2-100 need not be chained together back-to-back such that there is a first matrix module 2-301 connected to a second matrix module 2-303 connected to a third matrix module 2-305. In some embodiments, the photonic processing system 2-103 may include only a single unitary circuit for performing one or more multiplications. The output of the single unitary circuit may be connected directly to the optical receiver 2-105, where the results of the multiplication are determined by detecting the output optical signals. In such embodiments, the single unitary circuit may, for example, implement the first matrix module 2-301. The results detected by the optical receiver 2-105 may then be transmitted digitally to a conventional processor (e.g., processor 2-111) where the diagonal second matrix module 2-303 is performed in the digital domain using a conventional processor (e.g., 2-111). The controller 2-107 may then reprogram the single unitary circuit to perform the third matrix module 2-305, determine an input bit string based on the result of the digital implementation of the second matrix module, and control the optical encoder to transmit optical signals, encoded based on the new input bit string, through the single unitary circuit with the reprogrammed settings.

The resulting output optical signals, which are detected by the optical receiver 105, are then used to determine the results of the matrix multiplication.

The inventors have also appreciated that there can be advantages to chaining multiple photonic processors 2-103 back-to-back, in series. For example, to implement a matrix multiplication $M=M_1M_2$, where $M_1$ and $M_2$ are arbitrary matrices but $M_2$ changes more frequently than $M_1$ based on a changing input workload, the first photonic processor can be controlled to implement $M_2$ and the second photonic processor coupled optically to the first photonic processor can implement $M_1$ which is kept static. In this way, only the first photonic processing system needs to be frequently updated based on the changing input workload. Not only does such an arrangement speed up the computation, but it also reduces the number of data bits that travel between the controller 2-107 and the photonic processors.

D. Folded Photonic Processing System

In FIG. 2-1, in such an arrangement, the optical encoder 2-101 and the optical receiver 2-105 are positioned on opposite sides of the photonic processing system 2-100. In applications where feedback from the optical receiver 2-105 is used to determine the input for the optical encoder 2-101 for a future iteration of the process, the data is transferred electronically from the optical receiver 2-105 to the controller 2-107 and then to the optical encoder 2-101. The inventors have appreciated that reducing the distance that these electrical signals need to travel (e.g., by reducing the length of electrical traces and/or wires) results in power savings and lower latency. Moreover, there is no need for the optical encoder 2-101 and optical receiver 2-105 to be placed on opposite ends of the photonic processing system.

Accordingly, in some embodiments, the optical encoder 2-101 and the optical receiver 2-105 are positioned near one another (e.g., on the same side of the photonics processor 2-103) such that the distance electrical signals have to travel between the optical encoder 2-101 and the optical receiver 2-105 is less than the width of the photonics processor 2-103. This may be accomplished by physically interleaving components of the first matrix module 2-301 and the third matrix module 2-305 such that they are physically in the same portion of the chip. This arrangement is referred to as a "folded" photonic processing system because the light first propagates in a first direction through the first matrix module 2-301 until it reaches a physical portion of the chip that is far from the optical encoder 2-101 and the optical receiver 2-105, then folds over such that the waveguides turn the light to be propagating in a direction opposite to the first direction when implementing the third matrix module 2-305. In some embodiments, the second matrix module 2-303 is physically located adjacent to the fold in the waveguides. Such an arrangement reduces the complexity of the electrical traces connecting the optical encoder 2-101, the optical receiver 2-105, and the controller 2-107 and reduces the total chip area used to implement the photonic processing system 2-100. For example, some embodiments using the folded arrangement only use 65% of the total chip area that would be needed if the back-to-back photonic arrangement of FIG. 2-1 was used. This may reduce the cost and complexity of the photonic processing system.

The inventors have appreciated that there are not only electrical advantages to a folded arrangement, but also optical advantages. For example, by reducing the distance that the light signal has to travel from the light source to be used as a local oscillator for the homodyne detection, the time-dependent phase fluctuations of the optical signal may be reduced, resulting in higher quality detection results. In particular, by locating the light source and the homodyne on the same side of the photonics processor, the distance traveled by the light signal used for the local oscillator is no longer dependent on the size of the matrix. For example, in the back-to-back arrangement of FIG. 2-1, the distance traveled by the light signal for the local oscillator scales linearly with the size of the matrix, whereas the distance traveled in the folded arrangement is constant, irrespective of the matrix size.

FIG. 2-11 is a schematic drawing of a folded photonic processing system 2-1100, according to some embodiments. The folded photonic processing system 2-1100 includes a power tree 2-1101, a plurality of optical encoders 2-1103a-2-1103d, a plurality of homodyne detectors 2-1105a-2-1105d, a plurality of selector switches 2-1107a-2-1107d, a plurality of U-matrix components 2-1109a-2-1109j, a plurality of diagonal-matrix components 2-1111a-2-1111d, and a plurality of V-matrix components 2-1113a-2-1113j. For the sake of clarity, not all components of the folded photonic processing system are shown in the figure. It should be understood that the folded photonic processing system 2-1100 may include similar components as the back-to-back photonic processing system 2-100.

The power tree 2-1101 is similar to the power tree 2-203 of FIG. 2 and is configured to deliver light from a light source (not shown) to the optical encoders 2-1103. However, a difference in the power tree 2-1101 and the power tree 2-203 is that the power tree delivers optical signals to the homodyne detectors 2-1105a directly. In FIG. 2, the light source 201 delivers a local oscillator signal to the homodyne detectors on the other side of the photonic processor by tapping off a portion of the optical signal from the light source and guiding the optical signal using a waveguide. In FIG. 2-11, the power tree 2-1101 includes a number of outputs that is equal to twice the number of spatial modes. For example, FIG. 2-11 illustrates only four spatial modes of a photonic processor, which results in eight output modes from the power tree 2-1101—one output directing light to each optical encoder 2-1103 and one output directing light to each homodyne detector 2-1105. The power tree may be implemented, for example, using cascading beam splitters or a multimode interferometer (MMI).

The optical encoders 2-1103 are similar to the power tree optical encoder 2-101 of FIG. 1 and are configured to encode information into the amplitude and/or phase of the optical signals received from the power tree 2-1101. This may be achieved, for example as described in connection with the optical encoder 2-101 of FIG. 2.

The homodyne detectors 2-1105 are located between the power tree 2-1101 and the U-matrix components 2-1109. In some embodiments, the homodyne detectors 2-1105 are physically positioned in a column with the optical encoder 2-1103. In some embodiments, the optical encoders 2-1103 and the homodyne detectors 2-1105 may be interleaved in a single column. In this way, the optical encoders 2-1103 and the homodyne detectors 2-1105 are in close proximity to one another, reducing the distance of electrical traces (not shown) used to connect the optical encoders 2-1103 and the homodyne detectors 2-1105 and a controller (not shown) which may be physically located adjacent to the column of the optical encoders 2-1103 and the homodyne detectors 2-1105.

Each of the optical encoders 2-1103 is associated with a respective homodyne detector 2-1105. Both the optical encoders 2-1103 and the homodyne detectors 2-1105 receive optical signals from the power tree 2-1101. The optical encoders 2-1103 use the optical signals to encode an input vector, as described above. The homodyne detectors 2-1105 use the received optical signals received from the power tree as the local oscillator, as described above.

Each pair of the optical encoders 2-1103 and the homodyne detectors 2-1105 is associated with and connected to a selector switch 2-1107 by a waveguide. The selector switches 2-1107a-2-1107d may be implemented using, for example, a conventional 2×2 optical switch. In some embodiments, the 2×2 optical switch is a MZI with an internal phase shifter to control the MZI's behavior from a crossing to a bar. The switch 2-1107 is connected to a controller (not shown) to control whether an optical signal received from the optical encoder 2-1103 will be guided towards the U-matrix components 2-1109 or the V-matrix components 2-1113. The optical switch is also controlled to guide light received from the U-matrix components 2-1109 and/or the V-matrix components 2-1113 toward the homodyne detectors 2-1105 for detection.

The techniques for implementing matrix multiplication is similar in the photonic folded photonic processing system 2-1100 as was described above in connection with the back-to-back system, described in FIG. 2-3. A difference between the two systems is in the physical placement of the matrix components and the implementation of a fold 2-1120, where the optical signals change from propagating approximately left to right in FIG. 2-11 to propagating approximately right to left. In FIG. 2-11, the connections between components may represent waveguides. The solid-lined connections represent portions of waveguide where the optical signals are propagating from left to right, in some embodiments, and the dashed-lined connections represent portions of waveguide where the optical signals are propagating from right to left, in some embodiments. In particular, given this nomenclature, the embodiment illustrated in FIG. 2-11 is an embodiment where the selector switches 2-1107 guide the optical signals to the U-matrix components 2-1109 first. In other embodiments, the selector switches 2-1107 may guide the optical signals to the V-matrix components 2-1113 first, in which case the dashed lines would represent portions of waveguide where the optical signals are propagating from left to right, and the solid-lined connections would represent portions of waveguide where the optical signals are propagating from right to left.

The U-matrix of the SVD of a matrix A is implemented in photonic processing system 2-1100 using U-matrix components 2-1109 that are interleaved with the V-matrix components 2-1113. Thus, unlike the embodiment of the back-to-back arrangement illustrated in FIG. 2-3, all of the U-matrix components 2-1109 and the V-matrix components 2-1113 are not physically located in a respective self-contained array within a single physical area. Accordingly, in some embodiments, the photonic processing system 2-1100 includes a plurality of columns of matrix components and at least one of the columns contains both U-matrix components 2-1109 and V-matrix components 2-1113. In some embodiments, the first column may only have U-matrix components 2-1109, as illustrated in FIG. 2-11. U-matrix components 2-1109 are implemented similarly to the first matrix module 2-301 of FIG. 3.

Due to the interleaving structure of the U-matrix components 2-1109 and the V-matrix components 2-1113, the folded photonic processing system 2-1100 includes waveguide crossovers 2-1110 at various locations between the columns of matrix elements. In some embodiments, the waveguide crossovers can be constructed using adiabatic evanescent elevators between two or more layers in an integrated photonics chip. In other embodiments, the U-matrix and the V-matrix may be positioned on different layers of the same chip and the waveguide crossovers are not used.

After optical signals propagate through all of the U-matrix components 2-1109, the optical signals propagate to the diagonal-matrix components 2-1111, which are implemented similarly to the second matrix module 2-303 of FIG. 2-3.

After optical signals propagate through all of the diagonal-matrix components 2-1111, the optical signals propagate to the V-matrix components 2-1113, which are implemented similarly to the third matrix module 2-305 of FIG. 2-3. The V-matrix of the SVD of a matrix A is implemented in photonic processing system 2-1100 using V-matrix components 2-1113 that are interleaved with the U-matrix components 2-1109. Thus, all of the V-matrix components 2-1113 are not physically located in a single self-contained array.

After the optical signals propagate through all of the V-matrix components 2-1113, the optical signals return to the selector switch 2-1107, which guides the optical signals to the homodyne detectors 2-1105 for detection.

The inventors have further appreciated that by including selector switches after the optical encoders and before the matrix components, the folded photonic processing system 2-1100 allows efficient bi-directionality of the circuit. Thus, in some embodiments, a controller, such as the controller 2-107 described in connection with FIG. 2-1, may control whether the optical signals are multiplied by the U matrix first or the $V^T$ matrix first. For an array of VBSs set to implement a unitary matrix U when propagating the optical signals from left to right, propagating the optical signals from right to left implements a multiplication by a unitary matrix $U^T$. Thus, the same settings for an array of VBSs can implement both U and $U^T$ depending which way the optical signals are propagated through the array, which may be controlled using the selector switch in 2-1107. In some applications, such as back-propagation used to train a machine learning algorithm, it may be desirable to run optical signals through one or more matrices backwards. In other applications, the bi-directionality can be used to compute the operation of an inverted matrix on an input vector. For example, for an invertible n×n matrix A an SVD results in $A=V^T\Sigma U$. The inverse of this matrix is $A^{-1}=U^T\Sigma^{-1}V$ where $\Sigma^{-1}$ is the inverse of a diagonal matrix which can be computed efficiently by inverting each diagonal element. To multiply a vector by the matrix A, the switches are configured to direct the optical signals through the matrix U, then $\Sigma$, then $V^T$ in a first direction. To multiply a vector by the inverse $A^{-1}$, the singular values are first set to program the implementation of the $\Sigma^{-1}$ matrix. This constitutes changing the settings of only one column of VBSs instead of all 2n+1 columns of the photonic processor, which is the case for a single-directional photonic processing system such as the one illustrated in FIG. 2-3. The optical signals representing the input vector are then propagated through the matrix $V^T$, then $\Sigma^{-1}$, and then U in a second direction that is opposite the first direction. Using the selector switches 2-1107, the folded photonic processing system 2-1100 may be easily changed from implementing the U matrix (or its transpose) first and implementing the $V^T$ matrix (or its transpose) first.

VI. CONCLUSION

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases.

The term "circuitry," as used herein in the specification and in the claims, should be understood to mean any type of circuit, whether considered alone or in combination with other circuits, including for example analog electrical circuits, digital electronic circuits and optical circuits. Optical circuits include, among others, solid state optical components and combinations thereof and free space optical components and combinations thereof.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. A hybrid analog-digital processor configured to perform a mathematical operation, comprising:
   circuitry comprising an analog processor and an analog scaling unit, wherein the circuitry is configured to:
      generate a plurality of input analog signals based on an input data set;
      set a gain of the analog scaling unit based on one or more scaling factors;
      program the analog processor with a set of parameters representing a matrix;
      generate a plurality of output analog signals based on the plurality of input analog signals and the set of parameters;
      generate a plurality of amplified or attenuated output analog signals by amplifying or attenuating, using the analog scaling unit, the plurality of input analog signals and/or the plurality of output analog signals; and
      generate an output data set based on the plurality of amplified or attenuated output analog signals.

2. The hybrid analog-digital processor of claim 1, wherein the hybrid analog-digital processor is further configured to perform a multi-pass computation based on the mathematical operation, wherein the circuitry is further configured to:
   set the gain of the analog scaling unit to a first value during a first pass of the multi-pass computation; and
   set the gain of the analog scaling unit to a second value, different from the first value, during a second pass of the multi-pass computation.

3. The hybrid analog-digital processor of claim 1, wherein generating a plurality of output analog signals based on the plurality of input analog signals and the set of parameters comprises performing a matrix-matrix multiplication based on the plurality of input analog signals and the set of parameters.

4. The hybrid analog-digital processor of claim 1, wherein generating a plurality of output analog signals based on the plurality of input analog signals and the set of parameters comprises performing a convolution based on the plurality of input analog signals and the set of parameters.

5. The hybrid analog-digital processor of claim 1, wherein the circuitry comprises a plurality of analog-to-digital converters (ADCs), and the plurality of ADCs are configured to generate the output data set based on the plurality of output analog signals, wherein the plurality of ADCs comprise n-bit ADCs, with n equal to or less than 12.

6. The hybrid analog-digital processor of claim 1, wherein programming the analog processor comprises:
   programming, based on the set of parameters, the analog processor with a plurality of matrices that, collectively, represent an arbitrary matrix.

7. The hybrid analog-digital processor of claim 6, wherein programming the analog processor with a plurality of matrices comprises:
   programming, based on the set of parameters, the analog processor with a plurality of matrices that, collectively, represent the arbitrary matrix based on a singular value decomposition (SVD) of the arbitrary matrix.

8. The hybrid analog-digital processor of claim 1, wherein the circuitry is further configured to determine the one or more scaling factors based on the set of parameters and the input data set.

9. The hybrid analog-digital processor of claim 8, wherein determining the one or more scaling factors comprises determining the one or more scaling factors based on statistical bounds on the set of parameters and statistical bounds on the input data set.

10. A method for performing a mathematical operation, the method comprising:
   generating a plurality of input analog signals based on an input data set;
   setting a gain of an analog scaling unit based on one or more scaling factors;
   programming an analog processor with a set of parameters representing a matrix;

generating a plurality of output analog signals based on the plurality of input analog signals and the set of parameters;

generating a plurality of amplified or attenuated output analog signals by amplifying or attenuating, using the analog scaling unit, the plurality of input analog signals and/or the plurality of output analog signals; and generating an output data set based on the plurality of amplified or attenuated output analog signals.

11. The method of claim 10, wherein the hybrid analog-digital processor is further configured to perform a multi-pass computation based on the mathematical operation, wherein the circuitry is further configured to:

set the gain of the analog scaling unit to a first value during a first pass of the multi-pass computation; and set the gain of the analog scaling unit to a second value, different from the first value, during a second pass of the multi-pass computation.

12. The method of claim 10, wherein generating a plurality of output analog signals based on the plurality of input analog signals and the set of parameters comprises performing a matrix-matrix multiplication based on the plurality of input analog signals and the set of parameters.

13. The method of claim 10, wherein generating a plurality of output analog signals based on the plurality of input analog signals and the set of parameters comprises performing a convolution based on the plurality of input analog signals and the set of parameters.

14. The method of claim 10, wherein programming the analog processor comprises:

programming, based on the set of parameters, the analog processor with a plurality of matrices that, collectively, represent an arbitrary matrix.

15. The method of claim 14, wherein programming the analog processor with a plurality of matrices comprises:

programming, based on the set of parameters, the analog processor with a plurality of matrices that, collectively, represent the arbitrary matrix based on a singular value decomposition (SVD) of the arbitrary matrix.

16. The method of claim 10, further comprising determining the one or more scaling factors based on the set of parameters and the input data set.

17. The method of claim 16, wherein determining the one or more scaling factors comprises determining the one or more scaling factors based on statistical bounds on the set of parameters and statistical bounds on the input data set.

18. A hybrid analog-digital processor configured to perform a mathematical operation, comprising:

circuitry comprising a photonic processor and at least one amplifier, wherein the circuitry is configured to:

generate a plurality of input optical signals based on an input data set;

set a gain of the at least one amplifier based on one or more scaling factors;

program the photonic processor with a set of parameters representing a matrix;

generate a plurality of output optical signals based on the plurality of input optical signals and the set of parameters;

generate a plurality of output analog signals based on the plurality of output optical signals;

generate a plurality of amplified output signals by amplifying, using the at least one amplifier, at least one among:
the plurality of input optical signals,
the plurality of output optical signals, and
the plurality of output analog signals; and generate an output data set based on the plurality of amplified output signals.

19. The hybrid analog-digital processor of claim 18, wherein the at least one amplifier comprises an optical amplifier and an electronic amplifier, wherein amplifying, using the at least one amplifier, at least one among the plurality of input optical signals, the plurality of output optical signals and the plurality of output analog signals comprises:

amplifying the plurality of input optical signals with the optical amplifier; and amplifying the plurality of output analog signals with the electronic amplifier.

20. The hybrid analog-digital processor of claim 18, wherein the at least one amplifier comprises a laser, and wherein setting the gain of the amplifier comprises setting a gain of the laser.

21. The hybrid analog-digital processor of claim 18, wherein the hybrid analog-digital processor is further configured to perform a multi-pass computation based on the mathematical operation, wherein the circuitry is further configured to:

set the gain of the at least one amplifier to a first value during a first pass of the multi-pass computation; and set the gain of the at least one amplifier to a second value, different from the first value, during a second pass of the multi-pass computation.

22. The hybrid analog-digital processor of claim 18, wherein generating a plurality of output analog signals based on the plurality of input analog signals and the set of parameters comprises performing a matrix-matrix multiplication based on the plurality of input analog signals and the set of parameters.

23. The hybrid analog-digital processor of claim 18, wherein generating a plurality of output analog signals based on the plurality of input analog signals and the set of parameters comprises performing a convolution based on the plurality of input analog signals and the set of parameters.

24. The hybrid analog-digital processor of claim 18, wherein the photonic processor comprises a plurality of optical resonators.

25. The hybrid analog-digital processor of claim 18, wherein the photonic processor comprises:

a first array of interconnected variable beam splitters (VBSs) comprising a first plurality of optical inputs and a first plurality of optical outputs;

a second array of interconnected VBSs comprising a second plurality of optical inputs and a second plurality of optical outputs; and a plurality of controllable optical elements, each of the plurality of these controllable optical elements coupling a single one of the first plurality of optical outputs of the first array to a respective single one of the second plurality of optical inputs of the second array.

26. The hybrid analog-digital processor of claim 18, wherein programming the photonic processor comprises:

programming, based on the set of parameters, the photonic processor with a plurality of matrices that, collectively, represent an arbitrary matrix.

27. The hybrid analog-digital processor of claim 26, wherein programming the photonic processor with a plurality of matrices comprises:

programming, based on the set of parameters, the photonic processor with a plurality of matrices that, collectively, represent the arbitrary matrix based on a singular value decomposition (SVD) of the arbitrary matrix.

28. The hybrid analog-digital processor of claim 26, wherein programming the photonic processor with a plurality of matrices comprises:
    programming, based on the scaled set of parameters, the photonic processor with a plurality of matrices that, collectively, represent the arbitrary matrix based on a dilation of the arbitrary matrix.

29. The hybrid analog-digital processor of claim 18, wherein the circuitry is further configured to determine the one or more scaling factors based on the set of parameters and the input data set.

30. The hybrid analog-digital processor of claim 29, wherein determining the one or more scaling factors comprises determining the one or more scaling factors based on statistical bounds on the set of parameters and statistical bounds on the input data set.

* * * * *